United States Patent
Takeda et al.

(10) Patent No.: US 9,358,457 B2
(45) Date of Patent: Jun. 7, 2016

(54) GAME SYSTEM, CONTROLLER DEVICE, AND GAME METHOD

(75) Inventors: Genyo Takeda, Kyoto (JP); Eizi Kawai, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 0 days.

(21) Appl. No.: 13/244,710

(22) Filed: Sep. 26, 2011

(65) Prior Publication Data

US 2012/0015732 A1    Jan. 19, 2012

Related U.S. Application Data

(63) Continuation of application No. 13/019,924, filed on Feb. 2, 2011, now Pat. No. 8,961,305.

(30) Foreign Application Priority Data

| Feb. 3, 2010 | (JP) | 2010-022022 |
|---|---|---|
| Feb. 3, 2010 | (JP) | 2010-022023 |
| Aug. 6, 2010 | (JP) | 2010-177893 |
| Aug. 20, 2010 | (JP) | 2010-185315 |
| Aug. 30, 2010 | (JP) | 2010-192220 |
| Aug. 30, 2010 | (JP) | 2010-192221 |
| Nov. 1, 2010 | (JP) | 2010-245298 |
| Nov. 1, 2010 | (JP) | 2010-245299 |

(51) Int. Cl.
*A63F 9/24* (2006.01)
*A63F 13/20* (2014.01)
*A63F 13/98* (2014.01)

(52) U.S. Cl.
CPC ............... *A63F 13/06* (2013.01); *A63F 13/02* (2013.01); *A63F 2300/105* (2013.01);
(Continued)

(58) Field of Classification Search
USPC .................................................. 463/1, 31, 36
See application file for complete search history.

(56) References Cited

U.S. PATENT DOCUMENTS

| 4,210,329 A | 7/1980 | Steiger et al. |
|---|---|---|
| 5,009,501 A | 4/1991 | Fenner et al. |

(Continued)

FOREIGN PATENT DOCUMENTS

| CA | 2707609 | 6/2009 |
|---|---|---|
| CN | 1593709 | 3/2005 |

(Continued)

OTHER PUBLICATIONS

Apple Support, "iPhone—Technical Specifications", http://support.apple.com/kb/SP2, 2010. 3 pages.

(Continued)

*Primary Examiner* — David L Lewis
*Assistant Examiner* — Eric M Thomas
(74) *Attorney, Agent, or Firm* — Nixon & Vanderhye, P.C.

(57) ABSTRACT

An example game system includes a home-console type game device and a terminal device. The terminal device includes a touch panel and an inertia sensor, and wirelessly transmits to the game device operation data including touch panel data and inertia sensor data. The game device receives the operation data from the terminal device, and performs game processes based on the operation data. Moreover, the game device generates first game images and second game images based on the game processes. The first game images are compressed, and the compressed image data is wirelessly transmitted to the terminal device. The second game image is output to, and displayed on, an external display device which is separate from the terminal device. The terminal device receives the compressed image data from the game device, expands the received compressed image data, and displays the first game images on a display section.

16 Claims, 18 Drawing Sheets

(52) U.S. Cl.
CPC  *A63F 2300/1075* (2013.01); *A63F 2300/1087* (2013.01); *A63F 2300/301* (2013.01); *A63F 2300/403* (2013.01); *A63F 2300/405* (2013.01); *A63F 2300/538* (2013.01)

(56) References Cited

U.S. PATENT DOCUMENTS

| | | | |
|---|---|---|---|
| 5,440,326 A | 8/1995 | Quinn | |
| 5,452,104 A | 9/1995 | Lee | |
| 5,602,566 A | 2/1997 | Motosyuku et al. | |
| 5,608,449 A | 3/1997 | Swafford, Jr. et al. | |
| 5,619,397 A | 4/1997 | Honda et al. | |
| 5,820,462 A | 10/1998 | Yokoi et al. | |
| 5,825,350 A | 10/1998 | Case, Jr. et al. | |
| 5,825,352 A | 10/1998 | Bisset et al. | |
| D411,530 S | 6/1999 | Carter et al. | |
| 5,943,043 A | 8/1999 | Furuhata et al. | |
| 6,020,891 A | 2/2000 | Rekimoto | |
| 6,069,790 A | 5/2000 | Howell et al. | |
| 6,084,584 A | 7/2000 | Nahi et al. | |
| 6,084,594 A | 7/2000 | Goto | |
| 6,104,380 A | 8/2000 | Stork et al. | |
| 6,126,547 A | 10/2000 | Ishimoto | |
| 6,164,808 A | 12/2000 | Shibata et al. | |
| 6,183,365 B1 | 2/2001 | Tonomura et al. | |
| 6,201,554 B1 | 3/2001 | Lands | |
| 6,208,329 B1 | 3/2001 | Ballare | |
| 6,238,291 B1 | 5/2001 | Fujimoto et al. | |
| 6,252,153 B1 | 6/2001 | Toyama | |
| 6,254,481 B1 | 7/2001 | Jaffe | |
| 6,323,846 B1 | 11/2001 | Westerman et al. | |
| 6,340,957 B1 | 1/2002 | Adler et al. | |
| 6,347,290 B1 | 2/2002 | Bartlett | |
| 6,379,249 B1 | 4/2002 | Satsukawa et al. | |
| 6,396,480 B1 | 5/2002 | Schindler et al. | |
| 6,400,376 B1 | 6/2002 | Singh et al. | |
| 6,411,275 B1 | 6/2002 | Hedberg | |
| 6,425,822 B1 | 7/2002 | Hayashida et al. | |
| 6,466,198 B1 | 10/2002 | Feinstein | |
| 6,466,831 B1 | 10/2002 | Shibata et al. | |
| 6,498,860 B1 | 12/2002 | Sasaki et al. | |
| 6,499,027 B1 | 12/2002 | Weinberger | |
| 6,500,070 B1 | 12/2002 | Tomizawa et al. | |
| 6,509,896 B1 | 1/2003 | Saikawa et al. | |
| 6,538,636 B1 | 3/2003 | Harrison | |
| 6,540,610 B2 * | 4/2003 | Chatani | 463/31 |
| 6,540,614 B1 | 4/2003 | Nishino et al. | |
| 6,557,001 B1 | 4/2003 | Dvir et al. | |
| 6,567,068 B2 | 5/2003 | Rekimoto | |
| 6,567,101 B1 | 5/2003 | Thomas | |
| 6,567,984 B1 | 5/2003 | Allport | |
| 6,570,557 B1 | 5/2003 | Westerman et al. | |
| 6,582,299 B1 | 6/2003 | Matsuyama et al. | |
| 6,657,627 B1 | 12/2003 | Wada et al. | |
| 6,690,358 B2 | 2/2004 | Kaplan | |
| 6,716,103 B1 | 4/2004 | Eck et al. | |
| 6,798,429 B2 | 9/2004 | Bradski | |
| 6,834,249 B2 | 12/2004 | Orchard | |
| 6,847,351 B2 | 1/2005 | Noguera | |
| 6,856,259 B1 | 2/2005 | Sharp | |
| 6,888,536 B2 | 5/2005 | Westerman et al. | |
| 6,897,833 B1 | 5/2005 | Robinson et al. | |
| 6,908,386 B2 | 6/2005 | Suzuki et al. | |
| 6,921,336 B1 * | 7/2005 | Best | 463/32 |
| 6,930,661 B2 | 8/2005 | Uchida et al. | |
| 6,933,923 B2 | 8/2005 | Feinstein | |
| 6,939,231 B2 | 9/2005 | Mantyjarvi et al. | |
| 6,954,491 B1 | 10/2005 | Kim et al. | |
| 6,966,837 B1 | 11/2005 | Best | |
| 6,988,097 B2 | 1/2006 | Shirota | |
| 6,990,639 B2 | 1/2006 | Wilson | |
| 6,993,451 B2 | 1/2006 | Chang et al. | |
| 7,007,242 B2 | 2/2006 | Suomela et al. | |
| D519,118 S | 4/2006 | Woodward | |
| 7,023,427 B2 | 4/2006 | Kraus et al. | |
| 7,030,856 B2 | 4/2006 | Dawson et al. | |
| 7,030,861 B1 | 4/2006 | Westerman et al. | |
| 7,038,662 B2 | 5/2006 | Noguera | |
| 7,053,887 B2 | 5/2006 | Kraus et al. | |
| 7,068,294 B2 | 6/2006 | Kidney et al. | |
| 7,088,342 B2 | 8/2006 | Rekimoto et al. | |
| 7,109,978 B2 | 9/2006 | Gillespie et al. | |
| 7,115,031 B2 | 10/2006 | Miyamoto et al. | |
| 7,128,648 B2 | 10/2006 | Watanabe | |
| 7,140,962 B2 | 11/2006 | Okuda et al. | |
| 7,142,191 B2 | 11/2006 | Idesawa et al. | |
| 7,158,123 B2 | 1/2007 | Myers et al. | |
| 7,173,604 B2 | 2/2007 | Marvit et al. | |
| 7,176,886 B2 | 2/2007 | Marvit et al. | |
| 7,176,887 B2 | 2/2007 | Marvit et al. | |
| 7,176,888 B2 | 2/2007 | Marvit et al. | |
| 7,180,500 B2 | 2/2007 | Marvit et al. | |
| 7,180,501 B2 | 2/2007 | Marvit et al. | |
| 7,180,502 B2 | 2/2007 | Marvit et al. | |
| 7,184,020 B2 | 2/2007 | Matsui | |
| 7,225,101 B2 | 5/2007 | Usuda et al. | |
| 7,233,316 B2 | 6/2007 | Smith et al. | |
| 7,254,775 B2 | 8/2007 | Geaghan et al. | |
| 7,256,767 B2 | 8/2007 | Wong et al. | |
| 7,271,795 B2 | 9/2007 | Bradski | |
| 7,275,994 B2 | 10/2007 | Eck et al. | |
| 7,280,096 B2 | 10/2007 | Marvit et al. | |
| 7,285,051 B2 | 10/2007 | Eguchi et al. | |
| 7,289,102 B2 | 10/2007 | Hinckley et al. | |
| 7,295,191 B2 | 11/2007 | Kraus et al. | |
| 7,301,526 B2 | 11/2007 | Marvit et al. | |
| 7,301,527 B2 | 11/2007 | Marvit | |
| 7,301,529 B2 | 11/2007 | Marvit et al. | |
| 7,321,342 B2 | 1/2008 | Nagae | |
| 7,333,087 B2 | 2/2008 | Soh et al. | |
| RE40,153 E | 3/2008 | Westerman et al. | |
| 7,339,580 B2 | 3/2008 | Westerman et al. | |
| 7,352,358 B2 | 4/2008 | Zalewski et al. | |
| 7,352,359 B2 | 4/2008 | Zalewski et al. | |
| 7,365,735 B2 | 4/2008 | Reinhardt et al. | |
| 7,365,736 B2 | 4/2008 | Marvit et al. | |
| 7,365,737 B2 | 4/2008 | Marvit et al. | |
| D568,882 S | 5/2008 | Ashida et al. | |
| 7,376,388 B2 | 5/2008 | Ortiz et al. | |
| 7,389,591 B2 | 6/2008 | Jaiswal et al. | |
| 7,391,409 B2 | 6/2008 | Zalewski et al. | |
| 7,403,220 B2 | 7/2008 | MacIntosh et al. | |
| 7,431,216 B2 | 10/2008 | Weinans | |
| 7,446,731 B2 | 11/2008 | Yoon | |
| 7,461,356 B2 | 12/2008 | Mitsutake | |
| 7,479,948 B2 | 1/2009 | Kim et al. | |
| 7,479,949 B2 | 1/2009 | Jobs et al. | |
| 7,510,477 B2 | 3/2009 | Argentar | |
| 7,518,503 B2 | 4/2009 | Peele | |
| 7,519,468 B2 | 4/2009 | Orr et al. | |
| 7,522,151 B2 | 4/2009 | Arakawa et al. | |
| 7,540,011 B2 | 5/2009 | Wixson et al. | |
| 7,552,403 B2 | 6/2009 | Wilson | |
| 7,570,275 B2 | 8/2009 | Idesawa et al. | |
| D599,352 S | 9/2009 | Takamoto et al. | |
| 7,607,111 B2 | 10/2009 | Vaananen et al. | |
| 7,614,008 B2 | 11/2009 | Ording | |
| 7,619,618 B2 | 11/2009 | Westerman et al. | |
| 7,626,598 B2 | 12/2009 | Manchester | |
| 7,647,614 B2 | 1/2010 | Krikorian et al. | |
| 7,656,394 B2 | 2/2010 | Westerman et al. | |
| 7,663,607 B2 | 2/2010 | Hotelling et al. | |
| 7,667,707 B1 | 2/2010 | Margulis | |
| 7,692,628 B2 | 4/2010 | Smith et al. | |
| 7,696,980 B1 | 4/2010 | Piot et al. | |
| 7,699,704 B2 | 4/2010 | Suzuki et al. | |
| 7,705,830 B2 | 4/2010 | Westerman et al. | |
| 7,710,396 B2 | 5/2010 | Smith et al. | |
| 7,719,523 B2 | 5/2010 | Hillis | |
| 7,721,231 B2 | 5/2010 | Wilson | |
| 7,730,402 B2 | 6/2010 | Song | |
| 7,736,230 B2 | 6/2010 | Argentar | |
| 7,762,891 B2 | 7/2010 | Miyamoto et al. | |
| D620,939 S | 8/2010 | Suetake et al. | |

(56) References Cited

U.S. PATENT DOCUMENTS

| | | | |
|---|---|---|---|
| 7,782,297 | B2 | 8/2010 | Zalewski |
| 7,791,808 | B2 | 9/2010 | French et al. |
| 7,827,698 | B2 | 11/2010 | Jaiswal et al. |
| D636,773 | S | 4/2011 | Lin |
| 7,934,995 | B2 | 5/2011 | Suzuki |
| D641,022 | S | 7/2011 | Dodo et al. |
| 8,038,533 | B2 | 10/2011 | Tsuchiyama et al. |
| 8,105,169 | B2 | 1/2012 | Ogasawara et al. |
| D666,250 | S | 8/2012 | Fulghum et al. |
| 8,246,460 | B2 | 8/2012 | Kitahara |
| 8,256,730 | B2 | 9/2012 | Tseng |
| 8,306,768 | B2 | 11/2012 | Yamada et al. |
| 8,317,615 | B2 | 11/2012 | Takeda et al. |
| 8,337,308 | B2 | 12/2012 | Ito et al. |
| 8,339,364 | B2 | 12/2012 | Takeda et al. |
| 8,529,352 | B2 | 9/2013 | Mae et al. |
| 8,531,571 | B1 | 9/2013 | Côté |
| 8,567,599 | B2 | 10/2013 | Beatty et al. |
| 8,613,672 | B2 | 12/2013 | Mae et al. |
| 8,684,842 | B2 | 4/2014 | Takeda et al. |
| 8,690,675 | B2 | 4/2014 | Ito et al. |
| 8,702,514 | B2 | 4/2014 | Ashida et al. |
| 8,804,326 | B2 | 8/2014 | Ashida et al. |
| 8,814,680 | B2 | 8/2014 | Ashida et al. |
| 8,814,686 | B2 | 8/2014 | Takeda et al. |
| 8,827,818 | B2 | 9/2014 | Ashida et al. |
| 8,845,426 | B2 | 9/2014 | Ohta et al. |
| 8,896,534 | B2 | 11/2014 | Takeda et al. |
| 8,913,009 | B2 | 12/2014 | Takeda et al. |
| 8,956,209 | B2 | 2/2015 | Nishida et al. |
| 8,961,305 | B2 | 2/2015 | Takeda et al. |
| 9,132,347 | B2 | 9/2015 | Nishida et al. |
| 2001/0019363 | A1 | 9/2001 | Katta et al. |
| 2002/0103026 | A1 | 8/2002 | Himoto et al. |
| 2002/0103610 | A1 | 8/2002 | Bachmann et al. |
| 2002/0107071 | A1 | 8/2002 | Himoto et al. |
| 2002/0122068 | A1 | 9/2002 | Tsuruoka |
| 2002/0165028 | A1 | 11/2002 | Miyamoto et al. |
| 2003/0027517 | A1 | 2/2003 | Callway et al. |
| 2003/0207704 | A1 | 11/2003 | Takahashi et al. |
| 2003/0216179 | A1 | 11/2003 | Suzuki et al. |
| 2004/0023719 | A1 | 2/2004 | Hussaini et al. |
| 2004/0092309 | A1 | 5/2004 | Suzuki |
| 2004/0229687 | A1 | 11/2004 | Miyamoto et al. |
| 2004/0266529 | A1 | 12/2004 | Chatani |
| 2005/0176502 | A1 | 8/2005 | Nishimura et al. |
| 2005/0181756 | A1 | 8/2005 | Lin |
| 2005/0253806 | A1 | 11/2005 | Liberty et al. |
| 2006/0012564 | A1 | 1/2006 | Shiozawa et al. |
| 2006/0015808 | A1 | 1/2006 | Shiozawa et al. |
| 2006/0015826 | A1 | 1/2006 | Shiozawa et al. |
| 2006/0038914 | A1 | 2/2006 | Hanada et al. |
| 2006/0077165 | A1 | 4/2006 | Jang |
| 2006/0094502 | A1 | 5/2006 | Katayama et al. |
| 2006/0174026 | A1 | 8/2006 | Robinson et al. |
| 2006/0250764 | A1 | 11/2006 | Howarth et al. |
| 2006/0252537 | A1 | 11/2006 | Wu |
| 2006/0252541 | A1* | 11/2006 | Zalewski et al. ............... 463/36 |
| 2006/0267928 | A1 | 11/2006 | Kawanobe et al. |
| 2007/0021210 | A1 | 1/2007 | Tachibana |
| 2007/0021216 | A1 | 1/2007 | Guruparan |
| 2007/0049374 | A1 | 3/2007 | Ikeda et al. |
| 2007/0060383 | A1 | 3/2007 | Dohta |
| 2007/0202956 | A1 | 8/2007 | Ogasawara et al. |
| 2007/0252901 | A1 | 11/2007 | Yokonuma et al. |
| 2007/0265085 | A1 | 11/2007 | Miyamoto et al. |
| 2008/0015017 | A1 | 1/2008 | Ashida et al. |
| 2008/0024435 | A1 | 1/2008 | Dohta |
| 2008/0030458 | A1* | 2/2008 | Helbing et al. ............... 345/156 |
| 2008/0039202 | A1 | 2/2008 | Sawano et al. |
| 2008/0064500 | A1 | 3/2008 | Satsukawa et al. |
| 2008/0100995 | A1 | 5/2008 | Ryder et al. |
| 2008/0150911 | A1 | 6/2008 | Harrison |
| 2008/0220867 | A1 | 9/2008 | Zalewski et al. |
| 2008/0300055 | A1 | 12/2008 | Lutnick et al. |
| 2009/0027386 | A1 | 1/2009 | Furuhashi et al. |
| 2009/0082107 | A1 | 3/2009 | Tahara et al. |
| 2009/0143140 | A1 | 6/2009 | Kitahara |
| 2009/0170579 | A1 | 7/2009 | Ishii et al. |
| 2009/0183193 | A1 | 7/2009 | Miller, IV |
| 2009/0195349 | A1* | 8/2009 | Frader-Thompson et al. ... 340/3.1 |
| 2009/0219677 | A1 | 9/2009 | Mori et al. |
| 2009/0225159 | A1 | 9/2009 | Schneider et al. |
| 2009/0241038 | A1 | 9/2009 | Izuno et al. |
| 2009/0254953 | A1 | 10/2009 | Lin |
| 2009/0256809 | A1 | 10/2009 | Minor |
| 2009/0280910 | A1 | 11/2009 | Gagner et al. |
| 2009/0322671 | A1 | 12/2009 | Scott et al. |
| 2009/0322679 | A1 | 12/2009 | Sato et al. |
| 2010/0007926 | A1 | 1/2010 | Imaizumi et al. |
| 2010/0009746 | A1 | 1/2010 | Raymond et al. |
| 2010/0009760 | A1 | 1/2010 | Shimamura et al. |
| 2010/0045666 | A1 | 2/2010 | Kornmann et al. |
| 2010/0083341 | A1 | 4/2010 | Gonzalez |
| 2010/0105480 | A1 | 4/2010 | Mikhailov et al. |
| 2010/0149095 | A1 | 6/2010 | Hwang |
| 2010/0156824 | A1 | 6/2010 | Paleczny et al. |
| 2010/0311501 | A1 | 12/2010 | Hsu |
| 2011/0021274 | A1 | 1/2011 | Sato et al. |
| 2011/0190049 | A1 | 8/2011 | Mae et al. |
| 2011/0190050 | A1 | 8/2011 | Mae et al. |
| 2011/0190052 | A1 | 8/2011 | Takeda et al. |
| 2011/0190061 | A1 | 8/2011 | Takeda et al. |
| 2011/0195785 | A1 | 8/2011 | Ashida et al. |
| 2011/0228457 | A1 | 9/2011 | Moon et al. |
| 2011/0285704 | A1 | 11/2011 | Takeda et al. |
| 2011/0287842 | A1 | 11/2011 | Yamada et al. |
| 2011/0295553 | A1 | 12/2011 | Sato |
| 2012/0001048 | A1 | 1/2012 | Takahashi et al. |
| 2012/0015732 | A1 | 1/2012 | Takeda et al. |
| 2012/0026166 | A1 | 2/2012 | Takeda et al. |
| 2012/0040759 | A1 | 2/2012 | Ito et al. |
| 2012/0044177 | A1 | 2/2012 | Ohta et al. |
| 2012/0046106 | A1 | 2/2012 | Ito et al. |
| 2012/0052952 | A1 | 3/2012 | Nishida et al. |
| 2012/0052959 | A1 | 3/2012 | Nishida et al. |
| 2012/0062445 | A1 | 3/2012 | Haddick et al. |
| 2012/0068927 | A1 | 3/2012 | Poston et al. |
| 2012/0086631 | A1 | 4/2012 | Osman et al. |
| 2012/0087069 | A1 | 4/2012 | Fu et al. |
| 2012/0088580 | A1 | 4/2012 | Takeda et al. |
| 2012/0106041 | A1 | 5/2012 | Ashida et al. |
| 2012/0106042 | A1 | 5/2012 | Ashida et al. |
| 2012/0108329 | A1 | 5/2012 | Ashida et al. |
| 2012/0108340 | A1 | 5/2012 | Ashida et al. |
| 2012/0119992 | A1 | 5/2012 | Nishida et al. |
| 2012/0258796 | A1 | 10/2012 | Ohta et al. |
| 2012/0270651 | A1 | 10/2012 | Takeda et al. |
| 2013/0063350 | A1 | 3/2013 | Takeda et al. |
| 2013/0109477 | A1 | 5/2013 | Ito et al. |
| 2014/0295966 | A1 | 10/2014 | Ashida et al. |

FOREIGN PATENT DOCUMENTS

| | | |
|---|---|---|
| CN | 1868244 | 11/2006 |
| CN | 201572520 U | 9/2010 |
| CN | 202270340 U | 6/2012 |
| CN | 202355827 | 8/2012 |
| CN | 202355828 U | 8/2012 |
| CN | 202355829 U | 8/2012 |
| EP | 0 710 017 | 5/1996 |
| EP | 0 835 676 | 4/1998 |
| EP | 1 469 382 | 10/2004 |
| EP | 1 723 992 | 11/2006 |
| EP | 2 158 947 | 3/2010 |
| FR | 2 932 998 | 1/2010 |
| JP | 06-285259 | 10/1994 |
| JP | 07-068052 | 3/1995 |
| JP | 07-088251 | 4/1995 |
| JP | 08-045392 | 2/1996 |
| JP | 08-095669 | 4/1996 |
| JP | H09-099173 | 4/1997 |
| JP | 09-294260 | 11/1997 |
| JP | 10-341388 | 12/1998 |

(56) References Cited

FOREIGN PATENT DOCUMENTS

| | | |
|---|---|---|
| JP | 2000-222185 | 8/2000 |
| JP | 2001-034247 | 2/2001 |
| JP | 2001-084131 | 3/2001 |
| JP | 2001-340641 | 12/2001 |
| JP | 2002-177644 | 6/2002 |
| JP | 2002-248267 | 9/2002 |
| JP | 2003-189484 | 7/2003 |
| JP | 2003-325972 | 11/2003 |
| JP | 2004-032548 | 1/2004 |
| JP | 2004-329744 | 11/2004 |
| JP | 3108313 U | 2/2005 |
| JP | 3703473 | 2/2005 |
| JP | 2005-137405 | 6/2005 |
| JP | 2005-269399 | 9/2005 |
| JP | 3770499 | 4/2006 |
| JP | 3797608 | 7/2006 |
| JP | 2006-350986 | 12/2006 |
| JP | 2007-021065 | 2/2007 |
| JP | 2007-061271 | 3/2007 |
| JP | 2007-075353 | 3/2007 |
| JP | 2007-075751 | 3/2007 |
| JP | 2007-260409 | 10/2007 |
| JP | 2007-274836 | 10/2007 |
| JP | 2007-289413 | 11/2007 |
| JP | 2007-310840 | 11/2007 |
| JP | 2007-313354 | 12/2007 |
| JP | 2008-067844 | 3/2008 |
| JP | 2008-067875 | 3/2008 |
| JP | 2008-264402 | 11/2008 |
| JP | 2010-017412 | 1/2009 |
| JP | 2009-031949 | 2/2009 |
| JP | 2009-142511 | 7/2009 |
| JP | 2009-178363 | 8/2009 |
| JP | 2009-200799 | 9/2009 |
| JP | 3153862 | 9/2009 |
| JP | 2009-219707 | 10/2009 |
| JP | 2009-230753 | 10/2009 |
| JP | 2009-247763 | 10/2009 |
| JP | 2009-536058 | 10/2009 |
| JP | 2010-017395 | 1/2010 |
| JP | 2010-066899 | 3/2010 |
| JP | 2010-142561 | 7/2010 |
| JP | 4601925 | 12/2010 |
| TW | M278452 | 10/2005 |
| TW | 419388 | 1/2011 |
| WO | 03/007117 | 1/2003 |
| WO | 03/083822 | 10/2003 |
| WO | 2007/128949 | 11/2007 |
| WO | 2007/143632 | 12/2007 |
| WO | 2008/136064 | 11/2008 |
| WO | 2009/038596 | 3/2009 |
| WO | 2010/088477 | 8/2010 |

OTHER PUBLICATIONS

Apple Support, "iPhone—Technical Specifications", Apple, Aug. 22, 2008, XP002673788, retrieved from the internet: URL: http://support.apple.com/kb/SP495 [retrieved on Apr. 13, 2012].
PersonalApplets: "Gyro Tennis App for iPhone 4 and iPod Touch 4th gen" YouTube, Aug. 9, 2010, Hyyp://www.youtube.com/watch?v=c7PRFbqWKIs, 2 pages.
Jhrogersii, "Review: Gyro Tennis for iPhone", iSource, Sep. 17, 2010, http://isource.com/2010/09/17/review-gyro-tennis-for-phone/, 10 pages.
IGN Staff, "PS3 Games on PSP?", URL: http://www.ign.com/articles/2006/10/25/ps3-games-on-psp, Publication date printed on article: Oct. 2006.
Marcusita, "What Benefits Can I Get Out of My PSP on My PS3", URL: http://web.archive.org/web/20080824222755/http://forums.afterdawn.com/thread_view.cfm/600615, Publication date printed on article: Dec. 15, 2007.
Rob Aspin et al., "Augmenting the CAVE: An initial study into close focused, inward looking, exploration in IPT systems," 11th IEE International Symposium Distributed Simulation and Real-Time Applications, pp. 217-224 (Oct. 1, 2007).
D. Weidlich et al., "Virtual Reality Approaches for Immersive Design," CIRP Annals, Elsevier BV, NL, CH, FR, vol. 56, No. 1, pp. 139-142 (Jan. 1, 2007).
G.W. Fitzmaurice et al., "Virtual Reality for Palmtop Computers," ACM Transactions on Information Systems, ACM, New York, NY, vol. 11, No. 3, pp. 197-218 (Jul. 1, 1993).
Johan Sanneblad et al., "Ubiquitous graphics," Proceedings of the Working Conference on Advanced Visual Interfaces, AVI '06, pp. 373-377 (Oct. 1, 2006).
Office Action dated Oct. 16, 2012 in Australian Application No. 2011204815.
Office Action dated Sep. 18, 2012 in Australian Application No. 2011213764.
Office Action dated Sep. 10, 2012 in Australian Application No. 2011213765.
English-language machine translation for JP 2009-178363.
English-language machine translation for JP 2009-247763.
English-language machine translation for JP 09-294260.
English-language machine translation for JP 2004-032548.
English-language machine translation for JP 4601925.
English-language machine translation for JP 2002-248267.
English-language machine translation for JP 2007-075751.
English-language machine translation for JP 2008-264402.
Mae et al., U.S. Appl. No. 13/017,381, filed Jan. 31, 2011.
Mae et al., U.S. Appl. No. 13/017,527, filed Jan. 31, 2011.
Takeda et al., U.S. Appl. No. 13/019,924, filed Feb. 2, 2011.
Takeda et al., U.S. Appl. No. 13/019,928, filed Feb. 2, 2011.
Takeda et al., U.S. Appl. No. 13/145,690, filed Dec. 19, 2011.
Taekda et al., U.S. Appl. No. 13/153,106, filed Jun. 3, 2011.
Ito et al., U.S. Appl. No. 13/198,251, filed Aug. 4, 2011.
Ashida et al., U.S. Appl. No. 13/206,059, filed Aug. 9, 2011.
Ashida et al., U.S. Appl. No. 13/206,767, filed Aug. 10, 2011.
Ashida et al., U.S. Appl. No. 13/206,914, filed Aug. 10, 2011.
Ashida et al., U.S. Appl. No. 13/207,867, filed Aug. 11, 2011.
Ito et al., U.S. Appl. No. 13/208,719, filed Aug. 12, 2011.
Ohta et al., U.S. Appl. No. 13/209,756, filed Aug. 15, 2011.
Nishida et al., U.S. Appl. No. 13/211,679, filed Aug. 17, 2011.
Nishida et al., U.S. Appl. No. 13/212,648, filed Aug. 18, 2011.
Takeda et al., U.S. Appl. No. 13/244,685, filed Sep. 26, 2011.
Takeda et al., U.S. Appl. No. 13/244,710, filed Sep. 26, 2011.
Ohta et al., U.S. Appl. No. 13/354,000, filed Jan. 19, 2012.
Takeda et al., U.S. Appl. No. 13/541,282, filed Jul. 3, 2012.
Patent Examination Report dated Jun. 25, 2013 in counterpart Australian Application No. 2011213764.
Sony HMZ-T1 with TrackIR 5 playing PC games! WoW and Skyrim Uploaded by iphwne Nov. 16, 2011 http://www.youtube.com/watch?v=5OLCFMBWT6I.
Sony's New 3D OLED Headset/VR Goggles Uploaded by TheWaffleUniverse Jan. 8, 2011 http://www.youtube.com/watch?v=UoE5ij63EDI.
TrackIR 5—review Uploaded by arnycracker8 Jan. 27, 2011 http://www.youtube.com/watch?v=EXMXvAuBzo4.
Partial English-language translation of TWM278452.
Takeda et al., U.S. Appl. No. 13/019,924, filed Feb. 2, 2011—non-final office action mailed Oct. 8, 2013.
Takeda et al., U.S. Appl. No. 13/145,690, filed Dec. 19, 2011—allowed.
Taekda et al., U.S. Appl. No. 13/153,106, filed Jun. 3, 2011—non-final office action mailed Oct. 10, 2013.
Ito et al., U.S. Appl. No. 13/198,251, filed Aug. 4, 2011—awaiting USPTO action.
Ashida et al., U.S. Appl. No. 13/206,059, filed Aug. 9, 2011—awaiting USPTO action.
Ashida et al., U.S. Appl. No. 13/206,767, filed Aug. 10, 2011—Quayle action mailed Nov. 14, 2013.
Ashida et al., U.S. Appl. No. 13/206,914, filed Aug. 10, 2011—allowed.
Ashida et al., U.S. Appl. No. 13/207,867, filed Aug. 11, 2011—non-final office action mailed Oct. 7, 2013.
Ohta et al., U.S. Appl. No. 13/209,756, filed Aug. 15, 2011—awaiting USPTO action.

(56) References Cited

OTHER PUBLICATIONS

Nishida et al., U.S. Appl. No. 13/211,679, filed Aug. 17, 2011—final office action mailed Oct. 15, 2013.
Nishida et al., U.S. Appl. No. 13/212,648, filed Aug. 18, 2011—final office action mailed Dec. 2, 2013.
Ohta et al., U.S. Appl. No. 13/354,000, filed Jan. 19, 2012—non-final office action mailed Nov. 8, 2013.
Takeda et al., U.S. Appl. No. 13/541,282, filed Jul. 3, 2012—non-final office action mailed Sep. 13, 2013.
Takeda et al., U.S. Appl. No. 13/672,862, filed Nov. 9, 2012—awaiting USPTO action.
Ito et al., U.S. Appl. No. 13/687,057, filed Nov. 28, 2012—allowed.
Takeda et al., U.S. Appl. No. 13/019,924, filed Feb. 2, 2011—response to office action filed 00/19/2014.
Taekda et al., U.S. Appl. No. 13/153,106, filed Jun. 3, 2011—allowed.
Ohta et al., U.S. Appl. No. 13/209,756, filed Aug. 15, 2011—final office action mailed Jul. 8, 2014.
Ashida et al., U.S. Appl. No. 14/302,248, filed Jun. 11, 2014—non-final office action mailed Sep. 4, 2014.
Kenji Saeki, "Both the appearance and the function are improved! The report on the evolved Nintendo DSi.", [online], Dec. 1, 2008, Impress Watch Co., Ltd. , GAME Watch, [searched on Jul. 23, 2014]. Internet <URL: http://game.watch.impress.co.jpl docs/20081101/dsi1.htm> and partial English-language translation.
Office Action dated Jul. 29, 2014 in counterpart Japanese Patent Application No. 2011-168063 and partial English-language translation of same.
English-language machine translation of http://game.watch.impress.co.jp/docs/20081101/dsi1.htm [retrieved on Oct. 5, 2014].
Abtract and English-language machine-translation of JP 2001-034247.
Abstract and English-language machine-translation of JP 2010-066899.
Decision of Refusal in counterpart JP Application No. 2011-168063.
English-language machine translation of JP 2005-137405.
Notice of Reasons for Refusal in counterpart JP Application No. 2012-014902 dated Jan. 29, 2016.
English-language machine translation of JP 2008-067875.
Takeda et al., U.S. Appl. No. 13/019,924, filed Feb. 2, 2011—response to office action filed Feb. 10, 2014.
Takeda et al., U.S. Appl. No. 13/145,690, filed Dec. 19, 2011—now U.S. Pat. No. 8,684,842.
Taekda et al., U.S. Appl. No. 13/153,106, filed Jun. 3, 2011—final office action filed Feb. 4, 2014.
Ashida et al., U.S. Appl. No. 13/206,059, filed Aug. 9, 2011—response to office action filed May 14, 2014.
Ashida et al., U.S. Appl. No. 13/206,767, filed Aug. 10, 2011—allowed.
Ashida et al., U.S. Appl. No. 13/206,914, filed Aug. 10, 2011—now U.S. Pat. No. 8,702,514.
Ashida et al., U.S. Appl. No. 13/207,867, filed Aug. 11, 2011—allowed.
Ohta et al., U.S. Appl. No. 13/209,756, filed Aug. 15, 2011—response to office action filed Mar. 31, 2014.
Nishida et al., U.S. Appl. No. 13/211,679, filed Aug. 17, 2011—RCE filed Apr. 28, 2014.
Nishida et al., U.S. Appl. No. 13/212,648, filed Aug. 18, 2011—RCE filed May 7, 2014.
Ohta et al., U.S. Appl. No. 13/354,000, filed Jan. 19, 2012—allowed.
Takeda et al., U.S. Appl. No. 13/541,282, filed Jul. 3, 2012—allowed.
Takeda et al., U.S. Appl. No. 13/672,862, filed Nov. 9, 2012—allowed.
Ito et al., U.S. Appl. No. 13/687,057, filed Nov. 28, 2012—now U.S. Pat. No. 8,690,675.
Ito et al., U.S. Appl. No. 13/198,251, filed Aug. 4, 2011—allowed.
Ashida et al., U.S. Appl. No. 14/302,408, filed Jun. 11, 2014—allowed.
Office Action dated Mar. 17, 2015 in counterpart JP Application No. 2010-022023.
English-language machine translation of JP 2001-340641.
Office Action dated Mar. 27, 2015 in counterpart CA Application No. 2,746,481.
Ascension Technology Corporation, Flock of Birds, Real-Time Motion Tracking, retrieved from Internet on Dec. 30, 2003, www.ascension-tech.com, 3 pages.
English-language machine-translation for JP 07-068052.
English-language machine-translation for JP 07-088251.
English-language machine-translation for JP 08-045392.
English-language machine-translation for JP 08-095669.
English-language machine-translation for JP 2002-177644.
English-language machine-translation for JP 2007-260409.
English-language machine-translation for JP 2007-313354.
English-language machine-translation for JP 2009-200799.
English-language machine-translation for JP 2009-230753.
English-language machine-translation for JP 3108313U.
English-language machine-translation for JP 2007-274836.
English-language machine-translation for JP 2003-189484.
English-language machine translation of JP 2009-219707.
English-language machine-translation for CN 201572520U.
Takeda et al., U.S. Appl. No. 13/019,924, filed Feb. 2, 2011—now U.S. Pat. No. 8,961,305.
Taekda et al., U.S. Appl. No. 13/153,106, filed Jun. 3, 2011—now U.S. Pat. No. 8,913,009.
Ito et al., U.S. Appl. No. 13/198,251, filed Aug. 4, 2011—RCE filed Aug. 8, 2015.
Ohta et al., U.S. Appl. No. 13/209,756, filed Aug. 15, 2011—non-final office action mailed Jul. 23, 2015.
Nishida et al., U.S. Appl. No. 13/211,679, filed Aug. 17, 2011—now U.S. Pat. No. 8,956,209.
Nishida et al., U.S. Appl. No. 13/212,648, filed Aug. 18, 2011—now U.S. Pat. No. 9,132,347.
Takeda et al., U.S. Appl. No. 13/244,710, filed Sep. 26, 2011—non-final office action mailed May 21, 2015.
Takeda et al., U.S. Appl. No. 13/672,862, filed Nov. 9, 2012—now U.S. Pat. No. 8,896,534.
Ashida et al., U.S. Appl. No. 14/302,248, filed Jun. 11, 2014—final office action mailed Jun. 17, 2015.
Takeda et al., U.S. Appl. No. 14/537,654, filed Nov. 10, 2014—awaiting USPTO action.
Office Action mailed Aug. 31, 2015 in JP Application No. 2011-120682.
Office Action mailed Aug. 31, 2015 in JP Application No. 2011-114864.
Office Action mailed Sep. 14, 2015 in counterpart Japanese Application No. 2011-120680.
Office Action mailed Mar. 17, 2015 in counterpart JP Application No. 2011-092612.
English-language machine translation of JP H09-099173.
English-language machine translation of JP 2007-310840.
Notice of Decision of Refusal in counterpart JP Application No. 2011-120680 dated Apr. 1, 2016.

* cited by examiner

Fig. 14
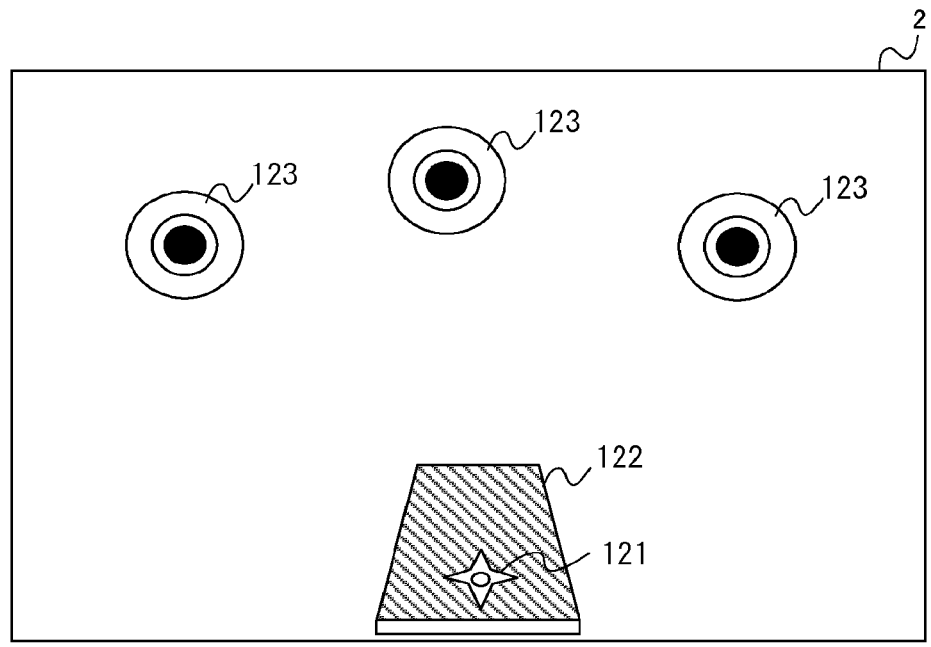
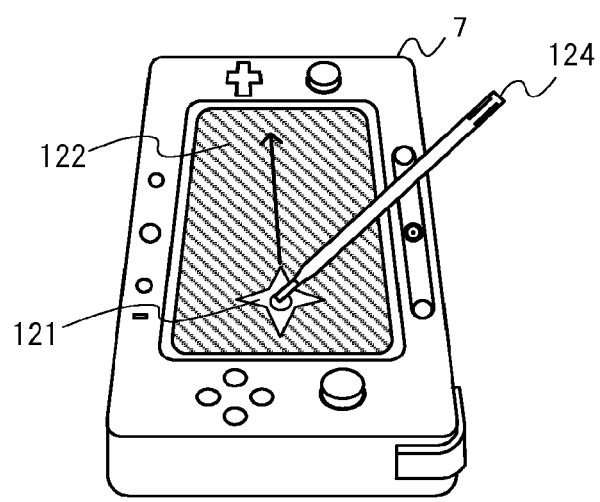

Fig. 15
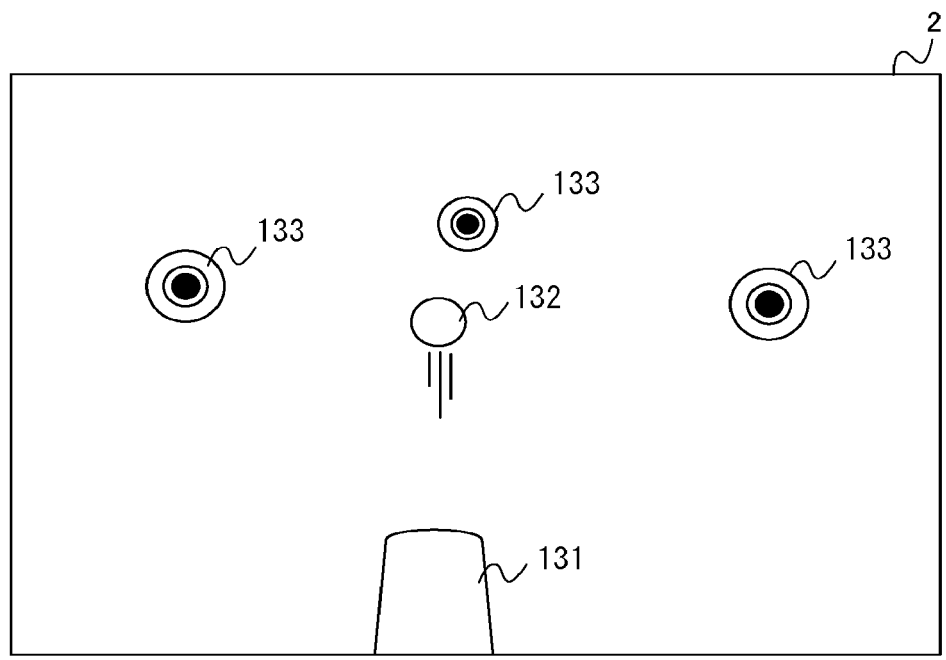
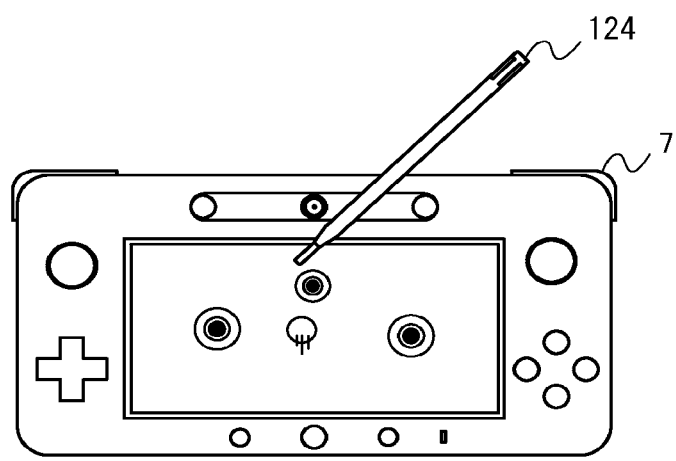

GAME SYSTEM, CONTROLLER DEVICE, AND GAME METHOD

CROSS-REFERENCES TO RELATED APPLICATIONS

This application is a continuation of application Ser. No. 13/019,924, filed Feb. 2, 2011, now U.S. Pat. No. 8,961,305, which claims the benefit under 35 U.S.C. Section 119 of Japanese Patent Application Nos. 2010-022022 and 2010-022023 filed on Feb. 3, 2010; Japanese Patent Application No. 2010-177893 filed on Aug. 6, 2010; Japanese Patent Application No. 2010-185315 filed on Aug. 20, 2010; Japanese Patent Application Nos. 2010-192220 and 2010-192221 filed on Aug. 30, 2010; and Japanese Patent Application Nos. 2010-245298 and 2010-245299 filed on Nov. 1, 2010. The entire contents of each of these applications are incorporated herein by reference.

This application is related by subject matter to application Ser. No. 13/019,928, entitled DISPLAY DEVICE, GAME SYSTEM, AND GAME METHOD, filed on Feb. 2, 2011, the contents of which are incorporated herein in their entirety.

BACKGROUND AND SUMMARY

This application describes a game system including a controller device that can be controlled player movement, and also a controller device and a method in such a game system.

A first example game system described herein includes a home-console type game device and a first controller device.

The game device includes a first receiver, a game processor, an image processor, a compression section (e.g., a compression circuit), a transmitter, and an image outputting section. The first receiver receives first operation data from the first controller device. The game processor performs game processes based on the first operation data. The image processor generates first game images and second game images based on the game processes. The compression section compresses the first game images to generate compressed image data. The transmitter wirelessly transmits the compressed image data to the first controller device. The image outputting section outputs the second game images to an external display device (such as a television) which is separate from the first controller device.

The first controller device includes a display section, a touch panel, an inertia sensor, a transmitter, a receiver, and an expansion section (e.g., a decompression circuit). The touch panel is provided on a screen of the display section. The transmitter wirelessly transmits the first operation data including touch panel data and inertia sensor data to the game device. The receiver receives compressed image data from the game device. The expansion section expands the compressed image data to obtain the first game images. The display section displays the first game images obtained by the expansion.

By way of example and without limitation, the game device may be any device that performs game processes, and generates images based on the game processes. The game device may be a single-purpose information processing device for games, or a general-purpose information processing device such as an ordinary personal computer.

By way of example and without limitation, the first controller device includes a display section, a touch panel, an inertia sensor, a transmitter, a receiver, and an expansion section. The first controller device may or may not include other components such as those of other example terminal devices also described herein.

By way of example and without limitation, the game system includes the game device and the first controller device, and may or may not include, for example, an external display device for displaying the second game images. That is, the game system may be provided in a form in which the external display device is not included or in a form in which it is included.

By way of example and without limitation, the external display device is separate from the first controller device, and may include any device, in addition to a television, as long as it is capable of displaying the second game images generated by the game device. For example, the external display device may be formed as an integral unit (in a single casing) with the game device.

With the first example configuration described above, the first controller device includes a touch panel and an inertia sensor, and the game device performs game processes based on operation data including, for example, touch panel data and inertia sensor data. The player can perform game operations by directly touching the screen of the first controller device or moving the screen itself (i.e., the first controller device itself). That is, with the first example configuration, it is possible to provide the player with a novel game operation of directly operating game images displayed on a screen.

With the first example configuration, the game images displayed on the screen of the first controller device are often game images used for performing an operation on the touch panel. Depending on the content of the game, one may wish to display an image that is not used for performing an operation on the touch panel. It is difficult to display such an image while performing an operation on the touch panel. In view of this, with the first example configuration, second game images can be displayed on an external display device, and it is therefore possible to present two different types of game images to the player. Therefore, for example, the game space can be expressed in various methods with two types of game images by, for example, displaying first game images suitable for operations on the touch panel on the screen of the first controller device while displaying second game images suitable for grasping the game space on the external display device. Thus, with the first example configuration, it is possible to present to the player game images that are easier to view and easier to perform game operations with.

With the first example configuration, the first controller device only needs to perform at least an expansion process for the image data, and the game processes may be performed on the game device side. Even if the game processes become more complicated, it only increases the computation on the game device side, and does not substantially influence the amount of computation of the image expansion process by the first controller device. Therefore, even if complicated game processes are required, the computational load on the first controller device side can be kept within a predetermined range, and the first controller device is not required to have high information processing capabilities. This makes it easier to reduce the size and weight of the first controller device, which is used by the user while holding it in hand, and makes it easier to manufacture the first controller device.

Moreover, with the first example configuration, since the first game images are transmitted, in a compressed form, from the game device to the first controller device, the game images can be wirelessly transmitted at a high speed, and the delay from when the game processes are performed until the game images are displayed is kept small.

In a second example configuration, the game system may further include a second controller device. The second controller device includes a transmitter for wirelessly transmitting to the game device second operation data representing operations performed on the second controller device. The game device further includes a second receiver for receiving the second operation data. The game processor performs game processes based on the second operation data.

By way of example and without limitation, the second controller device may include any device that is capable of wirelessly transmitting operation data (second operation data) to the game device.

With the second example configuration, game operations can be performed with the second controller device, as well as with the first controller device. Thus, for example, a player using the second controller device can play the game while looking at the game image displayed on the external display device. Therefore, with the second example configuration, two players can play the game while looking respectively at the external display device and the screen of the first controller device.

In a third example configuration, the game device may further include a game sound generation section and a game sound output section. The game sound generation section generates first game sounds and second game sounds based on the game processes. The game sound output section outputs the second game sounds to an external acoustic device (e.g., speaker or speakers) which is separate from the first controller device. The transmitter of the game device wirelessly transmits the first game sounds to the first controller device. The first controller device further includes a speaker. The receiver of the first controller receives the first game sounds from the game device. The speaker outputs the received first game sounds.

With the third example configuration, the first game sounds wirelessly transmitted from the game device to the first controller device may be transmitted in a compressed form or transmitted in an uncompressed form.

With the third example configuration, for the game sounds, as for the game images, it is possible to output two types of game sounds. Therefore, the first controller device can output game sounds associated with first game images, and the external acoustic device can output second game sounds associated with second game images.

In a fourth example configuration, the first controller device may further include a microphone. Then, the transmitter of the first controller device wirelessly transmits sound data detected by the microphone to the game device.

With the fourth example configuration, the sound data wirelessly transmitted from the first controller device to the game device may be transmitted in a compressed form or transmitted in an uncompressed form.

With the fourth example configuration, sounds (microphone sounds) detected by the microphone of the first controller device are transmitted to the game device. Therefore, the game device can use the microphone sounds as game sounds, or use a result of performing a sound recognition process on the microphone sounds as game inputs.

In a fifth example configuration, the first controller device may further include a camera and a camera image compression section. The camera image compression section compresses camera images captured by the camera to generate compressed captured image data. Then, the transmitter of the first controller device wirelessly transmits the compressed captured image data to the game device. The game device includes a camera image expansion section for expanding the compressed captured image data to obtain the camera images.

With the fifth example configuration, camera images captured by the camera of the first controller device are transmitted to the game device. Therefore, the game device may use the camera images as game images (or parts thereof), or use a result of performing an image recognition process on the camera images as game inputs. With the fifth example configuration, since the camera images are transmitted in a compressed form, the camera images can be wirelessly transmitted at high speed.

In a sixth example configuration, the first controller device may include a plurality of front surface operation buttons, and direction input devices capable of specifying directions. The plurality of front surface operation buttons are provided on a front surface of the first controller device, on which the screen of the display section and the touch panel are provided. At least two of the front surface operation buttons are disposed on opposite sides of the screen. The direction input devices are provided on the front surface on opposite sides of the screen. Then, the first operation data further includes data representing operations performed on the plurality of front surface operation buttons and the direction input devices.

With the sixth example, the operation buttons and the direction input devices are provided on opposite sides of the screen of the first controller device. Therefore, since the player can operate the operation buttons and the direction input devices (typically with the thumbs) while holding the first controller device, it is possible to easily operate the operation buttons and the direction input devices even while performing operations such as moving the first controller device to, for example, change its position or attitude.

In a seventh example configuration, the first controller device may further include a plurality of back surface operation buttons, and a plurality of side surface operation buttons. The plurality of back surface operation buttons are provided on a back surface of the first controller device. The back surface is a surface opposite to a front surface of the first controller device, on which the screen of the display section and the touch panel are provided. The plurality of side surface operation buttons are provided on a side surface extending between the front surface and the back surface. Then, the first operation data further includes data representing operations performed using the plurality of back surface operation buttons and the side surface operation buttons.

With the seventh example configuration, operation buttons are provided on the back surface and the side surface of the first controller device. Therefore, since a player can operate these operation buttons (typically with the index fingers or the middle fingers) while holding the first controller device, it is possible to easily operate the operation buttons even while performing the operation of moving the first controller device to, for example, change its position or attitude.

In an eighth example configuration, the first controller device may further include a magnetic sensor. Then, the first operation data further includes magnetic sensor data.

With the eighth example configuration, the first controller device includes the magnetic sensor, and magnetic sensor data is used in the game processes of the game device. Therefore, the player can perform game operations by moving the first controller device. Since the game device can determine the absolute attitude of the first controller device in real space based on the magnetic sensor data, it is possible to accurately calculate the attitude of the first controller device by using inertia sensor data and magnetic sensor data, for example.

In a ninth example configuration, the inertia sensor includes, for example, a 3-axis acceleration sensor and a 3-axis gyrosensor.

With the ninth example configuration, by using two types of sensors, i.e., an acceleration sensor and a gyrosensor, as the inertia sensor, it is possible to even more accurately calculate the movement and the attitude of the first controller device.

In a tenth example configuration, the game device may include a network communication section and a power supply section. The game processor reads out information from an external storage medium storing a game program therein which can be attached/detached to/from the game device. The network communication section can be connected to a network and communicates with an information processing device which is capable of communication via the network. The power supply section supplies power from an external power supply outside the game device to various sections inside the game device. The game processor performs game processes based on the read-out game program.

With the tenth example configuration, the game program to be executed in the game device can be changed easily by replacing an external storage medium storing a game program therein with another storage medium. Since the game device is capable of communication via a network, it is possible to improve the functions of the game device and the content of the games to be played on the game device by downloading new games, applications and data via the network, for example. As will be described below, a terminal device can be used as an interface for communicating with other information processing devices via the network.

This application also describes various examples of first controller devices and methods involving, for example, the various game system configurations described above.

According to the systems and methods described herein, game processes are performed based on operations performed on a controller device including a touch panel and an inertia sensor, thus allowing for novel game operations.

These and other features, aspects and advantages will become more apparent from the following detailed description when taken in conjunction with the accompanying drawings.

BRIEF DESCRIPTION OF THE DRAWINGS

FIG. 14 is a diagram showing the screen of a television 2 and the example terminal device 7 in a first game example;

FIG. 15 is a diagram showing the screen of the television 2 and the example terminal device 7 in a second game example;

DETAILED DESCRIPTION OF EXAMPLE EMBODIMENTS

[1. General Configuration of Example Game System]

Figure 1:
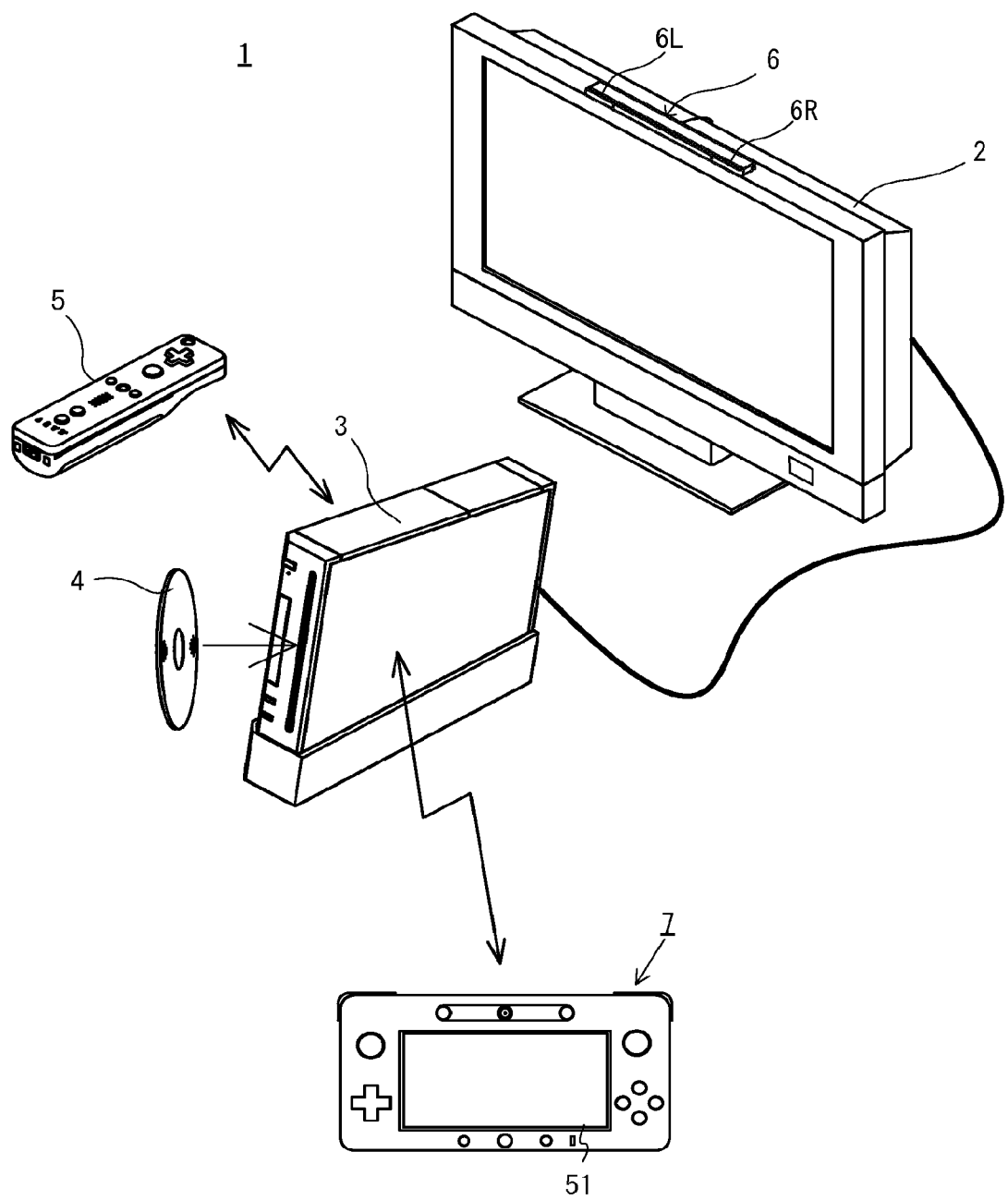
FIG. 1 is an external view of an example game system 1.

An example game system 1 will now be described with reference to the drawings. FIG. 1 is an external view of the game system 1. In FIG. 1, the game system 1 includes a non-portable display device (hereinafter referred to as a "television") 2 such as a television receiver, a home-console type game device 3, an optical disc 4, a controller 5, a marker device 6, and a terminal device 7. In the game system 1, the game device 3 performs game processes based on game operations performed using the controller 5, and game images obtained through the game processes are displayed on the television 2 and/or the terminal device 7.

In the game device 3, the optical disc 4 typifying an information storage medium used for the game device 3 in a replaceable manner is removably inserted. An information processing program (a game program, for example) to be executed by the game device 3 is stored in the optical disc 4. The game device 3 has, on the front surface thereof, an insertion opening for the optical disc 4. The game device 3 reads and executes the information processing program stored on the optical disc 4 which is inserted into the insertion opening, to perform the game processes.

The television 2 is connected to the game device 3 by a connecting cord. Game images obtained as a result of the game processes performed by the game device 3 are displayed on the television 2. The television 2 includes a speaker 2a (see FIG. 2), and the speaker 2a outputs game sounds obtained as a result of the game process. In alternative embodiments, the game device 3 and the non-portable display device may be an integral unit. Also, the communication between the game device 3 and the television 2 may be wireless communication.

The marker device 6 is provided along the periphery of the screen (on the upper side of the screen in FIG. 1) of the television 2. The user (player) can perform game operations by moving the controller 5, the details of which will be described below, and the marker device 6 is used by the game device 3 for calculating aspects of the position, the roll angle, etc., of the controller 5. The marker device 6 includes two markers 6R and 6L on opposite ends thereof. Specifically, a marker 6R (as well as the marker 6L) includes one or more infrared LEDs (Light Emitting Diodes), and emits infrared light in a forward direction from the television 2. The marker device 6 is connected to the game device 3 (by a wired or wireless connection), and the game device 3 is able to control the lighting of each infrared LED of the marker device 6. The marker device 6 is portable, and the user can arrange the marker device 6 at any position. While FIG. 1 shows an embodiment in which the marker device 6 is arranged on top of the television 2, the position and the direction of arranging the marker device 6 are not limited to this particular arrangement.

The controller 5 provides the game device 3 with operation data representing the content of operations performed on the controller itself. The controller 5 and the game device 3 can communicate with each other by wireless communication. In the present example embodiment, the wireless communication between the controller 5 and the game device 3 uses, for example, Bluetooth (Registered Trademark) technology. In other embodiments, the controller 5 and the game device 3 may be connected by a wired connection. While only one controller is included in the game system 1 in the present example embodiment, the game device 3 can communicate with a plurality of controllers, and a game can be played by multiple players by using a predetermined number of controllers (e.g., up to four) at the same time. The detailed configuration of the controller 5 will be described below.

The terminal device 7 is sized so that it can be held in one or both of the user's hands, and the user can hold and move the terminal device 7, or can use the terminal device 7 placed at an arbitrary position. The terminal device 7, whose detailed configuration will be described below, includes an LCD (Liquid Crystal Display) 51 as a display, input mechanisms (e.g., a touch panel 52), a gyrosensor 64, etc., to be described below. The terminal device 7 and the game device 3 can communicate with each other by a wireless connection (or by a wired connection). The terminal device 7 receives from the game device 3 data of images (e.g., game images) generated by the game device 3, and displays the images on the LCD 51. While an LCD is used as the display device in the present example embodiment, the terminal device 7 may include any other display device such as a display device utilizing EL (Electro Luminescence), for example. The terminal device 7 transmits operation data representing the content of operations performed on the terminal device itself to the game device 3.

[2. Internal Configuration of Example Game Device 3]

Figure 2:
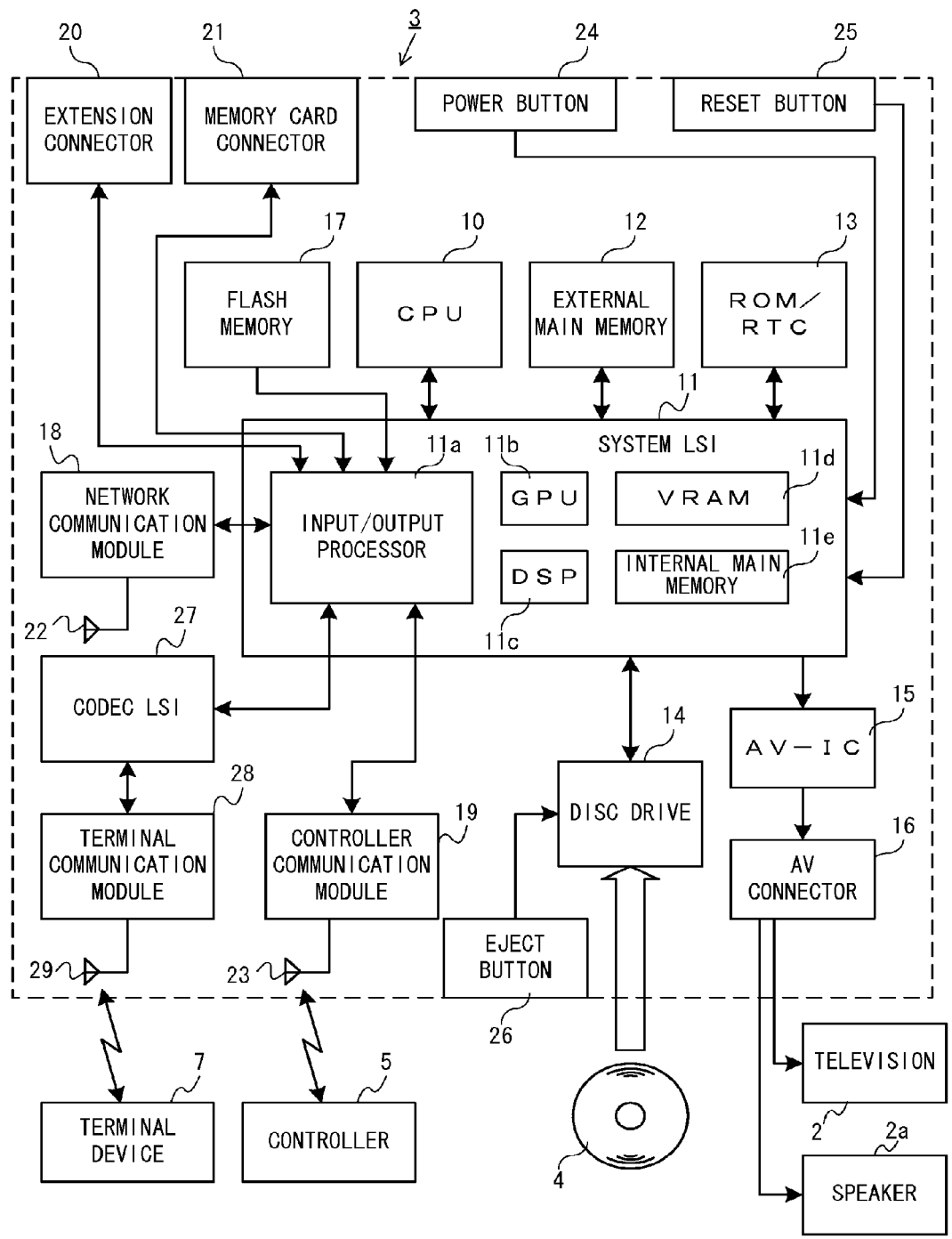
FIG. 2 is a block diagram showing an internal configuration of an example game device 3.

An internal configuration of the example game device 3 will be described with reference to FIG. 2. FIG. 2 is a block diagram illustrating an internal configuration of the game device 3. The game device 3 includes a CPU (Central Processing Unit) 10, a system LSI 11, an external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from a flash memory 17, and various data. The external main memory 12 is used as a work area and a buffer area for the CPU 10. The ROM/RTC 13 includes a ROM (a so-called boot ROM) incorporating a boot program for the game device 3, and a clock circuit (RTC: Real Time Clock) for counting time. The disc drive 14 reads program data, texture data, and the like from the optical disc 4, and writes the read data into an internal main memory 11*e* (to be described below) or the external main memory 12.

The system LSI 11 includes an input/output processor (I/O processor) 11*a*, a GPU (Graphics Processor Unit) 11*b*, a DSP (Digital Signal Processor) 11*c*, a VRAM (Video RAM) 11*d*, and the internal main memory 11*e*. Although not shown in the figures, these components 11*a* to 11*e* are connected with each other through an internal bus.

The GPU 11*b*, acting as a part of a rendering mechanism or engine, generates images in accordance with graphics commands (rendering commands) from the CPU 10. The VRAM 11*d* stores data (data such as polygon data and texture data) necessary for the GPU 11*b* to execute the graphics commands. When images are generated, the GPU 11*b* generates image data using data stored in the VRAM 11*d*. In the present example embodiment, the game device 3 generates both game images displayed on the television 2 and game images displayed on the terminal device 7. Hereinafter, for purposes of ease of reference and without limitation, the game images displayed on the television 2 may be referred to as the "television game images", and the game images displayed on the terminal device 7 may be referred to as the "terminal game images".

The DSP 11*c*, functioning as an audio processor, generates sound data using sound data and sound waveform (e.g., tone quality) data stored in one or both of the internal main memory 11*e* and the external main memory 12. In the present example embodiment, game sounds are outputted from the speaker(s) of the television 2 and game sounds are outputted from the speaker(s) of the terminal device 7. Hereinafter, for purposes of ease of reference and without limitation, the game sounds outputted from the television 2 may be referred to as a "television game sounds", and the game sounds outputted from the terminal device 7 may be referred to as a "terminal game sounds".

As described above, of the images and sounds generated in the game device 3, data of the images and sounds outputted from the television 2 is read out by the AV-IC 15. The AV-IC 15 outputs the read-out image data to the television 2 via an AV connector 16, and outputs the read-out sound data to the speaker 2*a* provided in the television 2. Thus, images are displayed on the television 2, and sounds are outputted from the speaker 2*a*.

Of the images and sounds generated in the game device 3, data of the images and sounds outputted from the terminal device 7 are transmitted to the terminal device 7 by an input/output processor 11*a*, etc. The data transmission to the terminal device 7 by the input/output processor 11*a*, or the like, will be described below.

The input/output processor 11*a* exchanges data with components connected thereto, and downloads data from an external device(s). The input/output processor 11*a* is connected to the flash memory 17, a network communication module 18, a controller communication module 19, an extension connector 20, a memory card connector 21, and a codec LSI 27. An antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 can be connected to a network such as the Internet to communicate with external information processing devices (e.g., other game devices, various servers, computers, etc.). That is, the input/output processor 11*a* can be connected to a network such as the Internet via the network communication module 18 and the antenna 22 to communicate with an external information processing device(s) connected to the network. The input/output processor 11a regularly accesses the flash memory 17, and detects the presence or absence of any data which needs to be transmitted to the network, and when detected, transmits the data to the network via the network communication module 18 and the antenna 22. Further, the input/output processor 11a receives data transmitted from an external information processing device and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game device 3 in addition to data exchanged between the game device 3 and an external information processing device. The flash memory 17 may also store a game program(s).

The game device 3 can receive operation data from the controller 5. That is, the input/output processor 11a receives operation data transmitted from the controller 5 via the antenna 23 and the controller communication module 19, and stores (temporarily) it in a buffer area of the internal main memory 11e or the external main memory 12.

The game device 3 can exchange data such as images and sounds with the terminal device 7. When transmitting game images (terminal game images) to the terminal device 7, the input/output processor 11a outputs data of game images generated by the GPU 11b to the codec LSI 27. The codec LSI 27 performs a predetermined compression process on the image data from the input/output processor 11a. The terminal communication module 28 wirelessly communicates with the terminal device 7. Therefore, image data compressed by the codec LSI 27 is transmitted by the terminal communication module 28 to the terminal device 7 via the antenna 29. In the present example embodiment, the image data transmitted from the game device 3 to the terminal device 7 is image data used in a game, and the playability of a game can be adversely influenced if there is a delay in the images displayed in the game. Therefore, it is preferred to eliminate delay as much as possible for the transmission of image data from the game device 3 to the terminal device 7. Therefore, in the present example embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

The game device 3 transmits sound data to the terminal device 7, in addition to image data. That is, the input/output processor 11a outputs sound data generated by the DSP 11c to the terminal communication module 28 via the codec LSI 27. The codec LSI 27 performs a compression process on sound data, as with image data. While the compression scheme for sound data may be any scheme, it is preferably a scheme with a high compression ratio and little sound deterioration. In other embodiments, the sound data may be transmitted uncompressed. The terminal communication module 28 transmits the compressed image data and sound data to the terminal device 7 via the antenna 29.

Moreover, the game device 3 transmits various control data to the terminal device 7 as necessary, in addition to the image data and the sound data. Control data is data representing control instructions for components of the terminal device 7, and represents, for example, an instruction for controlling the lighting of a marker section (a marker section 55 shown in FIG. 10), an instruction for controlling the image-capturing operation of a camera (a camera 56 shown in FIG. 10), etc. The input/output processor 11a transmits control data to the terminal device 7 in response to an instruction of the CPU 10. While the codec LSI 27 does not perform a data compression process in the present example embodiment for the control data, it may perform a compression process in other embodiments. The above-described data transmitted from the game device 3 to the terminal device 7 may be encrypted as necessary or may not be encrypted.

The game device 3 can receive various data from the terminal device 7. In the present example embodiment, the terminal device 7 transmits operation data, image data and sound data, the details of which will be described below. Data transmitted from the terminal device 7 are received by the terminal communication module 28 via the antenna 29. The image data and the sound data from the terminal device 7 are subjected to a compression process similar to that on the image data and the sound data from the game device 3 to the terminal device 7. Therefore, these image data and sound data are sent from the terminal communication module 28 to the codec LSI 27, and subjected to an expansion (decompression) process by the codec LSI 27 to be outputted to the input/output processor 11a. On the other hand, the operation data from the terminal device 7 may not be subjected to a compression process since the amount of data is small as compared with images and sounds. It may be encrypted as necessary, or it may not be encrypted. After being received by the terminal communication module 28, the operation data is outputted to the input/output processor 11a via the codec LSI 27. The input/output processor 11a stores (temporarily) data received from the terminal device 7 in a buffer area of the internal main memory 11e or the external main memory 12.

The game device 3 can be connected to another device or an external storage medium. That is, the input/output processor 11a is connected to the extension connector 20 and the memory card connector 21. The extension connector 20 is a connector for an interface, such as a USB or SCSI interface. The extension connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the extension connector 20 or the memory card connector 21 to store data in the external storage medium or read data from the external storage medium.

The game device 3 includes a power button 24, a reset button 25, and an eject button 26. The power button 24 and the reset button 25 are connected to the system LSI 11. When the power button 24 is on, power is supplied to the components of the game device 3 from an external power supply through an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

In other embodiments, some of the components of the game device 3 may be provided as extension devices separate from the game device 3. In this case, an extension device may be connected to the game device 3 via the extension connector 20, for example. Specifically, an extension device may include components of the codec LSI 27, the terminal communication module 28 and the antenna 29, for example, and can be attached/detached to/from the extension connector 20. Thus, by connecting the extension device to a game device which does not include the above components, the game device can communicate with the terminal device 7.

[3. Configuration of Example Controller 5]

Figure 3:
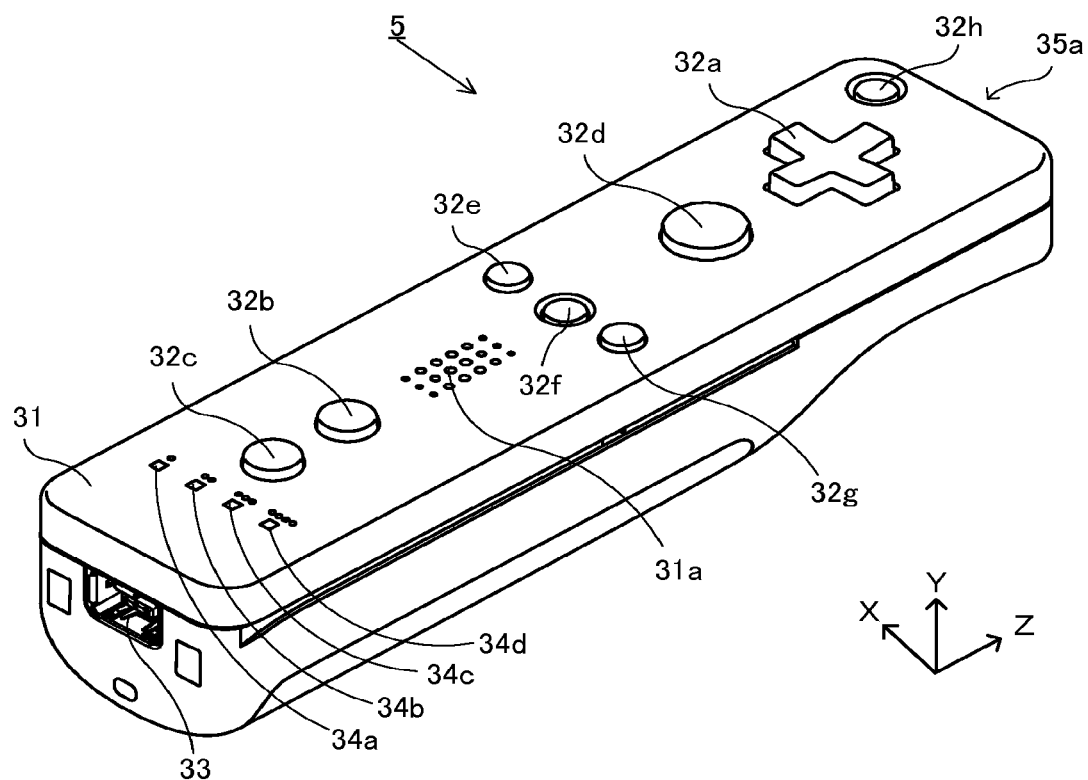
FIG. 3 is one perspective view showing an external configuration of an example controller 5.
Figure 4:
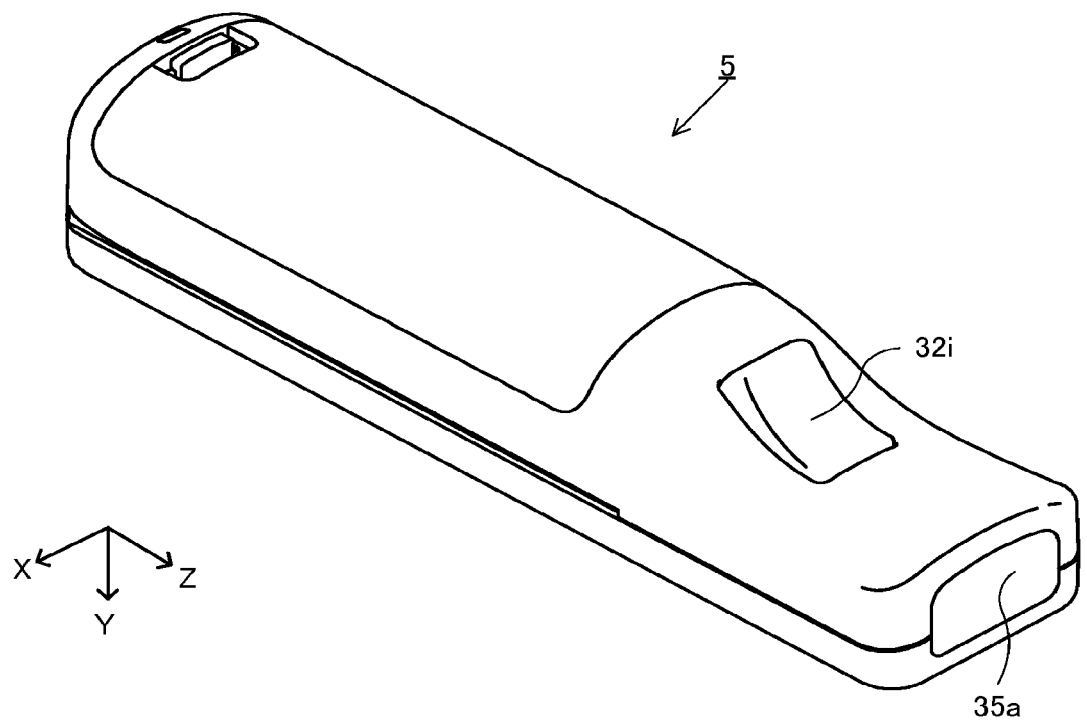
FIG. 4 is another perspective view showing an external configuration of the example controller 5.

Next, with reference to FIGS. 3 to 7, the controller 5 will be described. FIG. 3 is one perspective view illustrating an external configuration of the controller 5. FIG. 4 is another perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIGS. 3 and 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or a child. A user can perform game operations by pressing buttons provided on the controller 5, and by moving the controller 5 itself to change the position and the orientation thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present specification, for purposes of ease of reference and without limitation, the top surface of the housing 31 on which the buttons 32a to 32h are provided may be referred to as a "button surface". As shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game device 3. Further, the power button 32h is used to remotely turn ON/OFF the game device 3. The home button 32f and the power button 32h each have the top surface thereof recessed below the top surface of the housing 31. Therefore, the likelihood of the home button 32f and the power button 32h being inadvertently pressed by the user is reduced.

On the rear surface of the housing 31, the connector 33 is provided. The connector 33 is used for connecting another device (e.g., another sensor unit or another controller) to the controller 5. Both sides of the connector 33 on the rear surface of the housing 31 have a fastening hole 33a (see FIG. 6) for preventing easy inadvertent disengagement of a device connected to the controller 5 as described above.

In the rear-side portion of the top surface of the housing 31, a plurality (four in FIG. 3) of LEDs 34a to 34d are provided. The controller 5 is assigned a controller type (number) so as to be distinguishable from other controllers. The LEDs 34a to 34d are each used for informing the user of the controller type which is currently set for the controller 5, and for informing the user of the battery level of the controller 5, for example. Specifically, when game operations are performed using the controller 5, one of the plurality of LEDs 34a to 34d corresponding to the controller type is lit up.

The controller 5 has an image capturing/processing section 35 (FIG. 6), and a light incident surface 35a of the image capturing/processing section 35 is provided on the front surface of the housing 31, as shown in FIG. 4. The light incident surface 35a is made of a material transmitting therethrough at least infrared light from the markers 6R and 6L.

On the top surface of the housing 31, sound holes 31a for externally outputting a sound from a speaker 49 (see FIG. 5) provided in the controller 5 are provided between the first button 32b and the home button 32f.

Figure 5:
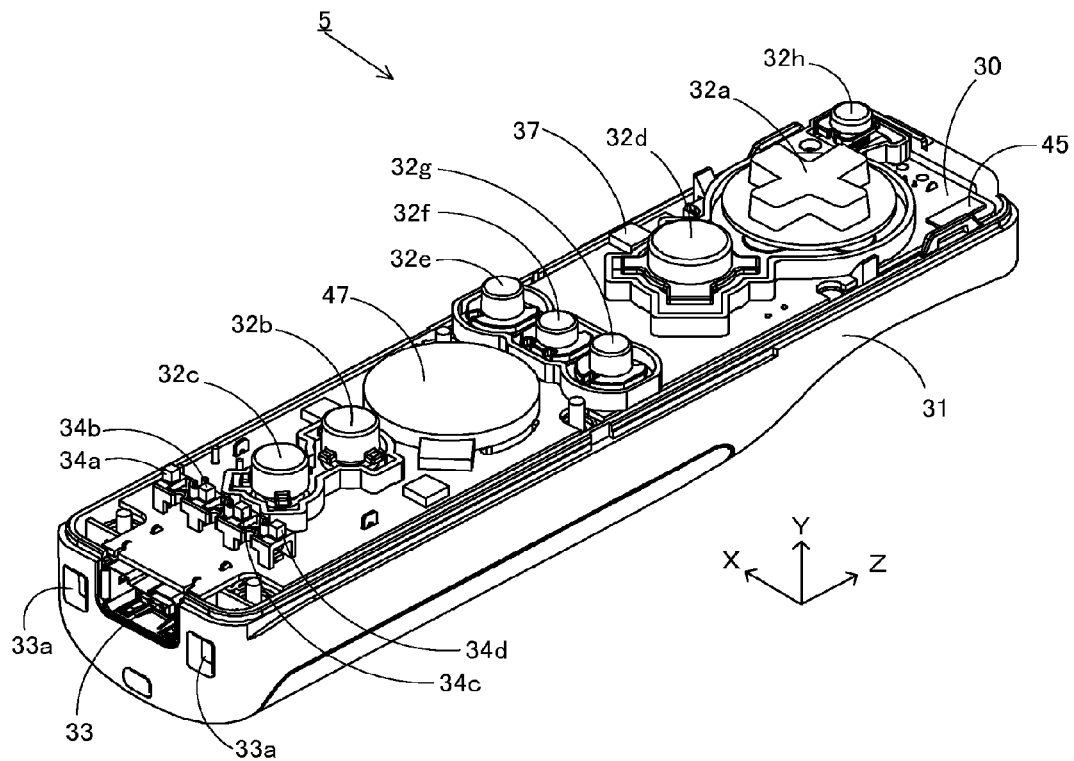
FIG. 5 is one diagram showing an internal configuration of the example controller 5.
Figure 6:
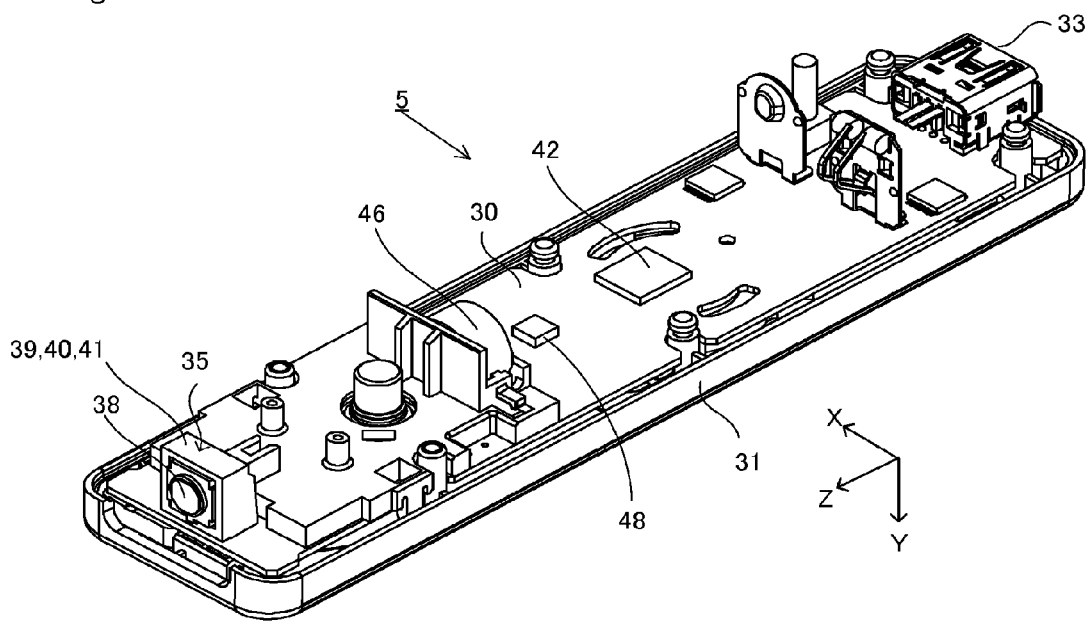
FIG. 6 is another diagram showing an internal configuration of the example controller 5.

Next, with reference to FIGS. 5 and 6, an internal structure of the controller 5 will be described. FIGS. 5 and 6 are diagrams illustrating the internal structure of the controller 5. FIG. 5 is a perspective view illustrating a state in which an upper casing (a part of the housing 31) of the controller 5 is removed. FIG. 6 is a perspective view illustrating a state in which a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a to 34d, an acceleration sensor 37, an antenna 45, the speaker 49, and the like are provided. These elements are connected to a microcomputer 42 (see FIG. 6) via lines (not shown) formed on the substrate 30 and the like. In the present example embodiment, the acceleration sensor 37 is provided at a position offset from the center of the controller 5 with respect to the X-axis direction. Thus, calculation of the movement of the controller 5 being rotated about the Z-axis is facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

As shown in FIG. 6, at a front edge of a bottom main surface of the substrate 30, the image capturing/processing section 35 is provided. The image capturing/processing section 35 includes an infrared filter 38, a lens 39, an image capturing element 40 and an image processing circuit 41 located in this order from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present example embodiment, the vibrator 46 is disposed slightly toward the front of the housing 31. That is, the vibrator 46 is positioned offset from the center toward the end of the controller 5 so that the vibration of the vibrator 46 greatly vibrates the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

The shape of the controller 5, the shape of each operation button, the number and the positions of acceleration sensors and vibrators, and so on, shown in FIGS. 3 to 6 are merely illustrative, and the systems and methods described herein can be realized with controllers having other shapes, numbers, and positions. Further, although in the present example embodiment the image-capturing direction of the image-capturing section is the Z-axis positive direction, the image-capturing direction may be any direction. That is, the position of the image capturing/processing section 35 (the light incident surface 35a of the image capturing/processing section 35) in the controller 5 may not be on the front surface of the housing 31, but may be on any other surface on which light can be received from the outside of the housing 31.

Figure 7:
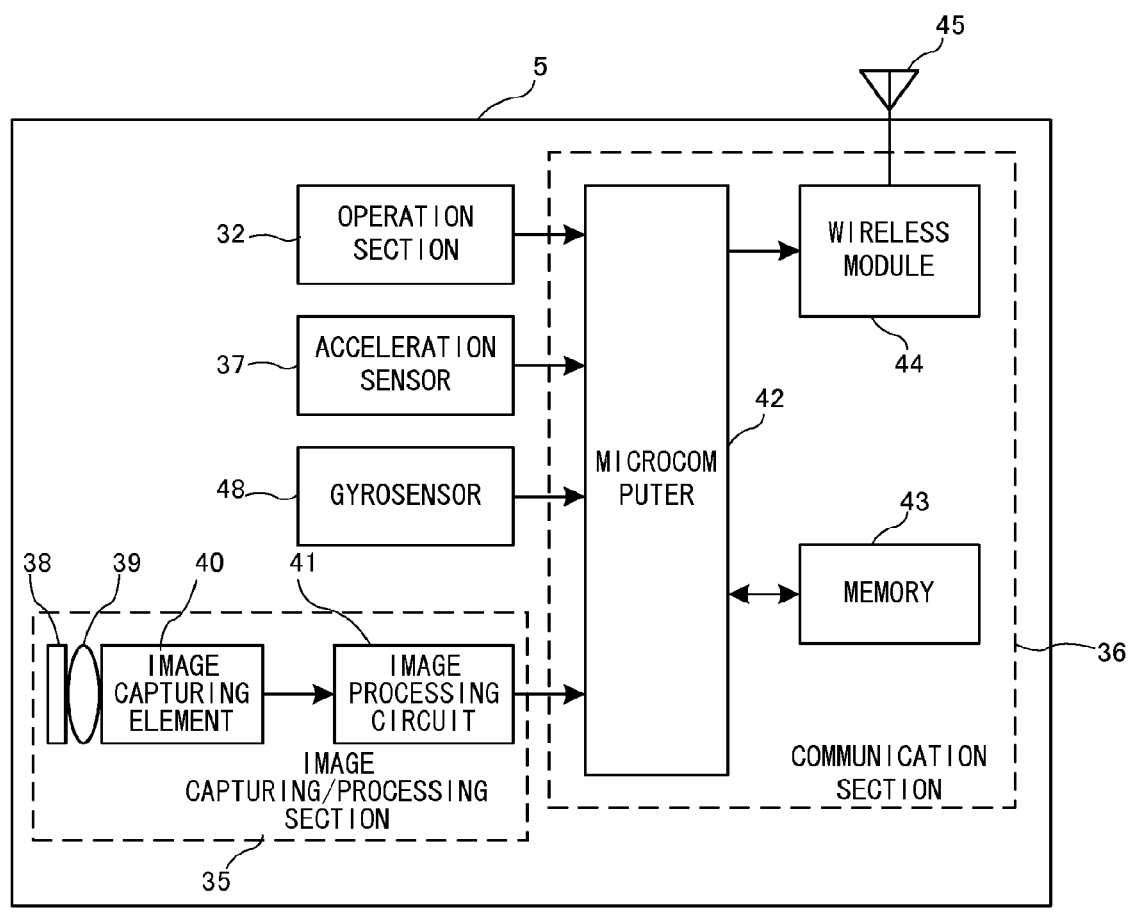
FIG. 7 is a block diagram showing a configuration of the example controller 5.

FIG. 7 is a block diagram illustrating a configuration of the controller 5. The controller 5 includes an operation section 32 (the operation buttons 32a to 32i), the image capturing/processing section 35, a communication section 36, the acceleration sensor 37, and a gyrosensor 48. The controller 5 transmits to the game device 3, as operation data, data representing the content of operations performed on the controller itself. Hereinafter, for purposes of ease of reference and without limitation, the operation data transmitted by the controller 5 may be referred to as the "controller operation data", and the operation data transmitted by the terminal device 7 may be referred to as the "terminal operation data".

The operation section 32 includes the operation buttons 32a to 32i described above, and outputs, to the microcomputer 42 of the communication section 36, operation button data indicating the input status of the operation buttons 32a to 32i (e.g., whether or not the operation buttons 32a to 32i are pressed).

The image capturing/processing section 35 is a system for analyzing image data captured by the image-capturing element and calculating the centroid, the size, etc., of an area(s) having a high brightness in the image data. The image capturing/processing section 35 has a maximum sampling period of, for example, about 200 frames/sec., and therefore can trace and analyze even relatively fast motion of the controller 5.

The image capturing/processing section 35 includes the infrared filter 38, the lens 39, the image capturing element 40 and the image processing circuit 41. The infrared filter 38 transmits therethrough only infrared light included in the light incident on the front surface of the controller 5. The lens 39 collects the infrared light transmitted through the infrared filter 38 so that it is incident on the image capturing element 40. The image capturing element 40 is a solid-state image-capturing device such as, for example, a CMOS sensor or a CCD sensor, which receives the infrared light collected by the lens 39, and outputs an image signal. The marker section 55 of the terminal device 7 and the marker device 6 of which images are captured are formed by markers outputting infrared light. Therefore, the provision of the infrared filter 38 enables the image capturing element 40 to receive only the infrared light transmitted through the infrared filter 38 and generate image data, so that an image of the image-capturing object (e.g., the markers of the marker section 55 and/or the marker device 6) can be captured more accurately. Hereinafter, the image taken by the image capturing element 40 is referred to as a captured image. The image data generated by the image capturing element 40 is processed by the image processing circuit 41. The image processing circuit 41 calculates the positions of the image-capturing objects within the captured image. The image processing circuit 41 outputs coordinates of the calculated positions, to the microcomputer 42 of the communication section 36. The data representing the coordinates is transmitted as operation data to the game device 3 by the microcomputer 42. Hereinafter, for purposes of ease of reference and without limitation, the coordinates are referred to as "marker coordinates". The marker coordinates change depending on the roll orientation (roll angle about the z axis) and/or aspects of the position of the controller 5 itself, and therefore the game device 3 can calculate, for example, the roll angle and aspects of the position of the controller 5 using the marker coordinates.

In other embodiments, the controller 5 may not include the image processing circuit 41, and the captured image itself may be transmitted from the controller 5 to the game device 3. In this case, the game device 3 may have a circuit or a program, having the same function as the image processing circuit 41, for calculating the marker coordinates.

The acceleration sensor 37 detects accelerations (including gravitational acceleration) of the controller 5, that is, force (including gravity) applied to the controller 5. The acceleration sensor 37 detects a value of a portion of acceleration (linear acceleration) that is applied to the detection section of the acceleration sensor 37 in the straight line direction along the sensing axis direction, among all the acceleration applied to the detection section of the acceleration sensor 37. For example, a multi-axis acceleration sensor having two or more axes detects acceleration components along the axes, as the acceleration applied to the detection section of the acceleration sensor. While the acceleration sensor 37 is assumed to be an electrostatic capacitance type MEMS (Micro Electro Mechanical System) acceleration sensor, other types of acceleration sensors may be used.

In the present example embodiment, the acceleration sensor 37 detects linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. The acceleration detected by the acceleration sensor 37 changes depending on aspects of the orientation and movement of the controller 5 itself, and therefore the game device 3 is capable of calculating aspects of the orientation and movement of the controller 5 using the obtained acceleration data. In the present example embodiment, the game device 3 calculates the attitude, the roll angle, etc., of the controller 5 based on the obtained acceleration data.

One skilled in the art will readily understand from the description herein that additional information relating to the controller 5 can be estimated or calculated (determined) through a process by a computer, such as a processor (for example, the CPU 10) of the game device 3 or a processor (for example, the microcomputer 42) of the controller 5, based on an acceleration signal outputted from the acceleration sensor 37 (this applies also to an acceleration sensor 63 to be described below). For example, in the case in which the computer performs a process on the premise that the controller 5 including the acceleration sensor 37 is in a static state (that is, in the case in which the process is performed on the premise that the acceleration to be detected by the acceleration sensor includes only the gravitational acceleration), when the controller 5 is actually in a static state, it is possible to determine whether or not, or how much the controller 5 is tilting relative to the direction of gravity, based on the detected acceleration. Specifically, when the state in which the detection axis of the acceleration sensor 37 faces vertically downward is used as a reference, whether or not the controller 5 is tilting relative to the reference can be determined based on whether or not 1 G (gravitational acceleration) is present, and the degree of tilt of the controller 5 relative to the reference can be determined based on the magnitude thereof. Further, with the multi-axis acceleration sensor 37, it is possible to more specifically determine the degree of tilt of the controller 5 relative to the direction of gravity by performing a process on the acceleration signals of different axes. In this case, the processor may calculate, based on the output from the acceleration sensor 37, the tilt angle of the controller 5, or the tilt direction of the controller 5 without calculating the tilt angle. Thus, by using the acceleration sensor 37 in combination with the processor, it is possible to determine the tilt angle or the attitude of the controller 5.

On the other hand, when it is premised that the controller 5 is in dynamic state (in which the controller 5 is being moved), the acceleration sensor 37 detects the acceleration based on the movement of the controller 5, in addition to the gravitational acceleration, and it is therefore possible to determine the movement direction of the controller 5 by removing the gravitational acceleration component from the detected acceleration through a predetermined process. Even when it is premised that the controller 5 is in dynamic state, it is possible to determine the tilt of the controller 5 relative to the direction of gravity by removing the acceleration component based on the movement of the acceleration sensor from the detected acceleration through a predetermined process. In other embodiments, the acceleration sensor 37 may include an embedded processor or other type of dedicated processor for performing a predetermined process on an acceleration signal detected by the built-in acceleration detector before the acceleration signal is outputted to the microcomputer 42. For example, when the acceleration sensor 37 is used to detect static acceleration (for example, gravitational acceleration), the embedded or dedicated processor may convert the acceleration signal to a tilt angle(s) (or another preferred parameter).

The gyrosensor 48 detects angular velocities about three axes (the X, Y and Z axes in the present example embodiment). In the present specification, with respect to the image-capturing direction (the Z-axis positive direction) of the controller 5, the rotation direction about the X axis is referred to as the pitch direction, the rotation direction about the Y axis as the yaw direction, and the rotation direction about the Z axis as the roll direction. The number and combination of gyrosensors to be used are not limited to any particular number and combination as long as the gyrosensor 48 can detect angular velocities about three axes. For example, the gyrosensor 48 may be a 3-axis gyrosensor, or angular velocities about three axes may be detected by combining together a 2-axis gyrosensor and a 1-axis gyrosensor. Data representing the angular velocity detected by the gyrosensor 48 is outputted to the communication section 36. The gyrosensor 48 may be a gyrosensor that detects an angular velocity or velocities about one axis or two axes.

The communication section 36 includes the microcomputer 42, a memory 43, the wireless module 44 and the antenna 45. The microcomputer 42 controls the wireless module 44 for wirelessly transmitting, to the game device 3, data acquired by the microcomputer 42 while using the memory 43 as a storage area in the process.

Data outputted from the operation section 32, the image capturing/processing section 35, the acceleration sensor 37 and the gyrosensor 48 to the microcomputer 42 are temporarily stored in the memory 43. The data are transmitted as the operation data (controller operation data) to the game device 3. At the time of the transmission to the controller communication module 19 of the game device 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game device 3 receives the low power radio wave signal. The game device 3 demodulates or decodes the received low power radio wave signal to obtain the operation data. Based on the obtained operation data, the CPU 10 of the game device 3 performs the game processes. Note that while the wireless transmission from the communication section 36 to the controller communication module 19 is sequentially performed with a predetermined cycle, since the game process is generally performed with a cycle of 1/60 sec (as one frame period), the transmission is preferably performed with a cycle less than or equal to this period. The communication section 36 of the controller 5 outputs, to the controller communication module 19 of the game device 3, the operation data at a rate of once per 1/200 sec, for example.

As described above, as operation data representing operations performed on the controller itself, the controller 5 can transmit marker coordinate data, acceleration data, angular velocity data, and operation button data. The game device 3 performs the game processes using the operation data as game inputs. Therefore, by using the controller 5, the user can perform game operations of moving the controller 5 itself, in addition to the conventional typical game operations of pressing the operation buttons. For example, it enables an operation of tilting the controller 5 to an intended attitude, an operation of specifying an intended position on the screen with the controller 5, an operation of moving the controller 5 itself, etc.

While the controller 5 does not include a display for displaying game images in the present example embodiment, it may include a display for displaying, for example, an image representing the battery level, etc.

[4. Configuration of Example Terminal Device 7]

Figure 8:
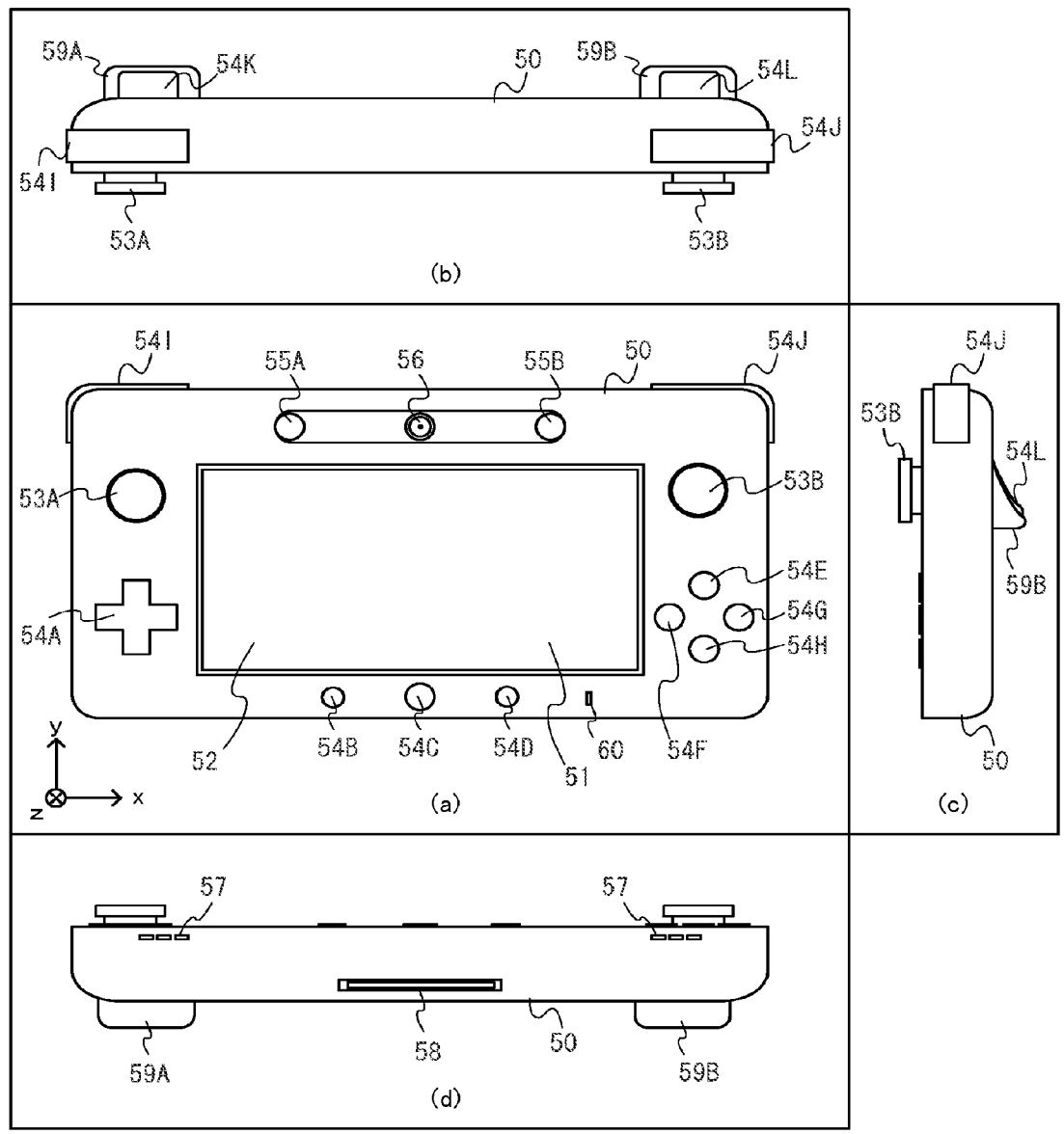
FIGS. 8(a)-8(d) are diagrams showing an external configuration of an example terminal device 7.
Figure 9:
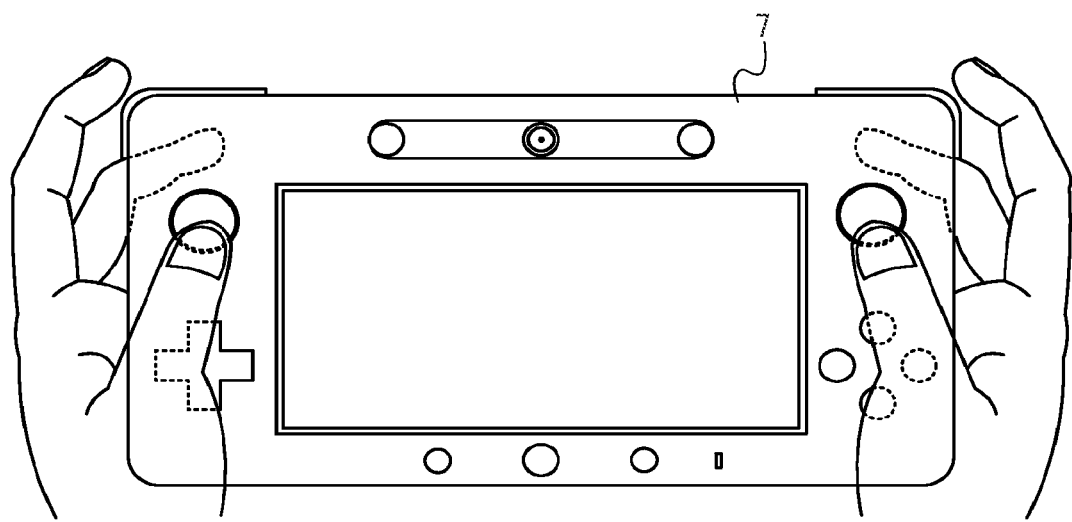
FIG. 9 is a diagram showing the example terminal device 7 being held by the user.
Figure 10:
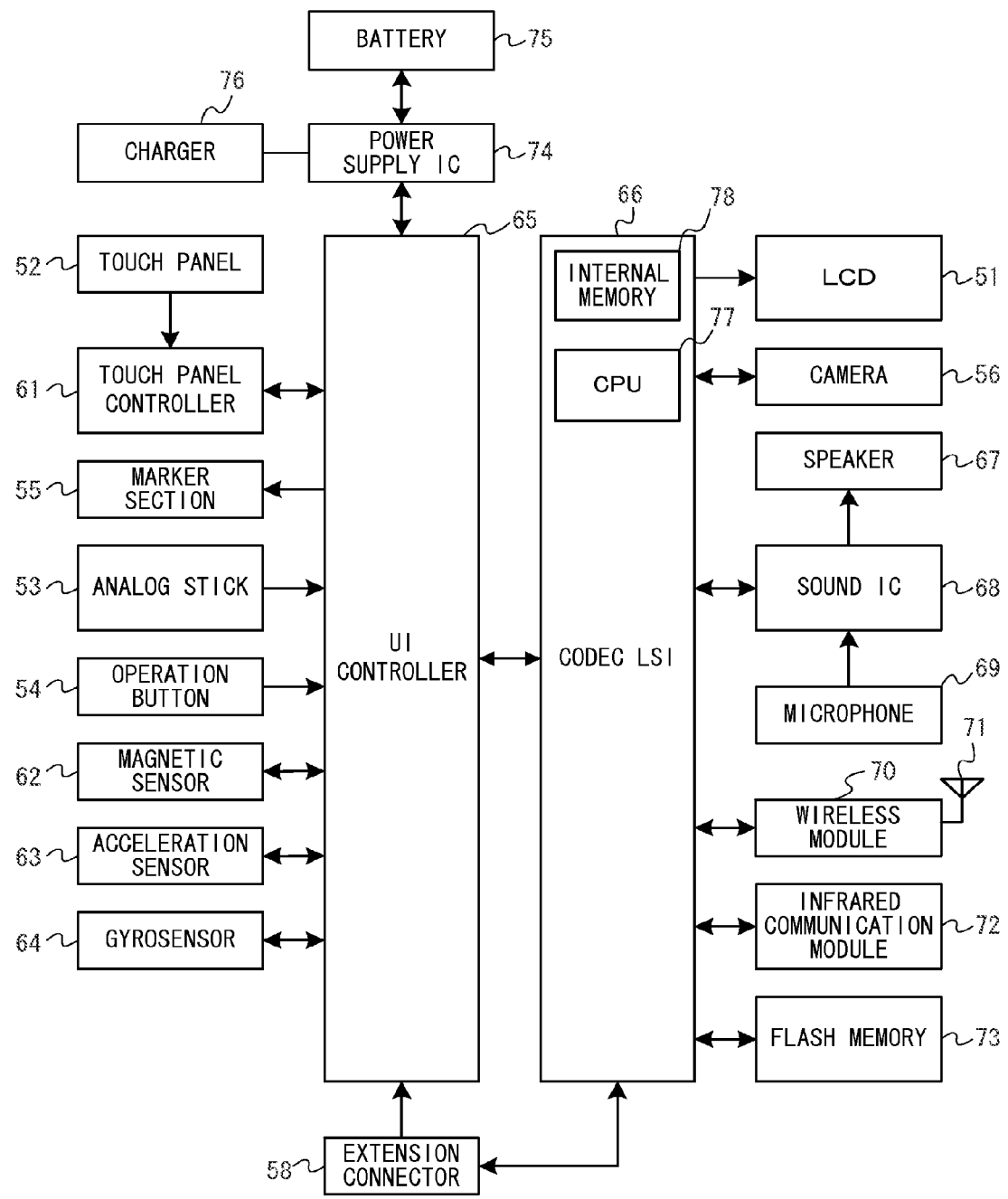
FIG. 10 is a block diagram showing an internal configuration of the example terminal device 7.

Next, a configuration of the terminal device 7 will be described with reference to FIGS. 8 to 10. FIG. 8(a) is a front view of the terminal device 7, FIG. 8(b) is a top view thereof, FIG. 8(c) is a right side view thereof, and FIG. 8(d) is a bottom view thereof. FIG. 9 is a diagram showing the terminal device 7 being held by the user.

As shown in FIG. 8, the terminal device 7 includes a housing 50 generally in a horizontally-elongated rectangular plate shape. The housing 50 is sized so that it can be held by the user. Thus, the user can hold and move the terminal device 7, and can change the position in which the terminal device 7 is placed.

The terminal device 7 includes the LCD 51 on the surface of the housing 50. The LCD 51 is provided near the center of the surface of the housing 50. Therefore, the user can hold and move the terminal device while looking at the screen of the LCD 51 by holding opposing end portions of the housing 50 with respect to the LCD 51, as shown in FIG. 9. While FIG. 9 shows an example in which the user holds the terminal device 7 in a horizontal position (in a horizontally-oriented direction) by holding left and right opposing end portions of the housing 50 with respect to the LCD 51, the user can hold the terminal device 7 in a vertical position (in a vertically-oriented direction).

As shown in FIG. 8(a), the terminal device 7 includes the touch panel 52 on the screen of the LCD 51 as an operation mechanism. In the present example embodiment, the touch panel 52 is a resistive-type touch panel. However, the touch panel is not limited to the resistive type, and may be a touch panel of any type including, for example, a capacitive type, etc. The touch panel 52 may be of a single-touch type or a multi-touch type. In the present example embodiment, a touch panel having the same resolution (detection precision) as the resolution of the LCD 51 is used as the touch panel 52. However the resolution of the touch panel 52 does not always need to coincide with the resolution of the LCD 51. While a stylus is usually used for making inputs on the touch panel 52, the systems and methods described herein are not limited to using a stylus, and an input may be made on the touch panel 52 with a finger of the user. Housing 50 may be provided with a hole for accommodating a stylus used for performing operations on the touch panel 52. Thus, since the terminal device 7 includes the touch panel 52, the user can operate the touch panel 52 while moving the terminal device 7. That is, the user can move the screen of the LCD 51 while directly (by means of the touch panel 52) making an input on the screen.

As shown in FIG. 8, the terminal device 7 includes two analog sticks 53A and 53B and a plurality of buttons 54A to 54L, as operation mechanisms. The analog sticks 53A and 53B are each a direction-specifying device. The analog sticks 53A and 53B are each configured so that the stick portion operated with a finger of the user can be slid or tilted in any direction (at any angle in the up, down, left, right and diagonal directions) with respect to the surface of the housing 50. The left analog stick 53A is provided on the left side of the screen of the LCD 51, and the right analog stick 53B is provided on the right side of the screen of the LCD 51. Therefore, the user can make a direction-specifying input by using an analog stick with either the left or the right hand. As shown in FIG. 9, the analog sticks 53A and 53B are provided at such positions that the user can operate them while holding the left and right portions of the terminal device 7, and therefore the user can easily operate the analog sticks 53A and 53B even when holding and moving the terminal device 7.

The buttons 54A to 54L are each operation mechanisms for making predetermined inputs. As will be discussed below, the buttons 54A to 54L are provided at such positions that the user can operate them while holding the left and right portions of the terminal device 7 (see FIG. 9). Therefore, the user can easily operate these operation mechanisms even when holding and moving the terminal device 7.

As shown in FIG. 8(a), the cross button (direction-input button) 54A and the buttons 54B to 54H, of the operation buttons 54A to 54L, are provided on the front surface of the housing 50. That is, these buttons 54A to 54H are provided at positions at which they can be operated by the thumbs of the user (see FIG. 9).

The cross button 54A is provided on the left side of the LCD 51 and under the left analog stick 53A. That is, the cross button 54A is provided at such a position that it can be operated with the left hand of the user. The cross button 54A has a cross shape, and is a button with which it is possible to specify up, down, left and right directions. The buttons 54B to 54D are provided on the lower side of the LCD 51. These three buttons 54B to 54D are provided at positions at which they can be operated with either the left or the right hand. The four buttons 54E to 54H are provided on the right side of the LCD 51 and under the right analog stick 53B. That is, the four buttons 54E to 54H are provided at positions at which they can be operated with the right hand of the user. Moreover, the four buttons 54E to 54H are provided on the upper, lower, left and right side (of the center position among the four buttons 54E to 54H). Therefore, with the terminal device 7, the four buttons 54E to 54H can also serve as buttons with which the user specifies the up, down, left and right directions.

As shown in FIGS. 8(a), 8(b) and 8(c), the first L button 54I and the first R button 54J are provided in upper corner portions of the housing 50 (the upper left portion and the upper right portion). Specifically, the first L button 54I is provided at the left end of the upper side surface of the plate-like housing 50 so that it is exposed on the upper and left side surfaces. The first R button 54J is provided at the right end of the upper side surface of the housing 50 so that it is exposed on the upper and right side surfaces. Thus, the first L button 54I is provided at a position at which it can be operated with the left index finger of the user, and the first R button 54J is provided at a position at which it can be operated with the right index finger of the user (see FIG. 9).

As shown in FIGS. 8(b) and 8(c), the second L button 54K and the second R button 54L are provided on leg portions 59A and 59B protruding from the back surface of the plate-like housing 50 (i.e., the surface opposite to the front surface where the LCD 51 is provided). Specifically, the second L button 54K is provided slightly toward the upper side in the left portion (the left portion as viewed from the front surface side) of the back surface of the housing 50, and the second R button 54L is provided slightly toward the upper side in the right portion (the right portion as viewed from the front surface side) of the back surface of the housing 50. In other words, the second L button 54K is provided generally on the reverse side of the left analog stick 53A provided on the front surface, and the second R button 54L is provided generally on the reverse side of the right analog stick 53B provided on the front surface. Thus, the second L button 54K is provided at a position at which it can be operated with the left middle finger of the user, and the second R button 54L is provided at a position at which it can be operated with the right middle finger of the user (see FIG. 9). The second L button 54K and the second R button 54L are provided on the diagonally-upwardly-facing surfaces of the leg portions 59A and 59B, and have diagonally-upwardly-facing button surfaces, as shown in FIG. 8(c). It is believed that the middle fingers will generally move in the up/down direction when the user holds the terminal device 7, and it will be easier for the user to press the second L button 54K and the second R button 54L if the button surfaces are facing upward. The provision of the leg portions on the back surface of the housing 50 makes it easier for the user to hold the housing 50, and the provision of the buttons on the leg portions makes it easier for the user to perform input operations while holding the housing 50.

With the terminal device 7 shown in FIG. 8, since the second L button 54K and the second R button 54L are provided on the back surface, when the terminal device 7 is put down with the screen of the LCD 51 (the front surface of the housing 50) facing up, the screen may not lie completely horizontal. Therefore, in other embodiments, three or more leg portions may be provided on the back surface of the housing 50. Then, it can be put down on the floor surface (or other horizontal surface such as a table, desk, etc.) with the leg portions in contact with the floor surface with the screen of the LCD 51 facing up, and it is therefore possible to put down the terminal device 7 so that the screen lies horizontal (or substantially horizontal). A detatchable, rotatable or retractable leg portion may be added so that the terminal device 7 can be put down horizontally (or substantially horizontally).

The buttons 54A to 54L are each assigned a function in accordance with the game program. For example, the cross button 54A and the buttons 54E to 54H may be used for direction-specifying operations, selection operations, etc., whereas the buttons 54B to 54E may be used for OK button operations, cancel button operations, etc.

Although not shown in the figures, the terminal device 7 may include a power button for turning ON/OFF the power of the terminal device 7. The terminal device 7 may include a button for turning ON/OFF the display of the screen of the LCD 51, a button for performing a connection setting (pairing) with the game device 3, and a button for adjusting the volume of the speaker (a speaker 67 shown in FIG. 10).

As shown in FIG. 8(a), the terminal device 7 includes a marker section including a marker 55A and a marker 55B (the marker section 55 shown in FIG. 10) on the front surface of the housing 50. The marker section 55 is provided on the upper side of the LCD 51, although the marker section 55 may be provided elsewhere if desired. The marker 55A and the marker 55B are each formed by one or more infrared LEDs, as are the markers 6R and 6L of the marker device 6. The marker section 55 is used for the game device 3 to calculate the movement, etc., of the controller 5, as is the marker device 6 described above. The game device 3 can control the lighting of the infrared LEDs of the marker section 55.

The terminal device 7 includes the camera 56 as an image-capturing device. The camera 56 includes an image-capturing element (e.g., a CCD image sensor, a CMOS image sensor, or the like) having a predetermined resolution, and a lens. As shown in FIG. 8, the camera 56 is provided on the front surface of the housing 50 in the present example embodiment. Therefore, the camera 56 can capture an image of the face of the user holding the terminal device 7, and can capture an image of the user playing a game while looking at the LCD 51, for example. One or more additional cameras (not shown) may be provided on the front and/or back surfaces of terminal device 7.

The terminal device 7 includes a microphone (a microphone 69 shown in FIG. 10) as a sound input device. A microphone hole 60 is provided on the front surface of the housing 50. The microphone 69 is provided inside the housing 50 behind the microphone hole 60. The microphone detects sounds around the terminal device 7 such as the voice of the user. One or more additional microphones (not shown) may be provided on the front and/or back surfaces of terminal device 7.

The terminal device 7 includes a speaker (the speaker 67 shown in FIG. 10) as a sound outputting device. As shown in FIG. 8(d), speaker holes 57 are provided on the lower side surface of the housing 50. The output sounds from the speaker 67 are outputted from the speaker holes 57. In the present example embodiment, the terminal device 7 includes two speakers, and the speaker holes 57 are provided at the respective positions of each of the left speaker and the right speaker. Additional speakers (not shown) may be provided on the front and/or back surfaces of terminal device 7.

The terminal device 7 includes an extension connector 58 via which another device can be connected to the terminal device 7. In the present example embodiment, the extension connector 58 is provided on the lower side surface of the housing 50 as shown in FIG. 8(d). The device connected to the extension connector 58 may be any device, and may be, for example, a game-specific controller (gun-shaped controller, etc.) or an input device such as a keyboard. The extension connector 58 may be omitted if there is no need to connect other devices to terminal device 7.

With the terminal device 7 shown in FIG. 8, the shape of each operation button, the shape of the housing 50, the number and the positions of the components, etc., are merely illustrative, and the systems and methods described herein can be realized with other shapes, numbers, and positions.

Next, an internal configuration of the terminal device 7 will be described with reference to FIG. 10. FIG. 10 is a block diagram showing an internal configuration of the terminal device 7. As shown in FIG. 10, in addition to the configuration shown in FIG. 8, the terminal device 7 includes a touch panel controller 61, a magnetic sensor 62, the acceleration sensor 63, the gyrosensor 64, a user interface controller (UI controller) 65, a codec LSI 66, the speaker 67, a sound IC 68, the microphone 69, a wireless module 70, an antenna 71, an infrared communication module 72, a flash memory 73, a power supply IC 74, and a battery 75. These electronic components are mounted on an electronic circuit board (or multiple electronic circuit boards) and accommodated in the housing 50.

The UI controller 65 is a circuit for controlling the input/output of data to/from various types of input/output sections. The UI controller 65 is connected to the touch panel controller 61, an analog stick 53 (the analog sticks 53A and 53B), an operation button 54 (the operation buttons 54A to 54L), the marker section 55, the magnetic sensor 62, the acceleration sensor 63, and the gyrosensor 64. The UI controller 65 is connected to the codec LSI 66 and the extension connector 58. The power supply IC 74 is connected to the UI controller 65, and power is supplied to various sections via the UI controller 65. The built-in battery 75 is connected to the power supply IC 74 to supply power. A charger 76 or a cable with which power can be obtained from an external power source can be connected to the power supply IC 74 via a connector, or the like, and the terminal device 7 can receive power supply from or be charged by an external power source using the charger 76 or the cable. Terminal device 7 may be charged by attaching the terminal device 7 to a cradle (not shown) having a charging function.

The touch panel controller 61 is a circuit connected to the touch panel 52 for controlling the touch panel 52. The touch panel controller 61 generates touch position data of a predetermined format based on signals from the touch panel 52, and outputs it to the UI controller 65. The touch position data represents, for example, the coordinates of a position (or positions in the case of a multi-touch panel) on the input surface of the touch panel 52 at which an input is made. The touch panel controller 61 reads a signal from the touch panel 52 and generates touch position data at a rate of once per a predetermined amount of time. Various control instructions for the touch panel 52 are outputted from the UI controller 65 to the touch panel controller 61.

The analog stick 53 outputs, to the UI controller 65, stick data representing the direction and the amount of slide (or tilt) of the stick portion operated with a finger of the user. The operation button 54 outputs, to the UI controller 65, operation button data representing the input status of each of the operation buttons 54A to 54L (e.g., whether it is pressed).

The magnetic sensor 62 detects the azimuthal direction by sensing the size and direction of the magnetic field. Azimuthal direction data representing the detected azimuthal direction is outputted to the UI controller 65. Control instructions for the magnetic sensor 62 are outputted from the UI controller 65 to the magnetic sensor 62. While there are sensors using an MI (magnetic impedance) element, a flux-gate sensor, a Hall element, a GMR (giant magneto-resistive) element, a TMR (tunnel magneto-resistance) element, an AMR (anisotropic magneto-resistive) element, etc., the magnetic sensor 62 may be any sensor as long as it is possible to detect the azimuthal direction. Strictly speaking, in a place where there is a magnetic field other than the geomagnetic field, the obtained azimuthal direction data does not represent the azimuthal direction. Nevertheless, if the terminal device 7 moves, the azimuthal direction data changes, and it is therefore possible to calculate the change in the attitude of the terminal device 7.

The acceleration sensor 63 is provided inside the housing 50 for detecting the magnitude of the linear acceleration along each of the directions of the three axes (the x, y and z axes shown in FIG. 8(*a*)). Specifically, the acceleration sensor 63 detects the magnitude of the linear acceleration along each of the axes, where the x axis lies in the longitudinal direction of the housing 50, the y axis lies in the width direction of the housing 50, and the z axis lies in the direction vertical to the surface of the housing 50. Acceleration data representing the detected acceleration is outputted to the UI controller 65. Control instructions for the acceleration sensor 63 are outputted from the UI controller 65 to the acceleration sensor 63. While the acceleration sensor 63 is assumed to be a capacitive-type MEMS-type acceleration sensor, for example, in the present example embodiment, other types of acceleration sensors may be employed in other embodiments. The acceleration sensor 63 may be an acceleration sensor for 1-axis or 2-axis detection.

The gyrosensor 64 is provided inside the housing 50 for detecting angular velocities about the three axes, i.e., the x-axis, the y-axis and the z-axis. Angular velocity data representing the detected angular velocities is outputted to the UI controller 65. Control instructions for the gyrosensor 64 are outputted from the UI controller 65 to the gyrosensor 64. The number and combination of gyrosensors used for detecting angular velocities about three axes may be any number and combination, and the gyrosensor 64 may be formed by a 2-axis gyrosensor and a 1-axis gyrosensor, as is the gyrosensor 48. The gyrosensor 64 may be a gyrosensor for 1-axis or 2-axis detection.

The UI controller 65 outputs, to the codec LSI 66, operation data including touch position data, stick data, operation button data, azimuthal direction data, acceleration data, and angular velocity data received from various components described above. If another device is connected to the terminal device 7 via the extension connector 58, data representing an operation(s) performed on the other device may be further included in the operation data.

The codec LSI 66 is a circuit for performing a compression process on data to be transmitted to the game device 3, and an expansion (decompression) process on data transmitted from the game device 3. The LCD 51, the camera 56, the sound IC 68, the wireless module 70, the flash memory 73, and the infrared communication module 72 are connected to the codec LSI 66. The codec LSI 66 includes a CPU 77 and an internal memory 78. While the terminal device 7 does not itself perform game processes, the terminal device 7 needs to execute a minimal program for the management thereof and for the communication. When the terminal device 7 is started up, a program stored in the flash memory 73 is read out to the internal memory 78 and executed by the CPU 77 upon power-up. Some area of the internal memory 78 is used as the VRAM for the LCD 51.

The camera 56 captures an image in response to an instruction from the game device 3, and outputs the captured image data to the codec LSI 66. Control instructions for the camera 56, such as an image-capturing instruction, are outputted from the codec LSI 66 to the camera 56. Camera 56 can also record video. That is, the camera 56 can repeatedly capture images and repeatedly output the image data to the codec LSI 66.

The sound IC 68 is a circuit connected to the speaker 67 and the microphone 69 for controlling input/output of sound data to/from the speaker 67 and the microphone 69. That is, when sound data is received from the codec LSI 66, the sound IC 68 outputs sound signals obtained by performing D/A conversion on the sound data to the speaker 67 so that sound is outputted from the speaker 67. The microphone 69 detects sounds propagated to the terminal device 7 (the sound of the user, etc.), and outputs sound signals representing such sounds to the sound IC 68. The sound IC 68 performs A/D conversion on the sound signals from the microphone 69 to output sound data of a predetermined format to the codec LSI 66.

The codec LSI 66 transmits, as terminal operation data, image data from the camera 56, sound data from the microphone 69 and operation data from the UI controller 65 to the game device 3 via the wireless module 70. In the present example embodiment, the codec LSI 66 performs a compression process similar to that of the codec LSI 27 on the image data and the sound data. The terminal operation data and the compressed image data and sound data are outputted, as transmit data, to the wireless module 70. The antenna 71 is connected to the wireless module 70, and the wireless module 70 transmits the transmit data to the game device 3 via the antenna 71. The wireless module 70 has a similar function to that of the terminal communication module 28 of the game device 3. That is, the wireless module 70 has a function of connecting to a wireless LAN by a scheme in conformity with the IEEE 802.11n standard, for example. The transmitted data may be encrypted as necessary or may not be encrypted.

As described above, the transmit data transmitted from the terminal device 7 to the game device 3 includes operation data (the terminal operation data), image data, and sound data. In a case in which another device is connected to the terminal device 7 via the extension connector 58, data received from the other device may be further included in the transmit data. The infrared communication module 72 establishes infrared communication in conformity with the IRDA standard, for example, with the other device. The codec LSI 66 may transmit, to the game device 3, data received via infrared communication while it is included in the transmit data as necessary.

As described above, compressed image data and sound data are transmitted from the game device 3 to the terminal device 7. These data are received by the codec LSI 66 via the antenna 71 and the wireless module 70. The codec LSI 66 expands (decompresses) the received image data and sound data. The expanded image data is outputted to the LCD 51, and images are displayed on the LCD 51. The expanded sound data is outputted to the sound IC 68, and the sound IC 68 outputs sounds from the speaker 67.

In a case in which control data is included in data received from the game device 3, the codec LSI 66 and the UI controller 65 give control instructions to various sections in accordance with the control data. As described above, the control data is data representing control instructions for the components of the terminal device 7 (the camera 56, the touch panel controller 61, the marker section 55, sensors 62 to 64, and the infrared communication module 72 in the present example embodiment). In the present example embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmit data transmitted from the terminal device 7 to the game device 3. For the marker section 55, which is an infrared LED, the control can be done simply by turning ON/OFF the power supply thereto.

While the terminal device 7 includes operation mechanisms such as the touch panel 52, the analog stick 53 and the operation button 54, as described above, in other embodiments, other operation mechanisms may be included instead of, or in addition to, these operation mechanisms.

While the terminal device 7 includes the magnetic sensor 62, the acceleration sensor 63 and the gyrosensor 64 as sensors for calculating movement of the terminal device 7 (including aspects of the position and the attitude thereof, or changes in aspects of the position and the attitude thereof), it may only include one or two of these sensors in other embodiments. In other embodiments, other sensors (e.g., sonic transducers) may be included instead of, or in addition to, these sensors.

While the terminal device 7 includes the camera 56 and the microphone 69, it may not include the camera 56 and the microphone 69 or it may include only one of them in other embodiments.

While the terminal device 7 includes the marker section 55 as a configuration for calculating the positional relationship between the terminal device 7 and the controller 5 (aspects of the position such as distance and/or roll, etc., of the terminal device 7 as seen from the controller 5), it may not include the marker section 55 in other embodiments. In other embodiments, the terminal device 7 may include other mechanisms or arrangements as a configuration for calculating the positional relationship. For example, in other embodiments, the controller 5 may include a marker section, and the terminal device 7 may include an image-capturing element. Moreover, in such a case, the marker device 6 may include an image-capturing element, instead of an infrared LED.

[5. Example Game Process]

Figure 11:
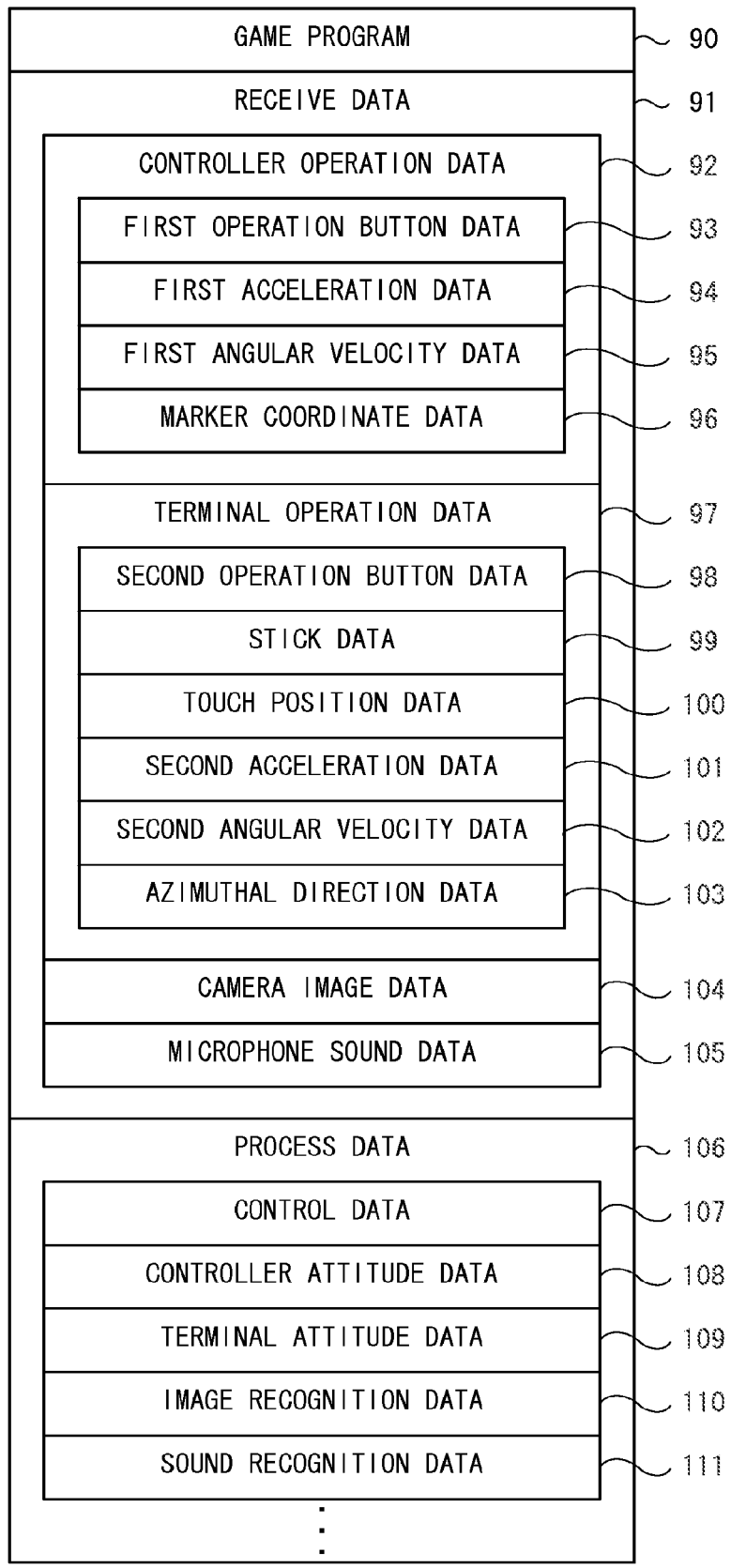
FIG. 11 is a table showing various examples of data used in the game processes.

Next, the details of the game processes performed in the present example game system will be described. First, various example data used in the game processes will be described. FIG. 11 is a table showing various example data used in the game processes. FIG. 11 is a table showing primary data to be stored in the main memory (the external main memory 12 or the internal main memory 11e) of the game device 3. As shown in FIG. 11, the main memory of the game device 3 stores a game program 90, receive data 91, and process data 106. In addition to those shown in FIG. 11, the main memory also stores other data necessary for the game, such as image data of various objects appearing in the game, and sound data used in the game, etc.

At an appropriate point in time after the power of the game device 3 is turned ON, a part or whole of the game program 90 is loaded from the optical disc 4 and stored in the main memory. The game program 90 may be obtained from the flash memory 17 or an external device of the game device 3 (e.g., via the Internet), instead of from the optical disc 4. A part of the game program 90 (e.g., a program for calculating the attitude of the controller 5 and/or the terminal device 7) may be pre-stored in the game device 3.

The receive data 91 are various data received from the controller 5 and the terminal device 7. The receive data 91 includes controller operation data 92, terminal operation data 97, camera image data 104, and microphone sound data 105. If a plurality of controllers 5 are connected, there is a plurality of controller operation data 92. If a plurality of terminal devices 7 are connected, there are a plurality of terminal operation data 97, a plurality of camera image data 104, and a plurality of microphone sound data 105.

The controller operation data 92 is data representing operations performed by the user (player) on the controller 5. The controller operation data 92 is transmitted from the controller 5 to the game device 3 and stored in the main memory. The controller operation data 92 includes first operation button data 93, first acceleration data 94, first angular velocity data 95, and marker coordinate data 96. The main memory may store a predetermined number of latest (most recently obtained) sets of controller operation data.

The first operation button data 93 is data representing the input status of the operation buttons 32a to 32i provided on the controller 5. Specifically, the first operation button data 93 represents whether each of the operation buttons 32a to 32i is pressed.

The first acceleration data 94 is data representing the acceleration (acceleration vector) detected by the acceleration sensor 37 of the controller 5. While the first acceleration data 94 herein represents three-dimensional acceleration of which each component is the acceleration for one of the three axes of X, Y and Z shown in FIG. 3, it may represent acceleration for any one or more directions in other embodiments.

The first angular velocity data 95 is data representing the angular velocity detected by the gyrosensor 48 in the controller 5. While the first angular velocity data 95 herein represents angular velocity about each of the three axes of X, Y and Z shown in FIG. 3, it may represent angular velocity about any one or more axes in other embodiments.

The marker coordinate data 96 is data representing coordinates calculated by the image processing circuit 41 of the image capturing/processing section 35, i.e., the marker coordinates described above. The marker coordinates are expressed in a two-dimensional coordinate system for representing a position on a plane corresponding to the captured image, and the marker coordinate data 96 represents coordinate values in the two-dimensional coordinate system.

The controller operation data 92 may be data representing operations by the user operating the controller 5, and may be data including only some of the data 93 to 96. In a case in which the controller 5 includes other input mechanisms (e.g., a touch panel or an analog stick, etc.), the controller operation data 92 may include data representing operations performed on the other input mechanisms. In a case in which the movement of the controller 5 itself is used as a game operation as in the present example embodiment, the controller operation data 92 includes data whose value changes in accordance with the movement of the controller 5 itself, as is the first acceleration data 94, the first angular velocity data 95 or the marker coordinate data 96.

The terminal operation data 97 is data representing operations performed by the user on the terminal device 7. The terminal operation data 97 is transmitted from the terminal device 7 and obtained by the game device 3 to be stored in the main memory. The terminal operation data 97 includes second operation button data 98, stick data 99, touch position data 100, second acceleration data 101, second angular velocity data 102, and azimuthal direction data. The main memory may store a predetermined number of latest (most recently obtained) sets of terminal operation data.

The second operation button data 98 is data representing the input status of the operation buttons 54A to 54L provided on the terminal device 7. Specifically, the second operation button data 98 represents whether each of the operation buttons 54A to 54L is pressed.

The stick data 99 is data representing the direction and the amount of slide (or tilt) of the stick portion of the analog stick 53 (the analog sticks 53A and 53B). The direction and the amount may be represented as two-dimensional coordinates or a two-dimensional vector, for example.

The touch position data 100 is data representing the position (touch position) on the input surface of the touch panel 52 at which an input is made. In the present example embodiment, the touch position data 100 represents coordinate values in a two-dimensional coordinate system for representing a position on the input surface. In a case in which the touch panel 52 is of a multi-touch type, the touch position data 100 may represent a plurality of touch positions.

The second acceleration data 101 is data representing the acceleration (acceleration vector) detected by the acceleration sensor 63. While the second acceleration data 101 represents three-dimensional acceleration of which each component is the acceleration for one of the three axes of x, y and z shown in FIG. 8 in the present example embodiment, it may represent acceleration for any one or more directions in other embodiments.

The second angular velocity data 102 is data representing the angular velocity detected by the gyrosensor 64. While the second angular velocity data 102 represents angular velocity about each of the three axes of x, y and z shown in FIG. 8 in the present example embodiment, it may represent angular velocity about any one or more axes in other embodiments.

Azimuthal direction data 103 is data representing the azimuthal direction detected by the magnetic sensor 62. In the present example embodiment, the azimuthal direction data 103 represents the direction of a predetermined azimuthal direction (e.g., north) with respect to the terminal device 7. However, in a place where there is a magnetic field other than the geomagnetic field, the azimuthal direction data 103 does not strictly represent the absolute azimuthal direction (e.g., north). Nevertheless, it represents a relative direction of the terminal device 7 with respect to the direction of the (local) magnetic field in that place, and it is therefore possible to calculate the change in the attitude of the terminal device 7 even in such cases.

The terminal operation data 97 may be data representing operations performed by the user on the terminal device 7, and may be data including only one of the data 98 to 103 described above. In a case in which the terminal device 7 includes other input mechanisms (e.g., a touch pad, image-capturing section of the controller 5, etc.), the terminal operation data 97 may include data representing operations performed on the other input mechanisms. In a case in which the movement of the terminal device 7 itself is used as a game operation as in the present example embodiment, the terminal operation data 97 includes data whose value changes in accordance with the movement of the terminal device 7 itself, as is the second acceleration data 101, the second angular velocity data 102 or the azimuthal direction data 103.

The camera image data 104 is data representing images (camera images) captured by the camera 56 of the terminal device 7. The camera image data 104 is image data obtained by the codec LSI 27 expanding the compressed image data from the terminal device 7, and the data is stored in the main memory by the input/output processor 11a. The main memory may store a predetermined number of latest (most recently obtained) sets of camera image data.

The microphone sound data 105 is data representing sounds (microphone sounds) detected by the microphone 69 of the terminal device 7. The microphone sound data 105 is sound data obtained by the codec LSI 27 expanding the compressed sound data transmitted from the terminal device 7, and the data is stored in the main memory by the input/output processor 11a.

The process data 106 is data used in the game processes (FIG. 12) to be described below. The process data 106 includes control data 107, controller attitude data 108, terminal attitude data 109, image recognition data 110, and sound recognition data 111. In addition to those shown in FIG. 11, the process data 106 also includes various data used in the game processes, such as data representing various parameters set for various objects appearing in the game.

The control data 107 is data representing control instructions for the components of the terminal device 7. For example, the control data 107 represents an instruction for controlling the lighting of the marker section 55, an instruction for controlling the image-capturing operation of the camera 56, etc. The control data 107 is transmitted to the terminal device 7 at an appropriate point in time.

The controller attitude data 108 is data representing the attitude of the controller 5. In the present example embodiment, the controller attitude data 108 is calculated based on the first acceleration data 94, the first angular velocity data 95 and the marker coordinate data 96 included in the controller operation data 92. The method for calculating the controller attitude data 108 will be described below in step S23.

The terminal attitude data 109 is data representing the attitude of the terminal device 7. In the present example embodiment, the terminal attitude data 109 is calculated based on the second acceleration data 101, the second angular velocity data 102 and the azimuthal direction data 103 included in the terminal operation data 97. The method for calculating the terminal attitude data 109 will be described below in step S24.

The image recognition data 110 is data representing the results of a predetermined image recognition process for the camera image(s). The image recognition process may be any process as long as it detects any feature of the camera image(s) to output the results of the detection, and may be, for example, a process of extracting a predetermined object (e.g., the face of the user, a marker, etc.) from the camera image(s) and calculating information regarding the extracted object.

The sound recognition data 111 is data representing the results of a predetermined sound recognition process for the microphone sound(s). The sound recognition process may be any process as long as it detects any feature from the microphone sound(s) to output the results of the detection, and may be, for example, a process of detecting words of the user or a process of simply outputting the sound volume.

Figure 12:
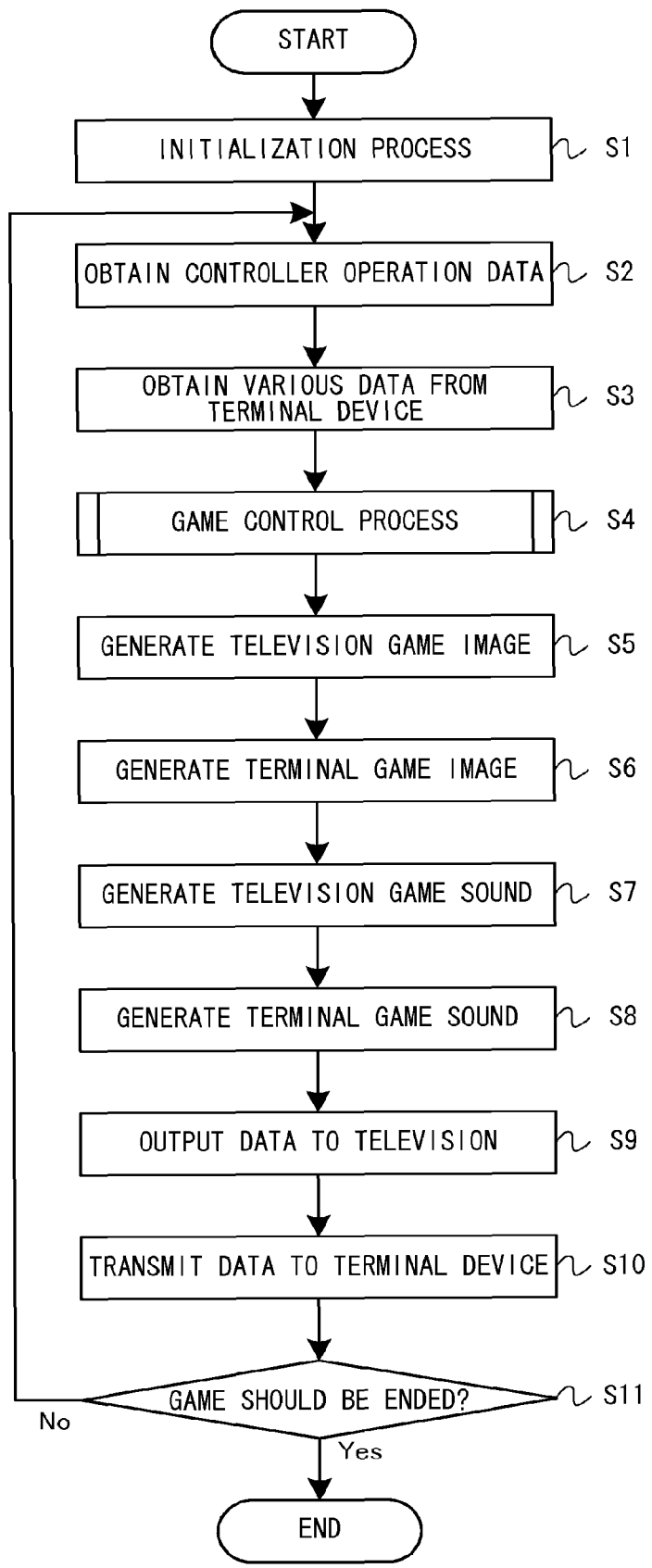
FIG. 12 is a main flow chart showing a flow of example game processes performed by the example game device 3.

Next, with reference to FIG. 12, the details of the example game process performed by the game device 3 will be described. FIG. 12 is a main flow chart showing the flow of the example game processes performed by the game device 3. When the power of the game device 3 is turned ON, the CPU 10 of the game device 3 executes a boot program stored in a boot ROM (not shown), so as to initialize each unit, including the main memory. Then, the game program stored in the optical disc 4 is loaded to the main memory, and the CPU 10 starts executing the game program. The game device 3 may be configured to execute the game program stored in the optical disc 4 immediately after power-up, or it may be configured so that a built-in program is executed after power-up for displaying a predetermined menu screen first, and then the game program stored in the optical disc 4 is executed when the start of the game is instructed by the user by a menu selection, for example. The flow chart of FIG. 12 is a flow chart showing the process to be performed after processes described above are completed.

The process of the steps of the flow chart shown in FIG. 12 is merely illustrative, and the order of steps to be performed may be switched around as long as similar results are obtained. The values of the variables, and the threshold values used in determination steps are also merely illustrative, and other values may be used as necessary. While the present example embodiment is described while assuming that the processes of the steps of the flow chart are performed by the CPU 10, processes of some of the steps may be performed by a processor or a dedicated circuit other than the CPU 10.

First, in step S1, the CPU 10 performs an initialization process. The initialization process is, for example, a process of constructing a virtual game space, placing objects appearing in the game space at their initial positions, and setting initial values of various parameters used in the game processes.

In the present example embodiment, in the initialization process, the CPU 10 controls the lighting of the marker device 6 and the marker section 55 based on the type of the game program. Here, the game system 1 has two image-capturing objects for the image-capturing section of the controller 5 (the image capturing/processing section 35), i.e., the marker device 6 and the marker section 55 of the terminal device 7. Either or both of the marker device 6 and the marker section 55 may be used, depending on the content of the game (the type of the game program). The game program 90 includes data indicating whether each of the marker device 6 and the marker section 55 should be lit. The CPU 10 reads out this data to determine whether or not to light them. When lighting the marker device 6 and/or the marker section 55, the following process is performed.

That is, when lighting the marker device 6, the CPU 10 transmits, to the marker device 6, a control signal for lighting the infrared LEDs of the marker device 6. The transmission of the control signal may be simply supplying the power. In response to this, the infrared LEDs of the marker device 6 are lit. On the other hand, when lighting the marker section 55, the CPU 10 generates control data for lighting the marker section 55 and stores the data in the main memory. The generated control data is transmitted to the terminal device 7 in step S10 to be described below. The control data received by the wireless module 70 of the terminal device 7 is sent to the UI controller 65 via the codec LSI 66, and the UI controller 65 gives a lighting instruction to the marker section 55. This lights the infrared LEDs of the marker section 55. While a case in which the marker device 6 and the marker section 55 are lit has been described above, the marker device 6 and the marker section 55 can be turned off through a similar process to the process of lighting them.

The process of step S2 is performed, following step S1 described above. Thereafter, the process loop including a series of processes of steps S2 to S11 is repeatedly performed at a rate of once per a predetermined amount of time (e.g., one frame period).

In step S2, the CPU 10 obtains controller operation data transmitted from the controller 5. Since the controller 5 repeatedly transmits the controller operation data to the game device 3, the controller operation data is successively received by the controller communication module 19 in the game device 3, and the received controller operation data is successively stored in the main memory by the input/output processor 11a. The transmission/reception interval is preferably shorter than the game process time, and is, for example, 1/200 sec. In step S2, the CPU 10 reads out the latest (most recently received) controller operation data 92 from the main memory. The process of step S3 is performed, following step S2.

In step S3, the CPU 10 obtains various data transmitted from the terminal device 7. Since the terminal device 7 repeatedly transmits the terminal operation data, the camera image data and the microphone sound data to the game device 3, the game device 3 successively receives these data. In the game device 3, the terminal communication module 28 successively receives these data, and the camera image data and the microphone sound data are successively expanded (decompressed) by the codec LSI 27. Then, the input/output processor 11a successively stores the terminal operation data, the camera image data and the microphone sound data in the main memory. In step S3, the CPU 10 reads out the latest (most recently received) terminal operation data 97 from the main memory. The process of step S4 is performed, following step S3.

In step S4, the CPU 10 performs the game control process. The game control process is a process for allowing the game to progress by, for example, performing processes such as controlling the action of an object in the game space in accordance with the game operation by the user. In the present example embodiment, the user can play various games by using the controller 5 and/or the terminal device 7. Now, with reference to FIG. 13, the game control process will be described.

Figure 13:
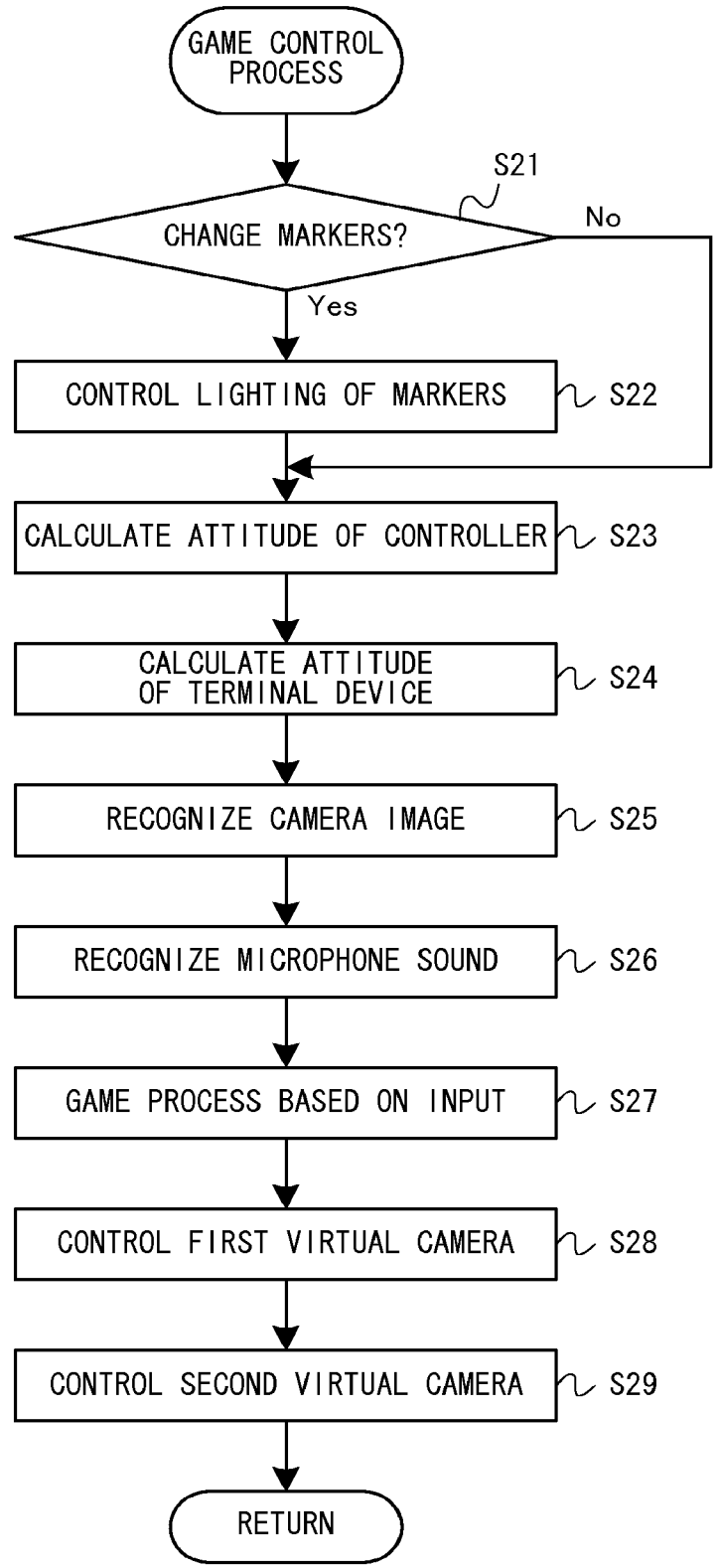
FIG. 13 is a flow chart showing a detailed flow of the example game control processes.

FIG. 13 is a flow chart showing the detailed flow of an example game control process. While the series of processes shown in FIG. 13 are various processes that can be performed in a case in which the controller 5 and the terminal device 7 are used as controller devices, it is not necessary to perform all of the processes, and only some of the processes may be performed depending on the type and content of the game.

In the game control process, first, in step S21, the CPU 10 determines whether or not to change the marker to be used. In the present example embodiment, the process of controlling the lighting of the marker device 6 and the marker section 55 is performed at the start of the game process (step S1), as described above. Here, depending on the game, a marker or markers to be used (lit) among the marker device 6 and the marker section 55 may be changed in the middle of the game. It may be possible to use both the marker device 6 and the marker section 55 depending on the game, but if they are both lit, one of the markers may be erroneously detected for the other marker. Therefore, there are cases in which it is preferred to switch between the markers during the game so that only one of them is lit. In view of such cases, the process of step S21 is a process of determining whether the marker to be lit is changed in the middle of the game.

The determination of step S21 can be made by the following method, for example. That is, the CPU 10 can make the determination based on whether the game status (the stage of the game, the object to be controlled, etc.) has changed. When the game status changes, the control method may be switched between a control method in which the controller 5 is controlled facing the marker device 6, and a control method in which the controller 5 is controlled facing the marker section 55. The CPU 10 can make the determination based, for example, on the attitude of the controller 5. That is, the determination can be made based on whether the controller 5 is facing the marker device 6 or facing the marker section 55. The attitude of the controller 5 can be calculated based on the detection results of the acceleration sensor 37 and the gyrosensor 48, for example (see step S23 to be described later). The CPU 10 can make the determination based on whether there has been an instruction of change from the user.

If the determination result of step S21 is affirmative, the process of step S22 is performed. On the other hand, if the determination result of step S21 is negative, the process of step S22 is skipped and the process of step S23 is performed.

In step S22, the CPU 10 controls the lighting of the marker device 6 and the marker section 55. That is, it changes the lighting status of the marker device 6 and/or the marker section 55. The specific process of lighting or turning off the marker device 6 and/or the marker section 55 can be performed in a similar manner to that of step S1. The process of step S23 is performed, following step S22.

As described above, according to the present example embodiment, the light emission (lighting) of the marker device 6 and the marker section 55 can be controlled depending on the type of the game program through the process of step S1, and the light emission (lighting) of the marker device 6 and the marker section 55 can be controlled in accordance with the game status through the process of steps S21 and S22.

In step S23, the CPU 10 calculates the attitude of the controller 5. In the present example embodiment, the attitude of the controller 5 is calculated based on the first acceleration data 94, the first angular velocity data 95 and the marker coordinate data 96. The method for calculating the attitude of the controller 5 will now be described. In this present example embodiment, certain assumptions may be made in this calculating. For example, as noted below, it may be assumed that the controller 5 is located in front of the marker device 6.

First, the CPU 10 calculates the attitude of the controller 5 based on the first angular velocity data 95 stored in the main memory. While the method for calculating the attitude of the controller 5 from the angular velocity may be any method, the attitude is calculated using the previous attitude (the attitude calculated in a previous iteration) and the current angular velocity (the angular velocity obtained in step S2 in a current iteration of the process loop). Specifically, the CPU 10 calculates the attitude by rotating the previous attitude by a unit time's worth of the current angular velocity. The previous attitude is represented by the controller attitude data 108 stored in the main memory, and the current angular velocity is represented by the first angular velocity data 95 stored in the main memory. Therefore, the CPU 10 reads out the controller attitude data 108 and the first angular velocity data 95 from the main memory to calculate the attitude of the controller 5. The data representing the attitude based on the angular velocity calculated as described above is stored in the main memory.

Where the attitude is calculated from the angular velocity, it is preferred that an initial attitude is set. That is, where the attitude of the controller 5 is calculated from the angular velocity, the CPU 10 initially calculates the initial attitude of the controller 5. The initial attitude of the controller 5 may be calculated based on the acceleration data, or the player may be prompted to perform a predetermined operation with the controller 5 in a particular attitude so that the particular attitude at the point in time when the predetermined operation is performed is used as the initial attitude. While it is preferred to calculate the initial attitude in a case in which the attitude of the controller 5 is calculated as an absolute attitude with respect to a predetermined direction in the space, the initial attitude may not be calculated in a case in which the attitude of the controller 5 is calculated as a relative attitude with respect to the attitude of the controller 5 at the start of the game, for example.

Next, the CPU 10 corrects the attitude of the controller 5 calculated based on the angular velocity by using the first acceleration data 94. Specifically, the CPU 10 first reads out the first acceleration data 94 from the main memory and calculates the attitude of the controller 5 based on the first acceleration data 94. Here, in a state in which the controller 5 is substantially stationary, the acceleration acting upon the controller 5 means the gravitational acceleration. Therefore, in this state, the direction of the gravitational acceleration (the direction of gravity) can be calculated by using the first acceleration data 94 outputted from the acceleration sensor 37, and it is therefore possible to calculate the direction (attitude) of the controller 5 with respect to the direction of gravity based on the first acceleration data 94. The data representing the attitude based on the acceleration calculated as described above is stored in the main memory.

After calculating the attitude based on the acceleration, the CPU 10 then corrects the attitude based on the angular velocity by using the attitude based on the acceleration. Specifically, the CPU 10 reads out data representing the attitude based on the angular velocity and data representing the attitude based on the acceleration from the main memory, and makes a correction such that the attitude based on the angular velocity data is brought closer to the attitude based on the acceleration data at a predetermined rate. The predetermined rate may be a predetermined fixed value, and may be set in accordance with the acceleration represented by the first acceleration data 94, etc. With the attitude based on the acceleration, the attitude cannot be calculated for the rotation direction about the direction of gravity, and therefore the CPU 10 may not make a correction for the rotation direction. In the present example embodiment, data representing the corrected attitude obtained as described above is stored in the main memory.

After the attitude based on the angular velocity is corrected as described above, the CPU 10 further corrects the corrected attitude using the marker coordinate data 96. First, the CPU 10 calculates the attitude of the controller 5 based on the marker coordinate data 96 (the attitude based on marker coordinates). Since the marker coordinate data 96 represents positions of the markers 6R and 6L within the captured image, the attitude of the controller 5 can be calculated for the roll direction (the rotation direction about the Z axis) from these positions. That is, the attitude of the controller 5 for the roll direction can be calculated from the gradient of the straight line connecting between the position of the marker 6R and the position of the marker 6L within the captured image. In a case in which the position of the controller 5 with respect to the marker device 6 can be identified (e.g., a case in which it can be assumed that the controller 5 is located in front of the marker device 6), the attitude of the controller 5 for the pitch direction and that for the yaw direction can be calculated from the position of the marker device 6 within the captured image. For example, when the positions of the markers 6R and 6L move to the left within the captured image, it can be determined that the controller 5 has changed its orientation/attitude to the right. Thus, the attitude of the controller 5 for the pitch direction and that for the yaw direction can be calculated from the positions of the marker 6R and the marker 6L. As described above, it is possible to calculate the attitude of the controller 5 based on the marker coordinate data 96.

After the attitude based on marker coordinates is calculated, the CPU 10 next corrects the corrected attitude (the attitude which has been corrected by the attitude based on the acceleration) by the attitude based on marker coordinates. That is, the CPU 10 makes a correction such that the corrected attitude is brought closer to the attitude based on marker coordinates at a predetermined rate. The predetermined rate may be a predetermined fixed value. The correction by the attitude based on marker coordinates may be made only for any one or two of the roll direction, the pitch direction and the yaw direction. For example, where the marker coordinate data 96 is used, since it is possible to calculate the attitude with high precision for the roll direction, the CPU 10 may make the correction using the attitude based on the marker coordinate data 96 only for the roll direction. If the image-capturing element 40 of the controller 5 does not capture the image of the marker device 6 or the marker section 55, it is not possible to calculate the attitude based on the marker coordinate data 96, and therefore the correction process using the marker coordinate data 96 may not be performed in such a case.

In the above description, the CPU 10 corrects the first attitude of the controller 5 calculated based on the first angular velocity data 95 using the first acceleration data 94 and the marker coordinate data 96. Here, with the method using the angular velocity, among the methods for calculating the attitude of the controller 5, it is possible to calculate the attitude no matter how the controller 5 is moving. On the other hand, with the method using the angular velocity, since the attitude is calculated by cumulatively adding the successively-detected angular velocities, accumulation of errors, or the like, may lead to poor precision, and a so-called "temperature drift" problem may deteriorate the precision of the gyrosensor. With the method using the acceleration, errors do not accumulate, but it is not possible to calculate the attitude with high precision in a state in which the controller 5 is being moved violently (since the direction of gravity cannot be detected accurately). With the method using marker coordinates, the attitude can be calculated with high precision (particularly for the roll direction), but it is not possible to calculate the attitude in a state in which it is not possible to capture an image of the marker section 55. As opposed to this, the attitude of the controller 5 can be calculated more accurately in the present example embodiment since three different methods with different characteristics are used as described above. In other embodiments, the attitude may be calculated by using any one or two of the three methods described above. Where the lighting of the markers is controlled in the process of step S1 or S22, it is preferred that the CPU 10 calculates the attitude of the controller 5 using at least marker coordinates.

The process of step S24 is performed, following step S23. In step S24, the CPU 10 calculates the attitude of the terminal device 7. That is, since the terminal operation data 97 obtained from the terminal device 7 includes the second acceleration data 101, the second angular velocity data 102, and the azimuthal direction data 103, the CPU 10 calculates the attitude of the terminal device 7 based on these data. Here, the CPU 10 can know the amount of rotation per unit time (the amount of change of the attitude) of the terminal device 7 from the second angular velocity data 102. In a state in which the terminal device 7 is substantially stationary, the acceleration acting upon the terminal device 7 means the gravitational acceleration, and it is therefore possible to know, from the second acceleration data 101, the direction of gravity acting upon the terminal device 7 (i.e., the attitude of the terminal device 7 with respect to the direction of gravity). It is possible to know, from the azimuthal direction data 103, a predetermined azimuthal direction with respect to the terminal device 7 (i.e., the attitude of the terminal device 7 with respect to a predetermined azimuthal direction). Even in a case in which there is a magnetic field other than the geomagnetic field, it is possible to know the amount of rotation of the terminal device 7. Therefore, the CPU 10 can calculate the attitude of the terminal device 7 based on the second acceleration data 101, the second angular velocity data 102 and the azimuthal direction data 103. While the attitude of the terminal device 7 is calculated based on the three data in the present example embodiment, the attitude may be calculated based on one or two of the three data in other embodiments.

While the specific method for calculating the attitude of the terminal device 7 may be any method, it is for example a method in which the attitude calculated based on the angular velocity represented by the second angular velocity data 102 is corrected using the second acceleration data 101 and the azimuthal direction data 103. Specifically, the CPU 10 first calculates the attitude of the terminal device 7 based on the second angular velocity data 102. The method for calculating the attitude based on angular velocity may be similar to the method of step S23. Next, the CPU 10 corrects the attitude calculated based on the angular velocity by the attitude calculated based on the second acceleration data 101 and/or the attitude calculated based on the azimuthal direction data 103 at an appropriate point in time (e.g., when the terminal device 7 is close to being stationary). The method for correcting the attitude based on the angular velocity by the attitude based on the acceleration may be similar to the method for calculating the attitude of the controller 5 described above. In a case in which the attitude based on the angular velocity is corrected by the attitude based on the azimuthal direction data, the CPU 10 may bring the attitude based on the angular velocity closer to the attitude based on the azimuthal direction data at a predetermined rate. As described above, the CPU 10 can accurately calculate the attitude of the terminal device 7.

Since the controller 5 includes the image capturing/processing section 35 which is an infrared detector, the game device 3 can obtain the marker coordinate data 96. On the other hand, the terminal device 7 does not include an infrared detector such as the image capturing/processing section 35. The game device 3 cannot know, only from the second acceleration data 101 and the second angular velocity data 102, the absolute attitude in the real space for the rotation direction about the direction of gravity. In view of this, the present example embodiment employs a configuration in which the terminal device 7 includes the magnetic sensor 62, and the game device 3 obtains the azimuthal direction data 103. Then, for the rotation direction about the direction of gravity, the game device 3 can calculate the absolute attitude in real space from the azimuthal direction data 103, and it is possible to more accurately calculate the attitude of the terminal device 7.

As a specific process of step S24, the CPU 10 reads out the second acceleration data 101, the second angular velocity data 102, and the azimuthal direction data 103 from the main memory, and calculates the attitude of the terminal device 7 based on these data. Then, the calculated data representing the attitude of the terminal device 7 is stored in the main memory as the terminal attitude data 109. The process of step S25 is performed, following step S24.

In step S25, the CPU 10 performs a recognition process for a camera image. That is, the CPU 10 performs a predetermined recognition process on the camera image data 104. The recognition process may be any process as long as it detects any feature from the camera image to output the results of the detection. For example, where the face of the player is included in the camera image, it may be a process of recognizing the face. Specifically, it may be a process of detecting parts of the face (eyes, nose, mouth, etc.) or a process of detecting the expression of the face. The data representing the results of the recognition process is stored in the main memory as the image recognition data 110. The process of step S26 is performed, following step S25.

In step S26, the CPU 10 performs a recognition process for microphone sounds. That is, the CPU 10 performs a predetermined recognition process on the microphone sound data 105. The recognition process may be any process as long as it detects any feature from the microphone sounds to output the results of the detection. For example, it may be a process of detecting an instruction of the player from the microphone sounds or a process of simply detecting the sound volume of the microphone sounds. The data representing the results of the recognition process is stored in the main memory as the sound recognition data 111. The process of step S27 is performed, following step S26.

In step S27, the CPU 10 performs the game process in accordance with a game input(s). Herein, the game input may be any data as long as it is data transmitted from the controller 5 or the terminal device 7, or data obtained from such data. Specifically, the game input may be any of various data included in the controller operation data 92 and the terminal operation data 97, as well as data obtained from such data (the controller attitude data 108, the terminal attitude data 109, the image recognition data 110, and the sound recognition data 111). The content of the game process in step S27 may be any content, and it may be, for example, a process of controlling the action of an object (character) appearing in the game, a process of controlling a virtual camera, or a process of moving a cursor displayed on the screen. It may also be a process of using the camera image (or a portion thereof) as a game image, a process of using the microphone sound as a game sound, etc. Examples of the game process will be described below. In step S27, data representing the results of the game control process are stored in the main memory, such as, for example, data of various parameters set for the character (object) appearing in the game, data of parameters regarding the virtual camera provided in the game space, and score data. After step S27, the CPU 10 ends the game control process of step S4.

Referring back to FIG. 12, in step S5, a television game image to be displayed on the television 2 is generated by the CPU 10 and the GPU 11b. That is, the CPU 10 and the GPU 11b read out data representing the results of the game control process of step S4 from the main memory and read out data necessary for generating a game image from the VRAM 11d to generate a game image. The game image may be any image as long as it represents the results of the game control process of step S4, and it may be generated by any method. For example, the game image generation method may be a method in which a virtual camera is provided in the virtual game space, and a three-dimensional CG image is generated by calculating the game space as seen from the virtual camera, or a method in which a two-dimensional image is generated (without using a virtual camera). The generated television game image is stored in the VRAM 11d. The process of step S6 is performed, following step S5.

In step S6, a terminal game image to be displayed on the terminal device 7 is generated by the CPU 10 and the GPU 11b. As with the television game image, the terminal game image may be any image as long as it represents the results of the game control process of step S4, and it may be generated by any method. The terminal game image may be generated by a method similar to that for the television game image or may be generated by a different method. The generated terminal game image is stored in the VRAM 11d. Depending on the content of the game, the television game image and the terminal game image may be the same, in which case it is not necessary to perform the process of generating a game image in step S6. The process of step S7 is performed, following step S6.

In step S7, a television game sound to be outputted to the speaker 2a of the television 2 is generated. That is, the CPU 10 has the DSP 11c generate a game sound in accordance with the results of the game control process of step S4. The generated game sound may be, for example, a sound effect of the game, the voice of a character appearing in the game, BGM, etc. The process of step S8 is performed, following step S7.

In step S8, a terminal game sound to be outputted to the speaker 67 of the terminal device 7 is generated. That is, the CPU 10 has the DSP 11c generate a game sound in accordance with the results of the game control process of step S4. The terminal game sound may be the same as, or different from, the television game sound. They may be partially different from each other, e.g., differing from each other with the sound effect but being the same with the BGM. In a case in which the television game sound and the terminal game sound are the same, the game sound generating process may not be performed in step S8. The process of step S9 is performed, following step S8.

In step S9, the CPU 10 outputs a game image and a game sound to the television 2. Specifically, the CPU 10 sends the data of the television game image stored in the VRAM 11d and the data of the television game sound generated by the DSP 11c in step S7 to the AV-IC 15. In response to this, the AV-IC 15 outputs the image and sound data to the television 2 via the AV connector 16. Thus, the television game image is displayed on the television 2, and the television game sound is outputted from the speaker 2a. The process of step S10 is performed, following step S9.

In step S10, the CPU 10 transmits a game image and a game sound to the terminal device 7. Specifically, the image data which is a terminal game image stored in the VRAM 11d and the sound data generated by the DSP 11c in step S8 are sent by the CPU 10 to the codec LSI 27, and are subjected to a predetermined compression process by the codec LSI 27. Moreover, the image and sound data which have been subjected to the compression process are transmitted by the terminal communication module 28 to the terminal device 7 via the antenna 29. The terminal device 7 receives the image and sound data transmitted from the game device 3 by the wireless module 70, and the data are subjected to a predetermined expansion (decompression) process by the codec LSI 66. The image data which has been subjected to the expansion process is outputted to the LCD 51, and the sound data which has been subjected to the expansion process is outputted to the sound IC 68. Thus, the terminal game image is displayed on the LCD 51, and the terminal game sound is outputted from the speaker 67. The process of step S11 is performed, following step S10.

In step S11, the CPU 10 determines whether the game should be ended. The determination of step S11 is made based on, for example, whether the game is over, the user has given an instruction to quit the game, etc. If the determination result of step S11 is negative, the process of step S2 is performed again. On the other hand, if the determination result of step S11 is affirmative, the CPU 10 ends the game process shown in FIG. 12. The series of processes through steps S2 to S11 is repeatedly performed until it is determined in step S11 that the game should be ended. The game end process may include, for example, processes for saving game data to a memory card and the like.

As described above, in the present example embodiment, the terminal device 7 includes the touch panel 52, and an inertia sensor such as the acceleration sensor 63 and/or the gyrosensor 64, and the outputs of the touch panel 52 and the inertia sensor are transmitted as operation data to the game device 3, and used as game inputs (steps S3 and S4). Moreover, the terminal device 7 includes a display device (the LCD 51), and game images obtained by the game process are displayed on the LCD 51 (steps S6 and S10). Therefore, the user can perform an operation of directly touching on the game image using the touch panel 52, and an operation of moving the LCD 51 itself on which the game image is displayed (since the movement of the terminal device 7 is detected by the inertia sensor). With these operations, the user can play a game with such gameplay as if the user were directly operating the game image, and it is therefore possible to provide a game with novel gameplay such as the first and second game examples to be described below, for example.

Moreover, in the present example embodiment, the terminal device 7 includes the analog stick 53 and the operation button 54 which can be operated while holding the terminal device 7, and the game device 3 can use, as game inputs, operations performed on the analog stick 53 and the operation button 54 (steps S3 and S4). Therefore, even where the game image is directly operated as described above, the user can perform a more detailed game operation through the button operation and the stick operation.

Moreover, in the present example embodiment, the terminal device 7 includes the camera 56 and the microphone 69, and data of the camera images captured by the camera 56 and data of the microphone sounds detected by the microphone 69 are transmitted to the game device 3 (step S3). Therefore, with the game device 3, since the camera images and/or microphone sounds can be used as game inputs, the user can perform game operations through an operation of capturing an image(s) with the camera 56 or an operation of inputting sound(s) to the microphone 69. Since these operations can be performed while holding the terminal device 7, the user can perform a greater variety of game operations by performing such operations when directly operating the game image as described above.

In the present example embodiment, since a game image is displayed on the LCD 51 which is the terminal device 7 of a portable type (steps S6 and S10), the user can freely position or place the terminal device 7. Therefore, where the controller 5 is operated while being pointed toward the marker, the user can play a game while pointing the controller 5 toward an arbitrary direction by placing the terminal device 7 at an arbitrary position, thus improving the degree of freedom in the operation of the controller 5. Since the terminal device 7 can be placed at an arbitrary position, it is possible to provide a more realistic game by placing the terminal device 7 at a position suitable for the content of the game, as in the fifth game example to be described below, for example.

According to the present example embodiment, since the game device 3 obtains operation data, etc., from the controller 5 and the terminal device 7 (steps S2 and S3), the user can use one or both of the controller 5 and the terminal device 7 to provide operation inputs. Therefore, in the game system 1, a game can be played with multiple users in which the devices are used by a plurality of users (e.g., one user using controller 5 and another user using terminal device 7), or a game can be played with a single user using the two devices.

According to the present example embodiment, the game device 3 generates two types of game images (steps S5 and S6), and the game images are displayed on the television 2 and the terminal device 7 (steps S9 and S10). Thus, as the two types of game images are displayed on different devices, it is possible to provide game images that are easier for the user to view, and it is possible to improve the playability of the game. For example, where a game is played by two players, a game image from a viewpoint that is easier for one user to view may be displayed on the television 2 while a game image from a viewpoint that is easier for the other user to view is displayed on the terminal device 7, as in the third or fourth game example to be described below, in which case each player can play the game with a viewpoint that is easier for the player to view. Even if the game is played by one player, for example, if two types of game images are displayed from two different viewpoints, as in the first, second and fifth game examples to be described below, the player can more easily grasp the state of the game space, and it is therefore possible to improve the playability of the game.

[6. Game Examples]

Next, specific examples of games to be played on the game system 1 will be described. The game examples described below may not use some of the components of the devices in the game system 1 and may not perform some of the series of processes shown in FIGS. 12 and 13. That is, the game system 1 need not include all the components described above, and the game device 3 may not perform some of the series of processes shown in FIGS. 12 and 13.

(First Game Example)

The first game example is a game in which an object (a shuriken, or a throwing star) is thrown in the game space by operating the terminal device 7. The player can specify the direction in which a shuriken is thrown through an operation of changing the attitude of the terminal device 7 and an operation of drawing a line on the touch panel 52.

FIG. 14 is a diagram showing the screen of the television 2 and the terminal device 7 in the first game example. In FIG. 14, a game image representing the game space is displayed on the television 2 and the LCD 51 of the terminal device 7. A shuriken 121, a control surface 122 and a target 123 are displayed on the television 2. The control surface 122 (and the shuriken 121) are displayed on the LCD 51. In the first game example, the player plays the game by throwing the shuriken 121 at the target 123 through an operation using the terminal device 7.

When throwing the shuriken 121, the player first changes the attitude of the control surface 122 provided in the virtual game space to an intended attitude by changing or varying the attitude of the terminal device 7. That is, the CPU 10 calculates the attitude of the terminal device 7 based on the outputs of the inertia sensor (the acceleration sensor 63 and/or the gyrosensor 64) and/or the magnetic sensor 62 (step S24), and changes the attitude of the control surface 122 based on the calculated attitude (step S27). In the first game example, the attitude of the control surface 122 in the virtual game space is controlled so as to be an attitude in accordance with the attitude of the terminal device 7 in real space. That is, the player can change the attitude of the control surface 122 in the game space by changing the attitude of the terminal device 7 (the control surface 122 displayed on the terminal device 7). In the first game example, the position of the control surface 122 is fixed at a predetermined position in the game space.

Next, the player performs an operation of drawing or forming a line on the touch panel 52 using a stylus 124, finger or the like (see arrow shown in FIG. 14). Here, in the first game example, the control surface 122 is displayed on the LCD 51 of the terminal device 7 so that the input surface of the touch panel 52 and the control surface 122 correspond to each other. Therefore, based on the line drawn on the touch panel 52, it is possible to calculate the direction on the control surface 122 (the direction represented by the line). The shuriken 121 is thrown in a direction thus determined. As described above, the CPU 10 performs a process of calculating the direction on the control surface 122 from the touch position data 100 of the touch panel 52, and moving the shuriken 121 in the calculated direction (step S27). The CPU 10 may control the speed of the shuriken 121 in accordance with the length of the line or the speed at which the line is drawn, for example.

As described above, in the first game example, the game device 3 can move the control surface 122 in accordance with the movement (attitude) of the terminal device 7 by using the output of the inertia sensor as a game input, and identify the direction on the control surface 122 by using the output of the touch panel 52 as a game input. Thus, the player can move the game image displayed on the terminal device 7 (the image of the control surface 122) and perform a touch operation on the game image, and can therefore play a game with such novel gameplay as if the player were directly operating the game image.

In the first game example, it is possible to easily specify a direction in a three-dimensional space by using sensor outputs of the inertia sensor and the touch panel 52 as a game input. That is, the player can easily specify a direction with such an intuitive operation as if the player were actually inputting a direction in the space, by actually adjusting the attitude of the terminal device 7 with one hand while inputting a direction with a line on the touch panel 52 with the other hand. Moreover, since the player can perform the operation on the attitude of the terminal device 7 and the input operation on the touch panel 52 simultaneously in parallel to each other, it is possible to quickly perform the operation of specifying a direction in a three-dimensional space.

In the first game example, the control surface 122 is displayed across the entire screen of the terminal device 7 so as to facilitate the touch input operation on the control surface 122. On the other hand, the television 2 displays an image of the game space including the entire control surface 122 and the target 123 (see FIG. 14) so that it is easy to grasp the attitude of the control surface 122 and aim at the target 123. That is, in step S27, the first virtual camera for generating the television game image is set so that the entire control surface 122 and the target 123 are included in the range of viewing field, whereas the second virtual camera for generating the terminal game image is set so that the screen of the LCD 51 (the input surface of the touch panel 52) and the control surface 122 coincide with each other on the screen. Therefore, in the first game example, images of the game space as seen from different viewpoints are displayed on the television 2 and on the terminal device 7, thereby facilitating the game operation.

(Second Game Example)

The game using sensor outputs of the inertia sensor and the touch panel 52 as a game input is not limited to the first game example described above, and may be any of various game examples. As is the first game example, the second game example is a game in which an object (cannonball) is thrown in the game space by operating the terminal device 7. The player can specify the direction in which the cannonball is thrown through an operation of changing the attitude of the terminal device 7 and an operation of specifying a position on the touch panel 52.

FIG. 15 is a diagram showing the screen of the television 2 and the terminal device 7 in the second game example. In FIG. 15, a cannon 131, a cannonball 132 and a target 133 are displayed on the television 2. The cannonball 132 and the target 133 are displayed on the terminal device 7. The terminal game image displayed on the terminal device 7 is an image of the game space as seen from the position of the cannon 131.

In the second game example, the player can change the range of display to be displayed on the terminal device 7 as the terminal game image by changing or varying the attitude of the terminal device 7. That is, the CPU 10 calculates the attitude of the terminal device 7 based on the outputs of the inertia sensors (the acceleration sensor 63 and/or the gyrosensor 64) and/or the magnetic sensor 62 (step S24), and controls the position and the attitude of the second virtual camera for generating the terminal game image based on the calculated attitude (step S27). Specifically, the second virtual camera is placed at the position of the cannon 131 and the orientation/attitude thereof is controlled in accordance with the attitude of the terminal device 7. Thus, the player can change the range of the game space to be displayed on the terminal device 7 by changing the attitude of the terminal device 7.

In the second game example, the player specifies the direction in which the cannonball 132 is to be thrown by an operation of inputting a point on the touch panel 52 (a touch operation). Specifically, as the process of step S27, the CPU 10 calculates the position (control position) in the game space corresponding to the touched position, and calculates, as the throwing direction, the direction from a predetermined position in the game space (e.g., the position of the cannon 131) to the control position. Then, the CPU 10 performs a process of moving the cannonball 132 in the throwing direction. Thus, while the player performs an operation of drawing a line on the touch panel 52 in the first game example, the player performs an operation of specifying a point on the touch panel 52 in the second game example. The control position can be calculated by setting a control surface similar to that of the first game example (however, the control surface is not displayed in the second game example). That is, the position on the control surface corresponding to the touched position can be calculated as the control position by placing the control surface in accordance with the attitude of the second virtual camera so as to correspond to the display range of the terminal device 7 (specifically, the control surface rotates about the position of the cannon 131 in accordance with the change in the attitude of the terminal device 7).

In the second game example, the game device 3 can change the display range of the terminal game image in accordance with the movement (attitude) of the terminal device 7 by using the output of the inertia sensor as a game input, and can specify a direction in the game space (the direction in which the cannonball 132 is thrown) by using the touch input specifying a position within the display range as a game input. Thus, also in the second game example, as in the first game example, the player can move the game image displayed on the terminal device 7 or perform a touch operation on the game image, and can therefore play a game with such novel gameplay as if the player were directly operating the game image.

Also in the second game example, as in the first game example, the player can easily specify a direction with such an intuitive operation as if the player were actually inputting a direction in the space, by actually adjusting the attitude of the terminal device 7 with one hand while performing a touch input on the touch panel 52 with the other hand. Moreover, since the player can perform an operation on the attitude of the terminal device 7 and an input operation on the touch panel 52 simultaneously in parallel to each other, it is possible to quickly perform the operation of specifying a direction in a three-dimensional space.

In the second game example, while the image displayed on the television 2 may be an image from the same viewpoint as the terminal device 7, the game device 3 displays an image from a different viewpoint in FIG. 15. That is, while the second virtual camera for generating the terminal game image is set at the position of the cannon 131, the first virtual camera for generating the television game image is set at a position behind the cannon 131. Here, for example, if a range that cannot be seen on the screen of the terminal device 7 is displayed on the television 2, it is possible to realize such gameplay that the player aims at the target 133, which cannot be seen on the screen of the terminal device 7, while looking at the screen of the television 2. Thus, by having different display ranges for the television 2 and for the terminal device 7, it is possible not only to make it easier to grasp the state of the game space but also to further improve the playability of the game.

As described above, according to the present example embodiment, since the terminal device 7 including the touch panel 52 and the inertia sensor can be used as a controller device, it is possible to realize a game with such gameplay as if the player were directly operating the game image, as in the first and second game examples.

(Third Game Example)

Figure 16:
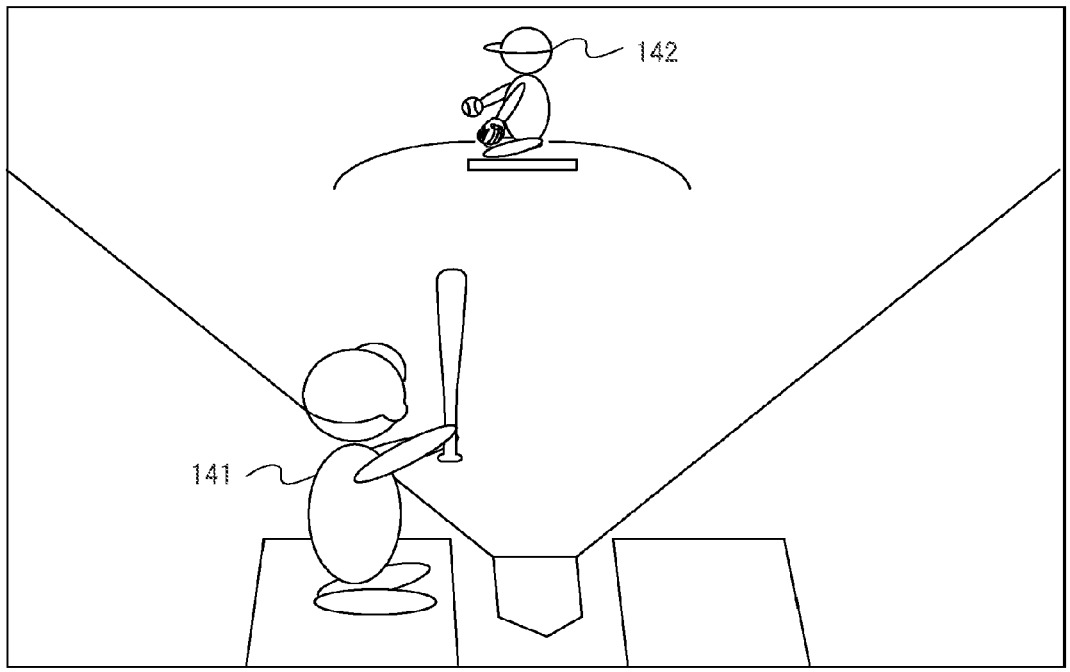
FIG. 16 is a diagram showing an example of a television game image displayed on the television 2 in the third game example.
Figure 17:
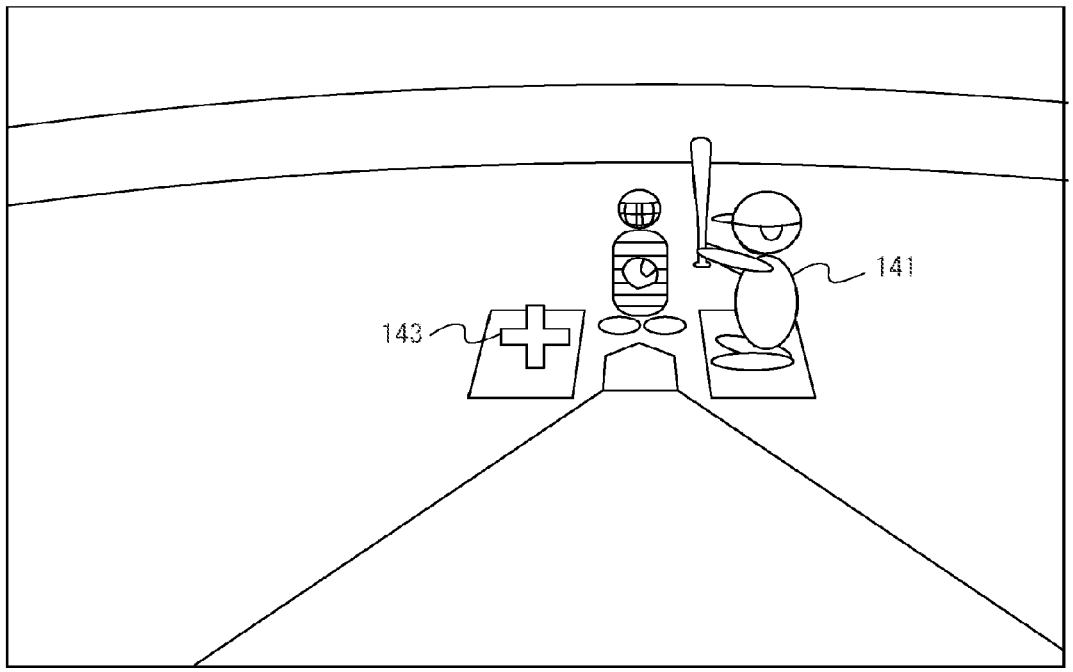
FIG. 17 is a diagram showing an example of a terminal game image displayed on the example terminal device 7 in the third game example.

Referring now to FIGS. 16 and 17, the third game example will be described. The third game example is a baseball game in which two players compete with each other. That is, the first player uses the controller 5 to control a batter, while the second player uses the terminal device 7 to control a pitcher. The television 2 and the terminal device 7 display game images which are easy for the respective players to perform operations with.

FIG. 16 is a diagram showing an example of a television game image displayed on the television 2 in the third game example. The television game image shown in FIG. 16 is an image primarily for the first player. That is, the television game image represents the game space showing a pitcher (pitcher object) 142 which is the object to be controlled by the second player as seen from the side of a batter (batter object) 141 which is the object to be controlled by the first player. The first virtual camera for generating the television game image is placed at a position behind the batter 141 so as to be directed from the batter 141 toward the pitcher 142.

On the other hand, FIG. 17 is a diagram showing an example of a terminal game image displayed on the terminal device 7 in the third game example. The terminal game image shown in FIG. 17 is an image primarily for the second player. That is, the terminal game image represents the game space showing the batter 141 which is the object to be controlled by the first player as seen from the side of the pitcher 142 which is the object to be controlled by the second player. Specifically, in step S27, the CPU 10 controls the second virtual camera used for generating the terminal game image based on the attitude of the terminal device 7. The attitude of the second virtual camera is calculated so as to correspond to the attitude of the terminal device 7, as in the second game example described above. The position of the second virtual camera is fixed at a predetermined position. The terminal game image includes a cursor 143 for indicating the direction in which the pitcher 142 is throwing the ball.

The method by which the batter 141 is controlled by the first player, and the method by which the pitcher 142 is controlled by the second player may be any method. For example, the CPU 10 may detect a swing operation on the controller 5 based on output data of the inertia sensor of the controller 5, and have the batter 141 swing the bat in response to the swing operation. For example, the CPU 10 may move the cursor 143 in accordance with an operation on the analog stick 53, and have the pitcher 142 throw the ball to a position indicated by the cursor 143 when a predetermined one of the operation buttons 54 is pressed. The cursor 143 may be moved in accordance with the attitude of the terminal device 7, instead of an operation on the analog stick 53.

As described above, in the third game example, game images are generated from different viewpoints for the television 2 and for the terminal device 7, thus providing game images that are easy to view and easy to operate with for the respective players.

In the third game example, two virtual cameras are set in a single game space so as to display two types of game images of the game space as seen from the virtual cameras (FIGS. 16 and 17). Therefore, for the two types of game images generated in the third game example, most of the game processes performed on the game space (e.g., controlling an object in the game space) are common, and the game images can be generated simply by performing the drawing process twice on a common game space, thus providing an advantage that the process efficiency is higher than when the game processes are performed separately.

In the third game example, since the cursor 143 representing the pitching direction is displayed only on the side of the terminal device 7, the first player cannot see the position indicated by the cursor 143. Therefore, the game does not have such a problem that the first player gets to know the pitching direction to the disadvantage of the second player. Thus, in the present example embodiment, if there is a problem in the game for one player if the other player sees a game image, the game image can be displayed on the terminal device 7. Thus, it is possible to prevent a problem of, for example, detracting from the strategic aspect of the game. In other embodiments, the game device 3 may display the terminal game image on the television 2 along with the television game image depending on the content of the game (e.g., where no such problem as described above occurs even if the terminal game image is seen by the first player).

(Fourth Game Example)

Figure 18:
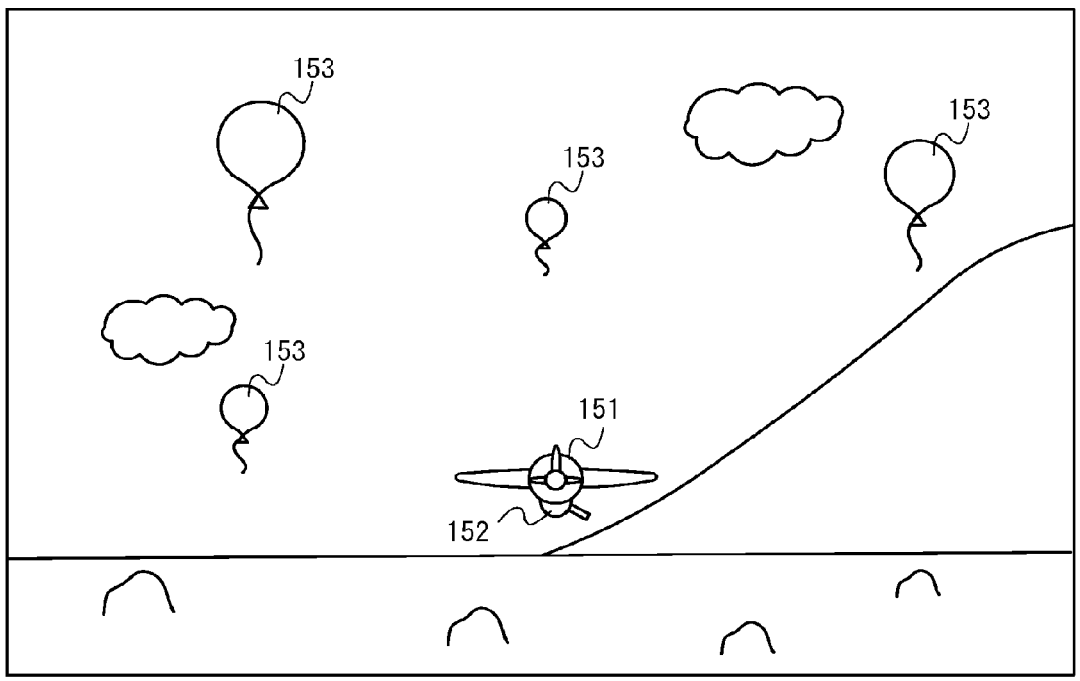
FIG. 18 is a diagram showing an example of a television game image displayed on the television 2 in the fourth game example.
Figure 19:
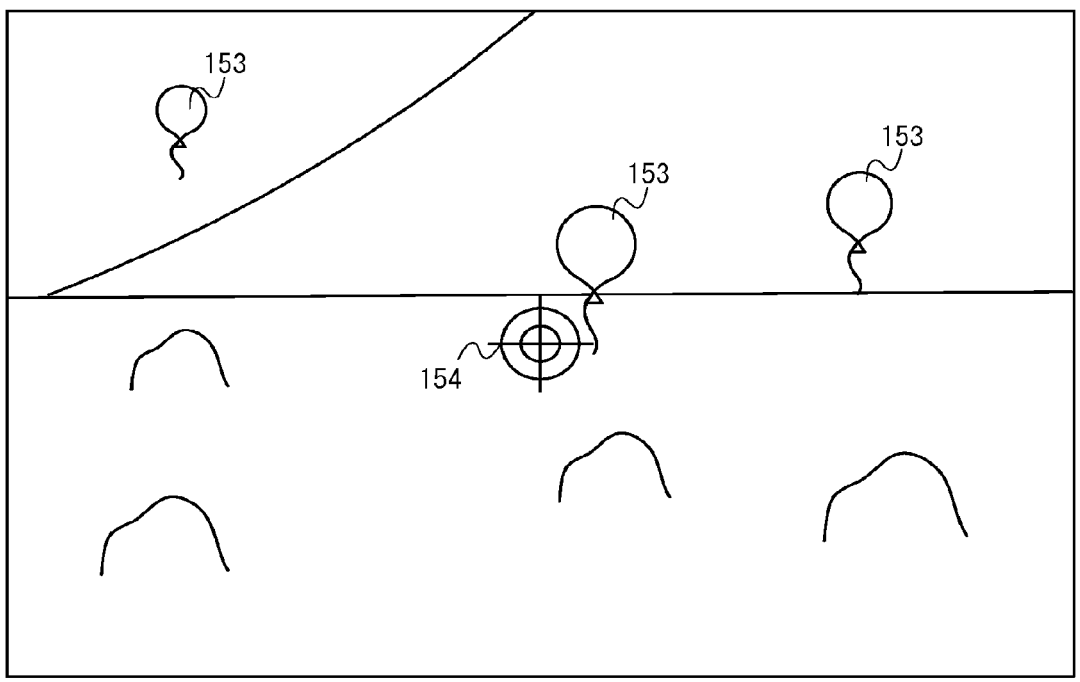
FIG. 19 is a diagram showing an example of a terminal game image displayed on the example terminal device 7 in the fourth game example.

Referring now to FIGS. 18 and 19, the fourth game example will be described. The fourth game example is a shooting game in which two players cooperate with each other. That is, the first player uses the controller 5 to perform an operation of moving an airplane, and the second player uses the terminal device 7 to perform an operation of controlling the cannon-firing direction of the airplane. In the fourth game example, as in the third game example, game images that are easy for the respective players to perform game operations with are displayed on the television 2 and on the terminal device 7.

FIG. 18 is a diagram showing an example of a television game image displayed on the television 2 in the fourth game example. FIG. 19 is a diagram showing an example of a terminal game image displayed on the terminal device 7 in the fourth game example. As shown in FIG. 18, an airplane (airplane object) 151 and a target (balloon object) 153 appear in the virtual game space in the fourth game example. The airplane 151 has a cannon (cannon object) 152.

As shown in FIG. 18, an image of the game space including the airplane 151 is displayed as the television game image. The first virtual camera for generating the television game image is set so as to produce an image of the game space showing the airplane 151 as seen from behind. That is, the first virtual camera is placed behind the airplane 151 at such an attitude that the airplane 151 is included in the image-capturing range (range of viewing field). The first virtual camera is controlled so as to be moved in accordance with the movement of the airplane 151. That is, in the process of step S27, the CPU 10 controls the movement of the airplane 151 based on the controller operation data, and also controls the position and the attitude of the first virtual camera. Thus, the position and the attitude of the first virtual camera are controlled in accordance with the operation of the first player.

On the other hand, as shown in FIG. 19, an image of the game space as seen from the airplane 151 (more specifically, the cannon 152) is displayed as the terminal game image. Therefore, the second virtual camera for generating the terminal game image is placed at the position of the airplane 151 (more specifically, the position of the cannon 152). In the process of step S27, based on the controller operation data, the CPU 10 controls the movement of the airplane 151 and also controls the position of the second virtual camera. The second virtual camera may be placed at a position around the airplane 151 or the cannon 152 (e.g., a position slightly behind the cannon 152). As described above, the position of the second virtual camera is controlled by the operation of the first player (operating the movement of the airplane 151). Therefore, in the fourth game example, the first virtual camera and the second virtual camera move in cooperation with each other.

An image of the game space as seen in the firing direction of the cannon 152 is displayed as the terminal game image. Here, the firing direction of the cannon 152 is controlled so as to correspond to the attitude of the terminal device 7. That is, in the present example embodiment, the attitude of the second virtual camera is controlled so that the line-of-sight direction of the second virtual camera coincides with the firing direction of the cannon 152. In the process of step S27, the CPU 10 controls the orientation of the cannon 152 and the attitude of the second virtual camera in accordance with the attitude of the terminal device 7 calculated in step S24. Thus, the attitude of the second virtual camera is controlled by the operation of the second player. The second player can change the firing direction of the cannon 152 by changing the attitude of the terminal device 7.

When firing a cannonball from the cannon 152, the second player presses a predetermined button of the terminal device 7. When the predetermined button is pressed, a cannonball is fired in accordance with the orientation of the cannon 152. In the terminal game image, a sight 154 is displayed at the center of the screen of the LCD 51, and the cannonball is fired in the direction indicated by the sight 154.

As described above, in the fourth game example, the first player operates the airplane 151 (so that it moves in the direction of an intended target 153, for example) while looking primarily at the television game image (FIG. 18) representing the game space viewing in the traveling direction of the airplane 151. On the other hand, the second player operates the cannon 152 while looking primarily at the terminal game image (FIG. 19) representing the game space viewing in the firing direction of the cannon 152. Thus, in the fourth game example, in a game in which two players cooperate with each other, game images that are easy to view and easy to operate with for the respective players are displayed on the television 2 and on the terminal device 7.

In the fourth game example, the positions of the first virtual camera and the second virtual camera are controlled by the operation of the first player, and the attitude of the second virtual camera is controlled by the operation of the second player. That is, in the present example embodiment, the position or the attitude of a virtual camera changes in accordance with the game operation by each player, thereby changing the display range of the game space to be displayed on each display device. Since the display range of the game space to be displayed on the display device changes in accordance with the operation of each player, each player can realize that one's game operation is sufficiently reflected in the progress of the game, and can thus enjoy the game sufficiently.

In the fourth game example, a game image as seen from behind the airplane 151 is displayed on the television 2, and a game image as seen from the position of the cannon of the airplane 151 is displayed on the terminal device 7. Here, in other game examples, the game device 3 may display a game image as seen from behind the airplane 151 on the terminal device 7, and a game image as seen from the position of the cannon 152 of the airplane 151 on the television 2. Then, the roles of the players are switched around from the fourth game example so that the first player uses the controller 5 to operate the cannon 152 while the second player uses the terminal device 7 to operate the airplane 151.

(Fifth Game Example)

Figure 20:
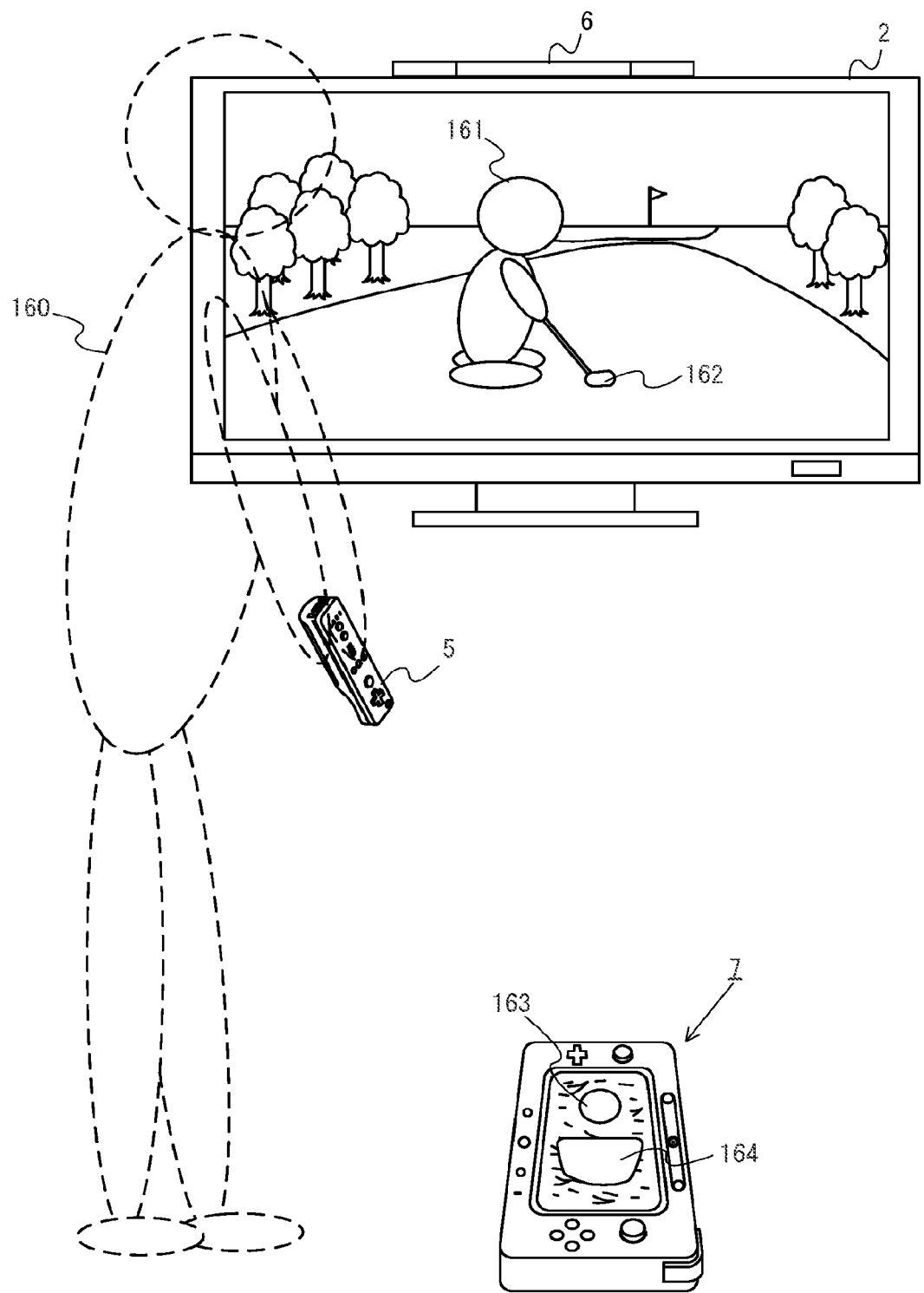
FIG. 20 is a diagram showing how the example game system 1 is used in the fifth game example.

Referring now to FIG. 20, the fifth game example will be described. The fifth game example is a game in which a player uses the controller 5 to perform an operation, and the terminal device 7 is used as a display device, not as a controller device. Specifically, the fifth game example is a golf game, wherein the game device 3 has a player character in the virtual game space take a golf swing in accordance with the player performing an operation (swing operation) of swinging the controller 5 as if it were a golf club.

FIG. 20 is a diagram showing how the game system 1 is used in the fifth game example. In FIG. 20, an image of the game space including (an object of) a player character 161 and (an object of) a golf club 162 is displayed on the screen of the television 2. Note that (an object of) a ball 163 placed in the game space is also displayed on the television 2 though it is not shown in FIG. 20 as being hidden behind the golf club 162. On the other hand, as shown in FIG. 20, the terminal device 7 is placed on the floor surface in front of the television 2 so that the screen of the LCD 51 is facing vertically upward. An image representing the ball 163, an image representing a part of the golf club 162 (specifically, a head 162*a* of the golf club), and an image representing the ground of the game space are displayed on the terminal device 7. The terminal game image is an image of the vicinity of the ball as seen from above.

When playing the game, a player 160 stands near the terminal device 7, and performs a swing operation of swinging the controller 5 as if it were a golf club. Then, in step S27, the CPU 10 controls the position and the attitude of the golf club 162 in the game space in accordance with the attitude of the controller 5 calculated in the process of step S23. Specifically, the golf club 162 is controlled so that the golf club 162 in the game space hits the ball 163 when the tip direction of the controller 5 (the Z-axis positive direction shown in FIG. 3) is pointing toward the image of the ball 163 displayed on the LCD 51.

When the tip direction of the controller 5 is pointing toward the LCD 51, an image (head image) 164 representing a part of the golf club 162 is displayed on the LCD 51 (see FIG. 20). For the terminal game image, the image of the ball 163 may be shown in the actual size, and the orientation of the head image 164 may be shown to rotate in accordance with the rotation of the controller 5 about the Z axis, in order to enhance the reality. The terminal game image may be generated using a virtual camera provided in the game space, or generated using pre-prepared image data. When it is generated using pre-prepared image data, detailed and realistic images can be generated with low computational load without constructing the terrain model of a golf course in detail.

As a result of the player 160 performing the swing operation so as to swing the golf club 162, if the golf club 162 hits the ball 163, the ball 163 travels (flies). That is, the CPU 10 determines in step S27 whether the golf club 162 and the ball 163 have contacted each other, and moves the ball 163 when there has been a contact. Here, the television game image is generated so that the ball 163 after the travel is included therein. That is, the CPU 10 controls the position and the attitude of the first virtual camera for generating the television game image so that the traveling ball is included in the image-capturing range thereof. On the other hand, on the terminal device 7, when the golf club 162 hits the ball 163, the image of the ball 163 is moved and immediately disappears to the outside of the screen. Thus, in the fifth game example, the travel of the ball is displayed primarily on the television 2, and the player 160 can check, on the television game image, the destination of the ball hit by the swing operation.

As described above, in the fifth game example, the player 160 can swing the golf club 162 by swinging the controller 5 (have the player character 161 swing the golf club 162). Here, in the fifth game example, the golf club 162 in the game space is controlled to hit the ball 163 when the tip direction of the controller 5 is pointing toward the image of the ball 163 displayed on the LCD 51. Therefore, the player can perform the swing operation and thereby feel as if the player were taking a swing with an actual golf club, thus making the swing operation feel more realistic.

Moreover, in the fifth game example, the head image 164 is displayed on the LCD 51 when the tip direction of the controller 5 is pointing toward the terminal device 7. Therefore, as the player points the tip direction of the controller 5 toward the terminal device 7, the player can feel that the attitude of the golf club 162 in the virtual space corresponds to the attitude of the controller 5 in real space, thus making the swing operation feel more realistic.

As described above, in the fifth game example, where the terminal device 7 is used as a display device, it is possible to make the operation using the controller 5 feel more realistic by locating the terminal device 7 at an appropriate position.

In the fifth game example, the terminal device 7 is placed on the floor surface, and an image representing the game space showing only the vicinity of the ball 163 is displayed on the terminal device 7. Therefore, the position/attitude of the entire golf club 162 in the game space cannot be displayed on the terminal device 7, and how the ball 163 travels after the swing operation cannot be displayed on the terminal device 7. In view of this, in the fifth game example, the entire golf club 162 is displayed on the television 2 before the ball 163 travels, and how the ball 163 travels is displayed on the television 2 after the ball 163 starts traveling. Thus, in the fifth game example, it is possible to provide the player with a realistic operation, and game images that are easy to view can be presented to the player by using two screens of the television 2 and the terminal device 7.

In the fifth game example, the marker section 55 of the terminal device 7 is used for calculating the attitude of the controller 5. That is, the CPU 10 lights the marker section 55 (does not light the marker device 6) in the initialization process of step S1, and the CPU 10 calculates the attitude of the controller 5 based on the marker coordinate data 96 in step S23. Then, it is possible to accurately determine whether the tip direction of the controller 5 is in an attitude pointing toward the marker section 55. Note that while steps S21 and S22 do not have to be performed in the fifth game example, a marker or markers to be lit may be changed in the middle of the game in other game examples by performing the process of steps S21 and S22. For example, the CPU 10 may determine in step S21 whether the tip direction of the controller 5 is pointing in the direction of gravity based on the first acceleration data 94, and in step S22, the CPU 10 may light the marker section 55 if it is pointing in the direction of gravity and light the marker device 6 if it is not pointing in the direction of gravity. Then, where the tip direction of the controller 5 is pointing in the direction of gravity, the attitude of the controller 5 can be calculated with high precision by obtaining marker coordinate data of the marker section 55, and where the tip direction of the controller 5 is pointing toward the television 2, the attitude of the controller 5 can be calculated with high precision by obtaining marker coordinate data of the marker device 6.

As described above in the fifth game example, in the game system 1, the terminal device 7 can be placed at an arbitrary position and used as a display device. Then, when the marker coordinate data is used as a game input, the controller 5 can be used while pointing in an arbitrary direction by setting the terminal device 7 at an intended position, in addition to using the controller 5 while pointing toward the television 2. That is, according to the present example embodiment, since the orientation in which the controller 5 is used is not limited to any particular orientation, it is possible to improve the degree of freedom in operations to be performed on the controller 5.

[7. Other Operation Examples of Game System]

In the game system 1, it is possible to perform operations for playing various games as described above. While the terminal device 7 can be used as a portable display or a second display, it may also be used as a controller for making a touch input or a motion-based input, and it is therefore possible to realize a wide variety of games with the game system 1. Operations as follows can also be performed, including applications other than games.

(Operation Example where Player Plays Game Only Using Terminal Device 7)

In the present example embodiment, the terminal device 7 can function as a display device and can also function as a controller device. Therefore, one can use the terminal device 7 like a portable game device by using the terminal device 7 as a display and as an operation input device and without using the television 2 and the controller 5.

Specifically, according to the example game process shown in FIG. 12, the CPU 10 obtains the terminal operation data 97 from the terminal device 7 in step S3, and performs a game process using only the terminal operation data 97 as a game input (without using the controller operation data) in step S4. Then, a game image is generated in step S6, and the game image is transmitted to the terminal device 7 in step S10. Note that steps S2, S5 and S9 may not be performed. Thus, a game process is performed in accordance with an operation on the terminal device 7, and a game image representing the game process results is displayed on the terminal device 7. Then, the terminal device 7 can be used as a portable game device (though the game process is actually performed by the game device). Therefore, according to the present example embodiment, the user can play a game using the terminal device 7 even in a case in which a game image cannot be displayed on the television 2 for reasons such as the television 2 being used (e.g., someone else watching a TV broadcast).

In addition to the game image, the CPU 10 may transmit an image of the menu screen described above to be displayed after power-up to the terminal device 7 so that the image is displayed thereon. This is convenient because the player can play a game without using the television 2 from the beginning.

Moreover, in the above description, the display device on which the game image is displayed can be changed from the terminal device 7 to the television 2 in the middle of the game. Specifically, the CPU 10 can further perform step S9 to output the game image to the television 2. The image to be outputted to the television 2 in step S9 is the same as the game image to be transmitted to the terminal device 7 in step S10. Then, by switching the input of the television 2 so that the input from the game device 3 is displayed thereon, the same game image as that on the terminal device 7 is displayed on the television 2. Thus, the display device on which the game image is displayed can be changed to the television 2. After the game image is displayed on the television 2, the display of the screen of the terminal device 7 may be turned OFF.

The game system 1 may be such that the infrared remote controller signal for the television 2 can be outputted from an infrared emitter (e.g., the marker device 6, the marker section 55 or the infrared communication module 72). Then, the game device 3 can perform an operation on the television 2 by outputting the infrared remote controller signal from the infrared emitter in accordance with an operation on the terminal device 7. In such a case, since the user can operate the television 2 by using the terminal device 7 without operating the remote controller of the television 2, it is convenient when, for example, switching the input of the television 2 from one to another as described above.

(Operation Example where System Communicates with Another Device Via Network)

Figure 21:
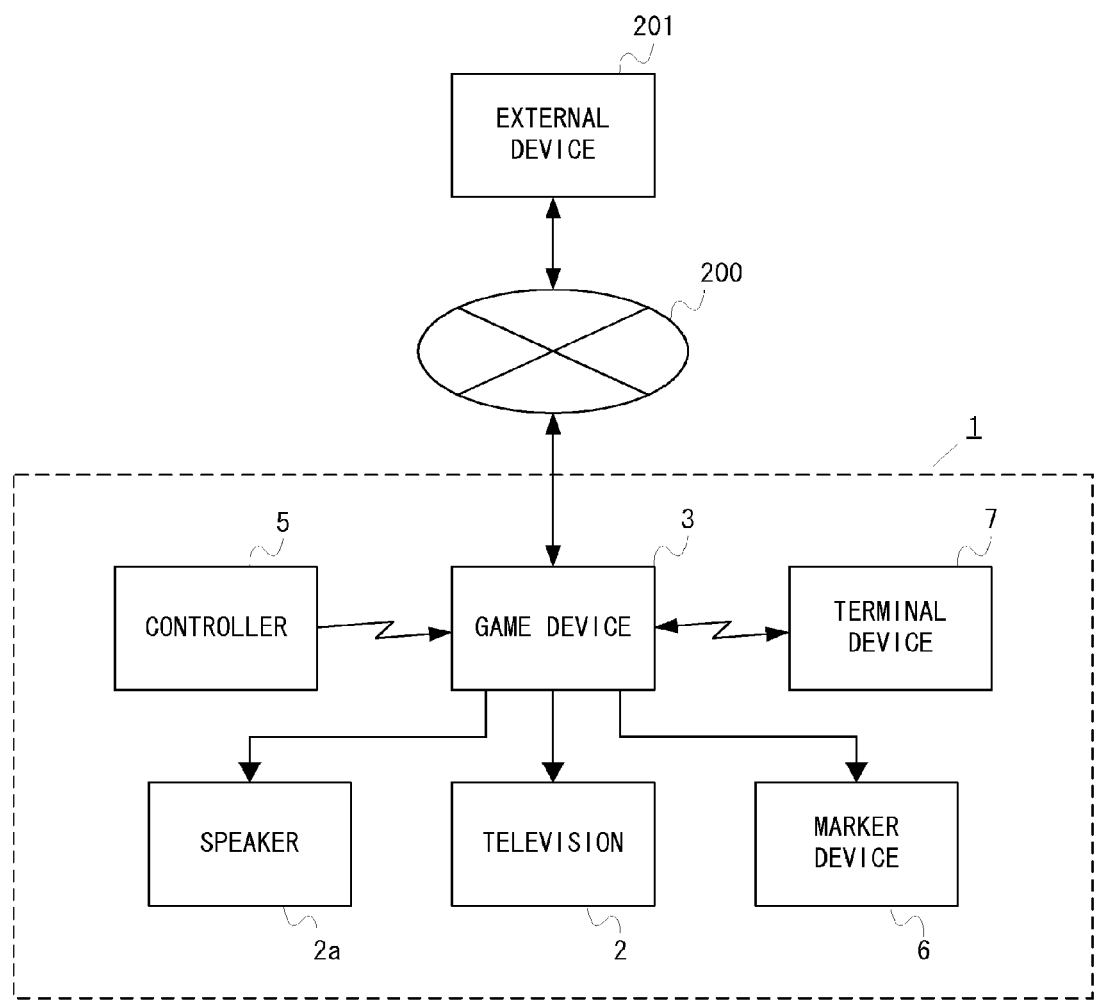
FIG. 21 is a diagram showing how devices included in the example game system 1 are connected with one another in a case in which the example game system 1 is connected to an external device via a network.

Since the game device 3 has a network connection function as described above, the game system 1 can be used in a case in which it communicates with an external device via a network. FIG. 21 is a diagram showing how devices included in the game system 1 are connected with one another in a case in which the game system 1 is connected to an external device via a network. As shown in FIG. 21, the game device 3 can communicate with an external device 201 via a network 200.

Where the external device 201 and the game device 3 can communicate with each other as described above, the game system 1 can communicate with the external device 201 using the terminal device 7 as an interface. For example, the game system 1 can be used as a video telephone by exchanging images and sounds between the external device 201 and the terminal device 7. Specifically, the game device 3 receives the images and sounds from the external device 201 (the images and the sounds of the other person) via the network 200, and transmits the received images and sounds to the terminal device 7. Then, the terminal device 7 displays the images from the external device 201 on the LCD 51 and outputs from the speaker 67 the sounds from the external device 201. The game device 3 receives from the terminal device 7 the camera images captured by the camera 56 and the microphone sounds detected by the microphone 69, and transmits the camera images and the microphone sounds to the external device 201 via the network 200. The game system 1 can be used as a video telephone as the game device 3 repeats the exchange of the images and the sounds described above with the external device 201.

Since the terminal device 7 is portable in the present example embodiment, the user can use the terminal device 7 at an arbitrary position or direct the camera 56 in an arbitrary direction. In the present example embodiment, since the terminal device 7 includes the touch panel 52, the game device 3 can transmit the input information made on the touch panel 52 (the touch position data 100) to the external device 201. For example, the game system 1 can be used as a so-called e-learning system when outputting from the terminal device 7 the images and sounds from the external device 201, and transmitting characters, etc., the user has written on the touch panel 52 to the external device 201.

(Operation Example where System Cooperates with TV Broadcasting)

The game system 1 can also operate in cooperation with TV broadcasting when a TV broadcast is being watched on the television 2. That is, when a TV program is being watched on the television 2, the game system 1 can output on the terminal device 7 information regarding the TV program, etc. An operation example in which the game system 1 operates in cooperation with TV broadcasting will now be described.

In the operation example described above, the game device 3 can communicate with a server via a network (in other words, the external device 201 shown in FIG. 21 is the server). The server stores, for each channel of TV broadcasting, various information relating to TV broadcasting (TV information). The TV information may be program-related information such as subtitles and cast information, EPG (Electronic Program Guide) information, or information to be broadcast as a data broadcast. The TV information may be images, sounds, text, or information of a combination thereof. The number of servers does not need to be one, a server may be provided for each channel or each program of TV broadcasting, and the game device 3 may be able to communicate with the servers.

Where video/sound of a TV broadcast is being outputted from the television 2, the game device 3 prompts the user to input the channel of the TV broadcast being watched by using the terminal device 7. Then, a request is given via the network to the server to transmit TV information corresponding to the inputted channel. In response to this, the server transmits data of TV information corresponding to the channel. When receiving data transmitted from the server, the game device 3 outputs the received data to the terminal device 7. The terminal device 7 displays image and text data of that data on the LCD 51, and outputs sound data from the speaker. As described above, the user can enjoy information relating to the TV program being watched currently, etc., using the terminal device 7.

As described above, the game system 1 can communicate with an external device (server) via a network so that information linked to TV broadcasting can be presented to the user by the terminal device 7. Particularly, this gives great convenience since the terminal device 7 is portable in the present example embodiment, and the user can use the terminal device 7 at an arbitrary position.

As described above, in the present example embodiment, the user can use the terminal device 7 in various applications/forms, in addition to game applications.

[8. Variations]

The above embodiment is an example of systems and methods that can be carried out, and the systems and methods may also be carried out with, for example, the following configurations in other embodiments.

(Variation Using Plurality of Terminal Devices)

While the game system 1 includes only one terminal device in the above example embodiment, the game system 1 may include a plurality of terminal devices. That is, the game device 3 may be able to wirelessly communicate with each of a plurality of terminal devices, wherein the game device 3 transmits game image data, game sound data and control data to each terminal device, and receives operation data, camera image data and microphone sound data from each terminal device. When the game device 3 wirelessly communicates with the plurality of terminal devices, the game device 3 can realize the wireless communication with the terminal devices by time division multiple access or frequency division multiple access.

In a case in which there are a plurality of terminal devices as described above, a greater variety of games can be played using the game system. For example, where the game system 1 includes two terminal devices, the game system 1 has three display devices, and the game system 1 can therefore generate game images for three players and display the game images on the respective display devices. Where the game system 1 includes two terminal devices, two players can simultaneously play a game in which a controller and a terminal device are used as a set (e.g., the fifth game example). Moreover, where the game process of step S27 is performed based on marker coordinate data outputted from two controllers, two players can each perform a game operation while pointing the controller toward the marker (the marker device 6 or the marker section 55). That is, one player can perform a game operation while pointing the controller toward the marker device 6, and the other player can perform a game operation while pointing the controller toward the marker section 55.

(Variation Regarding Function of Terminal Device)

In the above example embodiment, the terminal device 7 functions as a so-called thin client terminal, and does not perform the game process. Here, in other embodiments, some of a series of game processes performed by the game device 3 in the above embodiment may be performed by other devices such as the terminal device 7. For example, some processes (e.g., the process of generating the terminal game image) may be performed by the terminal device 7. For example, in a game system including a plurality of information processing devices (game devices) that can communicate with each other, the game processes may be divided among the plurality of information processing devices.

As described above, the system and methods described herein are applicable to, for example, a game system, a terminal device used in a game system, etc., aiming at, for example, making the player perform a novel game operation.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

The processing system/circuitry described in this specification is "programmed" to control processes such as game processes in accordance with the "logic" described in the specification. One of ordinary skill in the art will therefore recognize that, for example, a processing system including at least one CPU when executing instructions in accordance this logic operates as "programmed logic circuitry" to perform the operations defined by the logic.

While the above systems and methods have been described in detail, the foregoing description is in all aspects illustrative and not restrictive. It is understood that numerous other modifications and variations can be devised.

What is claimed is:

1. A game system comprising a game device and a controller device,
the game device comprising:
    a first receiver for receiving operation data from the controller device;
    a game processor for performing game processes based on the operation data;
    an image processor for generating first game images and second game images based on the game processes;
    a compressor for compressing the first game images to generate compressed image data;
    a transmitter for wirelessly transmitting the compressed image data to the controller device; and
    an image output for outputting the second game images to an external display device which is separate from the controller device,
the controller device comprising:
    a display;
    a touch panel provided on a screen of the display;
    an inertia sensor;
    a transmitter for wirelessly transmitting the operation data including touch panel data and inertia sensor data to the game device;
    a receiver for receiving the compressed image data from the game device; and
    a game image decompressor for decompressing the compressed image data to obtain the first game images,
wherein the display displays the first game images obtained by the decompressing, and
wherein the controller device is a thin-client device.

2. The game system according to claim 1,
the game device further comprising:
    a game sound generator for generating first game sounds and second game sounds based on the game processes;
    a game sound output for outputting the second game sounds to an external acoustic device which is separate from the controller device; and
    wherein the transmitter of the game device wirelessly transmits the first game sounds to the controller device,
wherein the receiver of the controller device receives the first game sounds from the game device; and
the controller device further comprises a speaker for outputting the received first game sounds.

3. The game system according to claim 1, wherein:
the controller device further comprises a microphone; and
the transmitter of the controller device wirelessly transmits sound data detected by the microphone to the game device.

4. The game system according to claim 1, wherein:
the controller device further comprises:
    a camera; and
    a compressor for compressing camera images captured by the camera to generate compressed captured image data;
the transmitter of the controller device wirelessly transmits the compressed captured image data to the game device; and
the game device further comprises a decompressor for decompressing the compressed captured image data to obtain the camera images.

5. The game system according to claim 1, wherein:
the controller device comprises:
a plurality of front surface input devices provided on a front surface of the controller device, on which the screen of the display and the touch panel are provided, at least two of the front surface input devices being disposed on opposite sides of the screen; and
direction input devices capable of specifying directions, provided on the front surface on opposite sides of the screen; and
the operation data further comprises data representing inputs supplied via the plurality of front surface input devices and the direction input devices.

6. The game system according to claim 5, wherein:
the controller device further comprises:
a plurality of back surface input devices provided on a back surface of the controller device opposite to the front surface; and
a plurality of side surface input devices provided on a side surface extending between the front surface and the back surface; and
the operation data further comprises data representing inputs supplied via the plurality of back surface input devices and the side surface input devices.

7. The game system according to claim 1, wherein:
the controller device further comprises a magnetic sensor; and
the operation data further comprises magnetic sensor data.

8. The game system according to claim 1, wherein the inertia sensor includes a 3-axis acceleration sensor and a 3-axis gyrosensor.

9. The game system according to claim 1, wherein:
the processing system of the game device reads out information from an external storage medium storing a game program therein which can be attached/detached to/from the game device; and wherein the game device further comprises:
a network communication interface for connecting to a network for communicating with an information processing device which is capable of communication via the network; and
a power supply for supplying power from an external power supply outside the game device to various sections inside the game device, wherein
the game processor performs game processes based on the read-out game program.

10. A controller device capable of wirelessly communicating with a game device, the controller device comprising:
a display section;
a touch panel provided on a screen of the display section;
an inertia sensor;
a transmitter for wirelessly transmitting, to the game device, operation data including touch panel data and inertia sensor data;
a receiver for receiving compressed image data from the game device, wherein the compressed image data is obtained by performing a compression process on game images generated based on game processes performed in the game device based on the operation data; and
a decompressor for decompressing the compressed image data to obtain the game images,
wherein the display section displays the game images obtained by the expansion, and
wherein the controller device is a thin-client device.

11. A method carried out in a game system comprising a game device and a controller device, wherein the controller device is a thin-client device, the method comprising:
wirelessly transmitting, by the controller device, operation data to the game device, wherein the operation data includes touch panel data and inertia sensor data;
receiving, by the game device, the operation data from the controller device;
performing, by the game device, game processes based on the operation data;
generating, by the game device, first game images and second game images based on the game processes;
compressing, by the game device, the first game images to generate compressed image data;
wirelessly transmitting, by the game device, the compressed image data to the controller device;
outputting, by the game device, the second game image to an external display device which is separate from the controller device;
receiving, by the controller device, the compressed image data from the game device;
decompressing, by the controller device, the compressed image data to obtain the first game images; and
displaying, by the controller device, the first game images obtained by the decompressing.

12. A game system comprising a game device and a controller device,
the game device comprising a processing system and a memory in communication with the processing system, the memory storing a program which is executable by the processing system to cause the processing system to perform operations comprising:
generating first game images and second game images based at least in part on inputs received from the controller device,
compressing the first game images to generate compressed image data,
wirelessly transmitting the compressed image data to the controller device, and
outputting the second game images to an external display device which is separate from the controller device, and
the controller device comprising:
a display including a touchscreen;
an inertia sensor;
a transmitter configured to wirelessly transmit the inputs which include touchscreen data and inertia sensor data to the game device;
a receiver configured to receive the compressed image data from the game device; and
a decompressor configured to decompress the compressed image data to obtain the first game images,
wherein the display displays the decompressed first game images, and
wherein the controller device is a thin-client device.

13. A game system comprising a game device and a controller device,
the game device comprising:
a first receiver for receiving operation data from the controller device;
a game processor for performing game processes based on the operation data;
an image processor for generating first game images and second game images based on the game processes;
a compressor for compressing the first game images to generate compressed image data;
a transmitter for wirelessly transmitting the compressed image data to the controller device; and
an image output for outputting the second game images to an external display device which is separate from the controller device, the controller device comprising:
- a display;
- a touch panel provided on a screen of the display;
- an inertia sensor;
- a transmitter for wirelessly transmitting the operation data including touch panel data and inertia sensor data to the game device;
- a receiver for receiving the compressed image data from the game device; and
- a game image decompressor for decompressing the compressed image data to obtain the first game images, wherein the display displays the first game images obtained by the decompressing, and wherein the controller device does not perform game processing.

14. A controller device capable of wirelessly communicating with a game device, the controller device comprising:
- a display section;
- a touch panel provided on a screen of the display section;
- an inertia sensor;
- a transmitter for wirelessly transmitting, to the game device, operation data including touch panel data and inertia sensor data;
- a receiver for receiving compressed image data from the game device, wherein the compressed image data is obtained by performing a compression process on game images generated based on game processes performed in the game device based on the operation data; and
- a decompressor for decompressing the compressed image data to obtain the game images, wherein the display section displays the game images obtained by the expansion, and wherein the controller device does not perform game processing.

15. A method carried out in a game system comprising a game device and a controller device, wherein the controller device does not perform game processing, the method comprising:
- wirelessly transmitting, by the controller device, operation data to the game device, wherein the operation data includes touch panel data and inertia sensor data;
- receiving, by the game device, the operation data from the controller device;
- performing, by the game device, game processes based on the operation data;
- generating, by the game device, first game images and second game images based on the game processes;
- compressing, by the game device, the first game images to generate compressed image data;
- wirelessly transmitting, by the game device, the compressed image data to the controller device;
- outputting, by the game device, the second game image to an external display device which is separate from the controller device;
- receiving, by the controller device, the compressed image data from the game device;
- decompressing, by the controller device, the compressed image data to obtain the first game images; and
- displaying, by the controller device, the first game images obtained by the decompressing.

16. A game system comprising a game device and a controller device, the game device comprising a processing system and a memory in communication with the processing system, the memory storing a program which is executable by the processing system to cause the processing system to perform operations comprising:

generating first game images and second game images based at least in part on inputs received from the controller device, compressing the first game images to generate compressed image data, wirelessly transmitting the compressed image data to the controller device, and outputting the second game images to an external display device which is separate from the controller device, and the controller device comprising:
- a display including a touchscreen;
- an inertia sensor;
- a transmitter configured to wirelessly transmit the inputs which include touchscreen data and inertia sensor data to the game device;
- a receiver configured to receive the compressed image data from the game device; and
- a decompressor configured to decompress the compressed image data to obtain the first game images, wherein the display displays the decompressed first game images, and wherein the controller device does not perform game processing.

* * * * *